US011514237B2

(12) United States Patent
Rautenbach

(10) Patent No.: US 11,514,237 B2
(45) Date of Patent: Nov. 29, 2022

(54) SPREADSHEET AND METHOD FOR UPDATING SAME

(71) Applicant: Decision Scenarios Pty Ltd, Paddington (AU)

(72) Inventor: Marc William Rautenbach, Paddington (AU)

(73) Assignee: Decision Scenarios Pty Ltd, Paddington (AU)

( * ) Notice: Subject to any disclaimer, the term of this patent is extended or adjusted under 35 U.S.C. 154(b) by 57 days.

(21) Appl. No.: 17/279,806

(22) PCT Filed: Nov. 28, 2019

(86) PCT No.: PCT/AU2019/051307
§ 371 (c)(1),
(2) Date: Mar. 25, 2021

(87) PCT Pub. No.: WO2020/118354
PCT Pub. Date: Jun. 18, 2020

(65) Prior Publication Data
US 2021/0342526 A1    Nov. 4, 2021

(30) Foreign Application Priority Data

Dec. 11, 2018  (AU) .............................. 2018904705

(51) Int. Cl.
*G06F 40/00* (2020.01)
*G06F 40/18* (2020.01)
(Continued)

(52) U.S. Cl.
CPC .............. *G06F 40/18* (2020.01); *G06F 40/12* (2020.01); *G06F 40/186* (2020.01); *G06F 40/197* (2020.01)

(58) Field of Classification Search
CPC ........ G06F 40/18; G06F 40/186; G06F 40/12; G06F 40/197
See application file for complete search history.

(56) References Cited

U.S. PATENT DOCUMENTS 5,806,078 A * 9/1998 Hug ..................... G06F 40/18
707/999.203
6,438,565 B1 * 8/2002 Ammirato .............. G06F 40/18
715/204

(Continued)

FOREIGN PATENT DOCUMENTS

EP    1211624 A2    6/2002

OTHER PUBLICATIONS

International Preliminary Report on Patentability for Application No. PCT/AU2019/051307 dated Jan. 22, 2021, 5 pages.

(Continued)

*Primary Examiner* — Scott T Baderman
*Assistant Examiner* — Barbara M Level
(74) *Attorney, Agent, or Firm* — Finch & Maloney PLLC

(57) ABSTRACT

A computer software program for improving electronic spreadsheets to manage and control scenarios. The program provides methods for the user to record specific changes made to selected value of cells in the spreadsheet. Each recorded item can be dragged and re-ordered via a graphical user interface (GUI) to build up a scenario script. The script can be executed whereby the spreadsheet is updated with the recorded items. The method allows complex scenarios to be played back in step by incremental step, modified, re-ordered, corrected, and re-played while generating user-defined output reports & charts detailing each step change. The method provides a detailed information trail of all value changes made to the spreadsheet suitable for an independent third-party review. Different scenario components can be recorded in parallel by multiple users and then merged to (Continued)

produce a complete solution. The method is scalable and suitable for scenarios requiring thousands of cell value updates (subject to available computer memory, operating system limitations, and calculation time constraints).

20 Claims, 38 Drawing Sheets

(51) Int. Cl.
  *G06F 40/186* (2020.01)
  *G06F 40/12* (2020.01)
  *G06F 40/197* (2020.01)

(56) References Cited

U.S. PATENT DOCUMENTS

| | | | |
|---|---|---|---|
| 6,766,509 B1 * | 7/2004 | Sheretov | G06F 40/18 717/125 |
| 8,407,668 B2 * | 3/2013 | Lindhorst | G06F 40/18 717/115 |
| 9,298,686 B2 | 3/2016 | Ratkowski et al. | |
| 10,503,822 B1 * | 12/2019 | Spencer | G06F 40/197 |
| 2007/0011211 A1 * | 1/2007 | Reeves | G06F 40/194 707/999.203 |
| 2007/0028159 A1 | 2/2007 | Ying et al. | |
| 2008/0046804 A1 | 2/2008 | Rui et al. | |
| 2013/0013993 A1 | 1/2013 | Oh | |

OTHER PUBLICATIONS

Markham, S et al., (2006) Scenario Analysis in Spreadsheets with Excel's Scenario Tool, INFORMS Transactions on Education 6(2):23-31, [retrieved from internet on Dec. 17, 2019] <URL: https://doi.org/10.1287/ited.6.2.23 >.

Harvey, G., How to Use Scenarios in Excel 2016, Book VII Chapter 1, Excel 2016 All-in-One for Dummies, published Oct. 2015, [retrieved from internet on Dec. 17, 2019]<URL: https://www.dummies.com/software/microsoftoffice/excel/how-to-use-scenarios-in-excel-2016/>.

chandoo. org, Reporting Scenarios using Offset, Feb. 14, 2012, [retrieved from internet on Jul. 10, 2020] <URL: https://chandoo.org/wp/reporting-scenarios-using-offset/>.

International Search Report for Application No. PCT/AU2019/051307 dated Dec. 20, 2019, 3 pages.

* cited by examiner

Scenario file name changed to Excel Workbook (.xlsx) CLEAR

FILES | VERSION | SCENARIOS | MODIFY | MERGE | RENAME | OPTIONS

Browse File | Browse Folder | Refresh | Create Workbook | Enter file name... | in: D:\Lugano ActiveVersion 17 | Options

Scenario and Version Files

| Scenario Files (.xlsx, scen) | Modified | Created | Versions |
|---|---|---|---|
| ➤ Aurum System | 27 June 18 00:39 | 8 May 18 01:10 | 43 |
| Aurum System - RENAME | 21 May 18 23:11 | 12 May 18 16:58 | 42 |
| mainPipeline | 26 May 18 23:49 | 5 May 18 02:00 | 3 |
| PlatinumSales | 14 May 18 03:30 | 12 Sep 17 14:01 | 2 |
| PlatinumSales_Merged | 26 May 18 15:30 | 11 Mar 18 20:28 | 9 |
| PlatinumSales_Merged2 | 26 May 18 15:17 | 11 Mar 18 23:56 | 9 |
| PlatinumSales_Merged3 | 12 Mar 18 00:08 | 11 Mar 18 23:59 | 9 |
| PlatinumSales_Merged4 | 13 May 18 16:32 | 12 Mar 18 00:09 | 9 |
| PlatinumSales_Merged5 | 12 Mar 18 00:16 | 12 Mar 18 00:16 | 9 |
| PlatinumSales_Merged6 | 21 Mar 18 00:20 | 12 Mar 18 00:20 | 10 |
| Silver System | 11 Mar 18 20:28 | 23 Oct 17 12:37 | 7 |

Version Preview

600 Validation Cells
Double Cell FormulaExt
Double Cell FormulaHer
Double Cell Const Double Cell Empty
Four Contrasts
Double Cell FormulaExt
Double Cell FormulaHer

*Builds (Scenarios) preview*

Aurora Project VII
Economic Case Tahiti 2017
300 Test
Equiv 2

EconEquivalence 1
All Trgt Selection
Valid Cells

*Scenarios preview*

Economic Case Tahiti 2017
Base Case - Copy test
Economic Case Tahiti - Copy
Scenario 31 Jan 18 01:27
Economic Case Tahiti - Copy (2)
Economic Case Tahiti - Copy (3)
Economic Case Tahiti - Copy (4)
Economic Case Tahiti - Copy (5)

Economic Case Tahiti 2017 - Copy (6)
300 Test
300 Test - Copy
Economic Case Tahiti 2017 - Copy (15)
Base Case - 2
Base Case - EndRun
Base Case
Base Case - Copy List of Models referenced by Versions / Commands
Models: WBk Equiv (Start) Links Alternate Target Model- May 2018.xlsb
Model Development - Copy (4).xlsb

| | B | C | D | E | F | G | H | I | J | K | L | M |
|---|---|---|---|---|---|---|---|---|---|---|---|---|
| 2 | Time Line | June16 | June17 | June18 | June19 | June20 | June21 | June22 | June23 | June24 | June25 | June26 |
| 3 | FX rate | | | | | | | | | | | |
| 4 | AU | 0.75 | 0.75 | 0.6 | 0.6 | 0.6 | 0.6 | 0.6 | 0.6 | 0.6 | 0.6 | 0.6 |
| 5 | US | 0.75 | 0.75 | 0.75 | 0.85 | 0.85 | 0.85 | 0.85 | 0.85 | 0.85 | 0.85 | 0.85 |
| 6 | NZ | 0.75 | 1 | 1 | 1 | 1 | 1 | 1 | 1 | 1 | 1 | 1 |
| 7 | Prices [G] 36 cells ($13$8:$M$10) | | | | | | | | | | | |
| 8 | Price A$ (real) | 2.5 | 2.5 | 1 | 1 | 1 | 1 | 1 | 1 | 1 | 1 | 1 |
| 9 | Price US$ (real) | 3.25 | 3.25 | 2 | 2 | 2 | 2 | 2 | 2 | 2 | 2 | 2 |
| 10 | Price NZ$ (real) | 3.9 | 3.9 | 3.9 | 3.9 | 3.9 | 3.9 | 3.9 | 3.9 | 3.9 | 3.9 | 3.9 |
| 11 | | | | | | | | | | | | |
| 12 | CPI A$ % | 2% | 2% | 2% | 2% | 1% | 1% | 1% | 1% | 1% | 1% | 1% |
| 13 | CPI US$ % | 1.96% | 3.00% | 3.00% | 3.00% | 3.00% | 2.00% | 2.00% | 2.00% | 2.00% | 2.00% | 2.00% |
| 14 | CPI NZ$ % | 1.85% | 2.00% | 2.00% | 2.00% | 2.00% | 1.00% | 1.00% | 1.00% | 1.00% | 1.00% | 1.00% |
| 15 | | | | | | | | | | | | |
| 16 | Index AU$ | 1.0000 | 1.0160 | 1.0323 | 1.0488 | 1.0593 | 1.0699 | 1.0806 | 1.0914 | 1.1023 | 1.1133 | 1.1244 |
| 17 | Index US$ | 1.0000 | 1.0300 | 1.0609 | 1.0927 | 1.1146 | 1.1369 | 1.1596 | 1.1828 | 1.2065 | 1.2306 | 1.2552 |
| 18 | Index NZ$ | 1.0000 | 1.0200 | 1.0404 | 1.0612 | 1.0718 | 1.0825 | 1.0934 | 1.1043 | 1.1153 | 1.1265 | 1.1378 |
| 19 | | | | | | | | | | | | |
| 20 | Price A$ (nom) | 2.5 | 2.54 | 1.03 | 1.05 | 1.06 | 1.07 | 1.08 | 1.09 | 1.10 | 1.11 | 1.12 |
| 21 | Price US$ (nom) | 3.25 | 3.32 | 2.12 | 2.19 | 2.23 | 2.27 | 2.32 | 2.37 | 2.41 | 2.46 | 2.51 |
| 22 | Price NZ$ (nom) | 3.90 | 3.98 | 4.06 | 4.14 | 4.18 | 4.22 | 4.26 | 4.31 | 4.35 | 4.39 | 4.44 |
| 23 | Sales (Units) | | | | | | | | | | | |
| 24 | AU | 123 | 120 | 125 | 45 | 23 | 130 | 45 | 130 | 100 | 130 | 130 |
| 25 | US | 12 | 12.60 | 13.23 | 13.89 | 14.59 | 15.32 | 16.08 | 16.89 | 17.73 | 18.62 | 19.55 |
| 26 | NZ | 90 | 89 | 123 | 123 | 123 | 123 | 123 | 123 | 123 | 123 | 123 |
| 27 | | | | | | | | | | | | |
| 28 | Revenue | | | | | | | | | | | |
| 29 | AU | | | | | | | | | | | |
| 30 | | $307.50 | $304.80 | $129.03 | $47.19 | $24.36 | $139.08 | $48.62 | $141.88 | $110.23 | $144.73 | $146.18 |

| | A | B | C | D | E | F | G | H | I | J | K | L |
|---|---|---|---|---|---|---|---|---|---|---|---|---|
| 1 | 101 FX rate AU | | | | | | | | | | | |
| 2 | AU | 0.75 | 0.75 | 0.75 | 0.75 | 0.75 | 0.75 | 0.75 | 0.75 | 0.75 | 0.75 | 0.75 |
| 3 | US | 0.6111 | 0.6111 | 0.6111 | 0.85 | 0.75 | 0.75 | 0.75 | 0.75 | 0.75 | 0.75 | 0.75 |
| 4 | NZ | 0.75 | 0.75 | 0.75 | 1.075 | 0.75 | 0.75 | 0.75 | 0.75 | 0.75 | 0.75 | 0.75 |
| 5 | 103 Price A$ (real) | | | | | | | | | | | |
| 6 | Price A$ (real) | 2.5 | 2.5 | 1 | 2.5 | 2.5 | 1 | 2.5 | 2.5 | 2.5 | 2.5 | 2.5 |
| 7 | Price US$ (real) | 3.25 | 3.25 | 2 | 3.25 | 2 | 2 | 2 | 3.25 | 3.25 | 3.25 | 3.25 |
| 8 | Price NZ$ (real) | 3.9 | 3.9 | 3.9 | 2 | 2 | 2 | 2 | 2 | 2 | 2 | 2 |
| 9 | 100 CPI A$ % | | | | | | | | | | | |
| 10 | CPI A$ % | 0.02 | 0.016 | 0.016 | 0.016 | 0.016 | 0.016 | 0.016 | 0.016 | 0.016 | 0.016 | 0.016 |
| 11 | CPI US$ % | 0.0196 | 0.03 | 0.03 | 0.03 | 0.03 | 0.03 | 0.03 | 0.03 | 0.03 | 0.03 | 0.03 |
| 12 | CPI NZ$ % | 0.0185 | 0.02 | 0.02 | 0.02 | 0.02 | 0.02 | 0.02 | 0.02 | 0.02 | 0.02 | 0.02 |
| 13 | 105 Taxation Rate AU | | | | | | | | | | | |
| 14 | AU | 0.3 | 0.29 | 0.28 | 0.27 | 0.26 | 0.25 | 0.25 | 0.25 | 0.25 | 0.25 | 0.25 |
| 15 | US | 0.25 | 0.25 | 0.25 | 0.25 | 0.25 | 0.25 | 0.25 | 0.25 | 0.25 | 0.25 | 0.25 |
| 16 | NZ | 0.27 | 0.27 | 0.27 | 0.27 | 0.27 | 0.27 | 0.27 | 0.27 | 0.27 | 0.27 | 0.27 |
| 17 | 102 Manufacturing Unit C | | | | | | | | | | | |
| 18 | Unit Costs A$ (re | 1 | 1.2 | 1.5 | 1.7 | 1.85 | 1.99 | 1.6 | 1.5 | 1.2 | 1.9 | 1.78 |
| 19 | TimeLine (String) | | | | | | | | | | | |

| | A | B | C | D | E | F | G | H |
|---|---|---|---|---|---|---|---|---|
| 1 | 300 Version 25Nov17,012745 | | | | 302 Cash Summary | | | |
| 2 | | | | | | Cash Flow Summary | | |
| 3 | | 1 | 11 | 21 | | Revenue AU | $307.50 | $304.80 |
| 4 | | 1 | 11 | 22 | | Revenue US | $39.00 | $41.77 |
| 5 | | 1 | 11 | 23 | | Revenue NZ | $351.00 | $354.04 |
| 6 | | 1 | 11 | 1.032256 | | Total Revenue AU | $523.13 | $525.46 |
| 7 | | 1 | 1.02 | 1.0609 | | | | |
| 8 | | 0 | 0 | 1.0404 | | Costs | | |
| 9 | | 8 | 11 | 0 | | Manufacturing AU | -123 | -146.3 |
| 10 | | 9 | 19 | 28 | | Sales & Marketing AU | -127.5 | -131.13 |
| 11 | | 10 | 20 | 29 | | HO Costs AU | -4.6 | -4.6736 |
| 12 | | 11 | 21 | 30 | | | | |
| 13 | | 12 | 22 | 31 | | Total Tax | -73.298 | -65.859 |
| 14 | | 13 | 23 | 32 | | NPAT | $194.73 | $177.49 |
| 15 | | 14 | 24 | 33 | | | | |
| 16 | | 15 | 25 | 34 | | | | |
| 17 | | 16 | 26 | 35 | | | | |
| 18 | | 17 | 27 | 36 | | | | |
| 19 | | 18 | 28 | 37 | | | | |
| 20 | | 19 | 29 | 38 | | | | |
| 21 | | 20 | 30 | 39 | | | | |
| 22 | | | | 40 | | | | |

2201

Economic Case Tahiti 2017

Run by John on 4-06-2018
Scenario created by John on 23-10-2017

Scenarios

| Sep | Versions/Commands | Description | Scenario | Created By | Created On | Active |
|---|---|---|---|---|---|---|
| 1 | Call Scenario: Base Case | Call Scenario from existing collection | Call Scenario: Base Case | John | 25-10-17 0:25 | |
| 2 | Calc Off | Set Manual-Calculate | Base Case | John | 16-03-18 17:50 | |
| 3 | 100 CPI A$ % | Base Case: 20Jan2017 Start Plan:"Aurora" | Base Case | John | 20-10-17 18:42 | |
| 4 | 101 FX rate AU | Base Case: 21Jan2017 Start Plan:"Aurora" | Base Case | John | 20-10-17 18:41 | |
| 5 | 102 Manufacturing Unit C | Base Case: 21Jan2017 Start Plan:"Aurora" | Base Case | John | 20-10-17 18:43 | |
| 6 | 103 Price A$ (real) | Base Case: 21Jan2017 Start Plan:"Aurora" | Base Case | John | 20-10-17 18:41 | |
| 7 | 104 Sales (Units) AU * | Base Case: 21Jan2017 Start Plan:"Aurora" | Base Case | John | 20-10-17 18:42 | |
| 8 | 105 Taxation Rate AU | Base Case: 21Jan2017 Start Plan:"Aurora" | Base Case | John | 20-10-17 18:43 | |
| 9 | 106 Sales and Marketing * | Base Case: 21Jan2017 Start Plan:"Aurora" | Base Case | John | 20-10-17 18:44 | |
| 10 | 107 HO Costs AU * | Base Case: 21Jan2017 Start Plan:"Aurora" | Base Case | John | 20-10-17 18:45 | |
| 11 | 108 Net Revenue * | Base Case: 21Jan2017 Start Plan:"Aurora" | Base Case | John | 20-10-17 18:45 | |
| 12 | 109 NPAT 20Oct17.184818* | Base Case: 21Jan2017 Start Plan:"Aurora" | Base Case | John | 20-10-17 18:48 | |
| 13 | Calc On | Set Auto-Calculate | Base Case | John | 20-10-17 18:50 | |
| 14 | End Run | End the scenario run (Quit) | Economic Case Tahiti 2017 | John | 21-03-18 19:27 | Deactivated |
| 15 | Log All On | Create a table report for every version | Economic Case Tahiti 2017 | John | 25-10-17 0:25 | |
| 16 | WaterFall On | Create a WaterFall report For every version | Economic Case Tahiti 2017 | John | 25-10-17 0:25 | |
| 17 | Chart Watch | Create a chert report & table of the listed output | Economic Case Tahiti 2017 | John | 20-11-17 22:58 | |
| 18 | Chart On | Create a Chart report for every version | Economic Case Tahiti 2017 | John | 05-11-17 23:04 | |
| 19 | Call Scenario: Base Case - 2 | Call Scenario from existing collection | Economic Case Tahiti 2017 | John | 20-03-18 0:10 | Deactivated |
| 20 | Base Case:22Jan2017 Start Plan:"Aurora" | Label for W/Fall | Economic Case Tahiti 2017 | John | 25-10-17 0:47 | |
| 21 | WaterFall Watch | Add a new change to the waterfall for the listed | Economic Case Tahiti 2017 | John | 22-11-17 20:23 | |
| 22 | Alternate TargetModel - May 2018.xlsb | Select an alternative target workbook | Economic Case Tahiti 2017 | John | 07-03-18 1:28 | |
| 23 | 200 CPI A$ % | Economic Case: Tahiti 2017 | Economic Case Tahiti 2017 | John | 22-10-17 13:32 | |
| 24 | WaterFall Watch | Add a new change to the waterfall for the listed | Economic Case Tahiti 2017 | John | 22-11-17 20:23 | |
| 25 | 208-B HO Costs AU * | HO Costs AU | Economic Case Tahiti 2017 | John | 08-05-18 23:14 | |
| 26 | 302 Cash Summary (Original Alt Link) | Cash Flow and NPAT summary | Economic Case Tahiti 2017 | John | 25-03-18 15:55 | Deactivated |
| 27 | 208 HO Cost AU (Original Link) | HO Costs AU | Economic Case Tahiti 2017 | John | 02-03-18 1:02 | Deactivated |
| 28 | 301 Summary 25Nov17.012912 (Original Link) | 301 Summary 25Nov17.012912 | Economic Case Tahiti 2017 | John | 25-11-17 1:29 | Deactivated |

FIG. 25

| | B | C | D | E | F | G | H | I | J | K |
|---|---|---|---|---|---|---|---|---|---|---|
| 1 | | | | | | | | | | |
| 2 | 203 Price A$ (real) | | | | | | | | | |
| 3 | Economic Case: Tahiti 2017 | | | | | | | | | |
| 4 | Scenario: Economic case Tahiti 2017 | | | | | | | | | |
| 5 | Run by Lugano on 4-06-2018 | | | | | | | | | |
| 6 | Time Line | | | June16 | June17 | June18 | June19 | June20 | June21 | June22 |
| 7 | Changing Inputs: | | | | | | | | | |
| 13 | 203 Price A$ (real) | INITIAL VALUES | Price A$ (real) | 2.5 | 2.5 | 1 | 2.5 | 2.5 | 1 | 2.5 |
| 14 | Economic Case: Tahiti 2017 | | Price US$ (real) | 3.25 | 3.25 | 2 | 3.25 | 2 | 2 | 2 |
| 15 | Created by Lugano on 22-10-2017 | | Price NZ$ (real) | 3.9 | 3.9 | 3.9 | 2 | 2 | 2 | 2 |
| 17 | | MOVEMENT | Price A$ (real) | 0 | 0 | 0 | -1.5 | -1.5 | 0 | -1.5 |
| 18 | | | Price US$ (real) | 0 | 0 | 0 | -1.25 | 0 | 0 | 0 |
| 19 | | | Price NZ$ (real) | 0 | 0 | 0 | 1.9 | 1.9 | 1.9 | 1.9 |
| 21 | | FINAL VALUES | Price A$ (real) | 2.5 | 2.5 | 1 | 1 | 1 | 1 | 1 |
| 22 | | | Price US$ (real) | 3.25 | 3.25 | 2 | 2 | 2 | 2 | 2 |
| 23 | | | Price NZ$ (real) | 3.9 | 3.9 | 3.9 | 3.9 | 3.9 | 3.9 | 3.9 |
| 25 | | | | | | | | | | |
| 26 | 204 Sales (Units) AU | INITIAL VALUES | AU | 123 | 120 | 125 | 130 | 130 | 130 | 130 |
| 27 | Economic Case: Tahiti 2017 | | US | 288 | 0.00 | 0.00 | 0.00 | 0.00 | 0.00 | 0.00 |
| 28 | Created by John on 22-10-2017 | | NZ | 90 | 89 | 123 | 123 | 123 | 123 | 123 |
| 30 | | MOVEMENT | AU | 0 | 0 | 0 | -85 | -107 | 0 | -85 |
| 31 | | | US | -278 | 12.60 | 13.23 | 13.89 | 14.59 | 15.32 | 16.08 |
| 32 | | | NZ | 0 | 0 | 0 | 0 | 0 | 0 | 0 |
| 34 | | FINAL VALUES | AU | 123 | 120 | 125 | 45 | 23 | 130 | 45 |
| 35 | | | US | 12 | 12.60 | 13.23 | 13.89 | 14.59 | 15.32 | 16.08 |
| 36 | | | NZ | 90 | 89 | 123 | 123 | 123 | 123 | 123 |

*FIG. 27A*

| | | | | | | | | |
|---|---|---|---|---|---|---|---|---|
| 205 Taxation Rate AU<br>Economic Case: Tahiti 2017<br>Created by John on 22-10-2017 | INITIAL VALUES | AU<br>US<br>NZ | 30%<br>25%<br>27% | 29%<br>25%<br>27% | 28%<br>25%<br>27% | 27%<br>25%<br>27% | 26%<br>25%<br>27% | 25%<br>25%<br>27% | 25%<br>25%<br>27% |
| | MOVEMENT | AU<br>US<br>NZ | 0%<br>0%<br>0% | 0%<br>0%<br>0% | 0%<br>0%<br>0% | 0%<br>0%<br>0% | 0%<br>0%<br>0% | 0%<br>0%<br>0% | 0%<br>0%<br>0% |
| | FINAL VALUES | AU<br>US<br>NZ | 30%<br>25%<br>27% | 30%<br>25%<br>27% | 30%<br>25%<br>27% | 30%<br>25%<br>27% | 30%<br>25%<br>27% | 30%<br>25%<br>27% | 30%<br>25%<br>27% |
| 206 Sales and Marketing<br>Economic Case: Tahiti 2017<br>Created by John on 22-10-2017 | INITIAL VALUES | AU<br>US<br>NZ | -$100.00<br>-$45.00<br>-$25.00 | -$101.60<br>-$46.35<br>-$25.50 | -$104.88<br>-$49.17<br>-$26.53 | -$109.99<br>-$53.73<br>-$28.15 | -$117.20<br>-$60.48<br>-$30.47 | -$126.88<br>-$70.11<br>-$33.65 | -$139.56<br>-$83.71<br>-$37.89 |
| | MOVEMENT | AU<br>US<br>NZ | $0.00<br>$0.00<br>$0.00 | $1.02<br>-$1.39<br>-$1.02 | $2.09<br>-$2.99<br>-$2.16 | $3.27<br>-$4.98<br>-$3.52 | $4.62<br>-$7.59<br>-$5.18 | $6.22<br>-$11.17<br>-$7.29 | $8.17<br>-$16.24<br>-$10.05 |
| | FINAL VALUES | AU<br>US<br>NZ | -$100.00<br>-$45.00<br>-$25.00 | -$100.58<br>-$47.74<br>-$26.52 | -$102.79<br>-$52.17<br>-$28.70 | -$106.73<br>-$58.71<br>-$31.57 | -$112.58<br>-$68.07<br>-$35.65 | -$120.67<br>-$81.28<br>-$40.92 | -$131.40<br>-$99.96<br>-$47.95 |
| Results:<br>Summary | INITIAL VALUES | Summary | | | | | | | |
| 3.203 Price A$ (real) | | | | | | | | | |

| | | | | June16 | June17 | June18 | June19 | June20 | June21 | June22 |
|---|---|---|---|---|---|---|---|---|---|---|
| 203 Price A$ (real) | | | | | | | | | | |
| Economic Case: Tahiti 2017 | | | | | | | | | | |
| Scenario: Economic case Tahiti 2017 | | | | | | | | | | |
| Run by John on 4-06-2018 | | | | | | | | | | |
| Time Line | | | | | | | | | | |
| Results: | | | | | | | | | | |
| Summary | INITIAL VALUES | | Summary | | | | | | | |
| Summary | | | Sales (Units) | 501.0 | 209.0 | 248.0 | 253.0 | 253.0 | 253.0 | 253.0 |
| Created by John on 22-10-2017 | | | Price A$/Unit | 2.1 | 2.4 | 1.9 | 1.8 | 1.8 | 1.2 | 1.9 |
| | | | Revenue A$ | 1065.9 | 494.1 | 471.1 | 451.4 | 459.4 | 309.3 | 475.9 |
| | | | COS A$ | (123.00) | (149.96) | (198.71) | (231.78) | (270.12) | (280.07) | (177.31) |
| | | | Sales & Marketing | -121.2 | -123.6 | -128.8 | -149.3 | -156.1 | -173.0 | -195.9 |
| | | | GM | 821.8 | 220.5 | 143.8 | 70.4 | 33.2 | -143.8 | 102.7 |
| | | | HO Costs Au | -4.6 | -4.7 | -4.8 | -5.1 | -5.4 | -5.8 | -6.4 |
| | | | Net Revenue | 817 | 216 | 139 | 65 | 28 | -150 | 96 |
| | | | Total Tax | -210.55 | -58.80 | -36.26 | -18.55 | -9.45 | $33.84 | -$27.66 |
| | | | NPAT | $606.47 | $157.05 | $102.68 | $46.76 | $18.36 | $115.79 | $68.62 |
| | | | NPV A$m | $639.19 | | | | | | |
| Total Initial Values | | | | | | | | | | |
| | MOVEMENT | | Summary | | | | | | | |
| | | | Sales (Units) | -276.0 | 12.6 | 13.2 | -71.1 | -92.4 | 15.3 | -68.9 |
| | | | Price A$/Unit | 0.2 | 0.0 | 0.0 | 0.7 | 0.9 | 0.8 | 0.7 |
| | | | Revenue A$ | -548.2 | 25.5 | 17.2 | -8.4 | -27.0 | 220.1 | -4.8 |
| | | | COS A$ | - | - | - | 151.55 | 222.33 | - | 115.93 |
| | | | Sales & Marketing | 0.0 | -0.9 | -1.9 | -4.4 | -6.1 | -9.2 | -13.6 |
| | | | GM | -548.2 | 24.7 | 15.3 | 138.7 | 189.2 | 211.0 | 97.5 |
| | | | HO Costs Au | 0.0 | 0.0 | 0.0 | 0.0 | 0.0 | 0.0 | 0.0 |
| | | | Net Revenue | -548 | 25 | 15 | 139 | 189 | 211 | 98 |
| | | | Total Tax | 137.04 | -$6.17 | -$0.15 | -$33.12 | -$46.10 | -$42.96 | -$21.72 |
| | | | NPAT | $411.12 | $18.50 | $15.11 | $105.58 | $143.12 | $168.01 | 75.82 |
| | | | NPV A$m | $15.96 | | | | | | |
| Total Movement Values | | | | | | | | | | |

*FIG. 27B*

| FINAL VALUES | Summary | | | | | | |
|---|---|---|---|---|---|---|---|
| | Sales (Units) | 225.0 | 221.6 | 261.2 | 181.9 | 160.6 | 268.3 | 184.1 |
| | Price A$/Unit | 2.3 | 2.3 | 1.9 | 2.4 | 2.7 | 2.0 | 2.6 |
| | Revenue A$ | 517.7 | 519.7 | 488.2 | 443.0 | 432.4 | 529.4 | 471.1 |
| | COS A$ | (123.00) | (149.96) | (198.71) | (80.23) | (47.79) | (208.07) | (61.38) |
| | Sales & Marketing | -121.2 | -124.5 | -130.5 | -153.7 | -162.2 | -182.2 | -209.5 |
| | GM | 273.5 | 245.2 | 159.0 | 209.1 | 222.4 | 67.2 | 200.2 |
| | HO Costs Au | -4.8 | -4.7 | -4.8 | -5.1 | -5.4 | -5.8 | -6.4 |
| | Net Revenue | 269 | 241 | 154 | 204 | 217 | 81 | 194 |
| | Total Tax | -$73.51 | -$64.97 | -$36.42 | -$51.66 | -$55.55 | -$9.12 | -$49.38 |
| | NPAT | $195.35 | $175.55 | $117.80 | $152.34 | $161.48 | $52.22 | $144.44 |
| | NPV A$m | $655.17 | | | | | | |
| Total Final Values | | | | | | | | |
| INITIAL VALUES | NPAT | $606.47 | $157.05 | $102.68 | $46.78 | $18.36 | -$115.79 | $68.82 |
| MOVEMENT | NPAT | -$411.12 | $18.50 | $105.58 | $143.12 | $18.36 | $168.01 | $75.82 |
| FINAL VALUES | NPAT | $195.35 | $175.55 | $117.80 | $152.34 | $161.48 | $52.22 | $144.44 |

109 NPAT 20Oct17.1848
Created by John on 22-10-2017 Start
Cretaed by John on 22-10-2017

3.203 Price A$ (real)

| Movement from: 203 Price A$ (real) to: 204 Sales (Units) AU | | | | | | | | | | | |
|---|---|---|---|---|---|---|---|---|---|---|---|
| 203 Price A$ (real); Economic Case: Tahiti 2017 | | | | | | | | | | | |
| 204 Sales (Units) AU; Economic Case: Tahiti 2017 | | | | | | | | | | | |
| Scenario: Economic Case Tahiti 2017 | | | | | | | | | | | |
| Run by John on 4-06-2018 | | June16 | June17 | June18 | June19 | June20 | June21 | June22 | June23 | June24 | June25 | June26 | |
| Time Line | | | | | | | | | | | | |
| Version | Units | Axis | | | | | | | | | | | Created By |
| 1  108 Net Revenue | Net Revenue | Primary | 0 | 0 | 0 | 33 | 34 | 194 | 37 | 38 | 39 | 41 | 42 | Created by John on |
| 2  109 NPAT 20 Oct17.184818 | NPAT | Primary | 0 | 0 | 0 | $23.81 | $23.18 | $141.27 | $23.45 | $24.40 | $25.38 | $26.38 | $27.41 | Created by John on |

| Movement from: Call VBA: New Manufacturing_UnitCosts to: 203 Price A$ (real) | | | | | | | | | | | |
|---|---|---|---|---|---|---|---|---|---|---|---|
| Call VBA: New Manufacturing_UnitCosts: Call VBA macro form open workbooks | | | | | | | | | | | |
| 203 Price A$ (real); Economic Case: Tahiti 2017 | | | | | | | | | | | |
| Scenario: Economic Case Tahiti 2017 | | | | | | | | | | | |
| Run by John on 4-06-2018 | | June16 | June17 | June18 | June19 | June20 | June21 | June22 | June23 | June24 | June25 | June26 | |
| Time Line | | | | | | | | | | | | |
| Version | Units | Axis | | | | | | | | | | | Created By |
| 1  108 Net Revenue | Net Revenue | Primary | 817 | 216 | 139 | 98 | 62 | 44 | 133 | -75 | 72 | -84 | -191 | Created by John on |
| 2  109 NPAT 20 Oct17.184818 | NPAT | Primary | $606.47 | $157.05 | $102.68 | $70.58 | $41.54 | $25.48 | $92.07 | -$63.85 | $46.47 | -$71.01 | -$150.94 | Created by John on |

9 Chart 203 Price A$ (real) | 9 Series 203 Price A$ (real) | 10 Chart 204 Sale (Units) AU | 10 Series 204 Sale (Units) AU ⊕ ▽

Economic Case Tahiti 2017
Movement from: Call VBA: New_Manufacturing_UnitCosts to: 203 Price A$ (real)
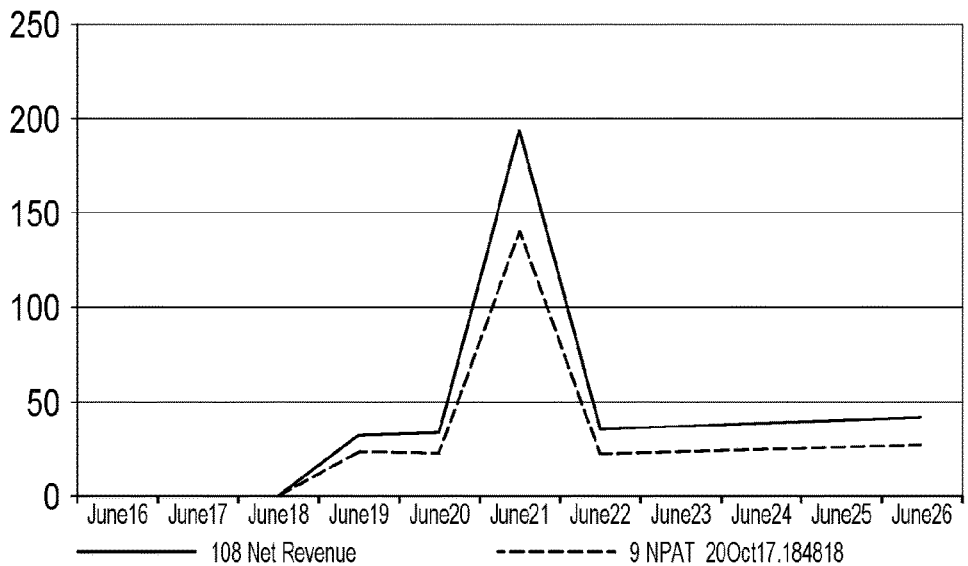
Economic Case Tahiti 2017
Price A$ (real)
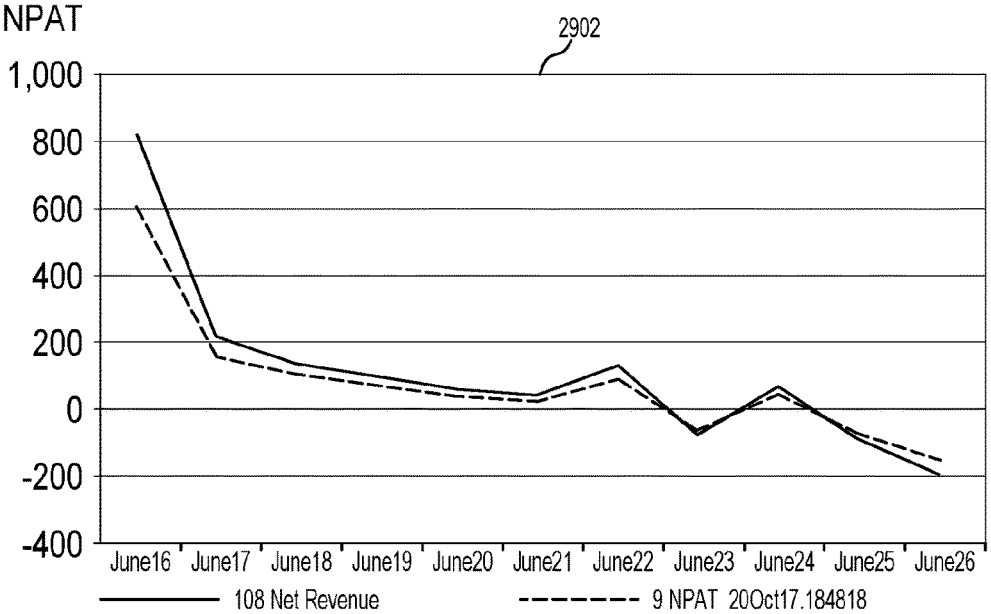
FIG. 29B

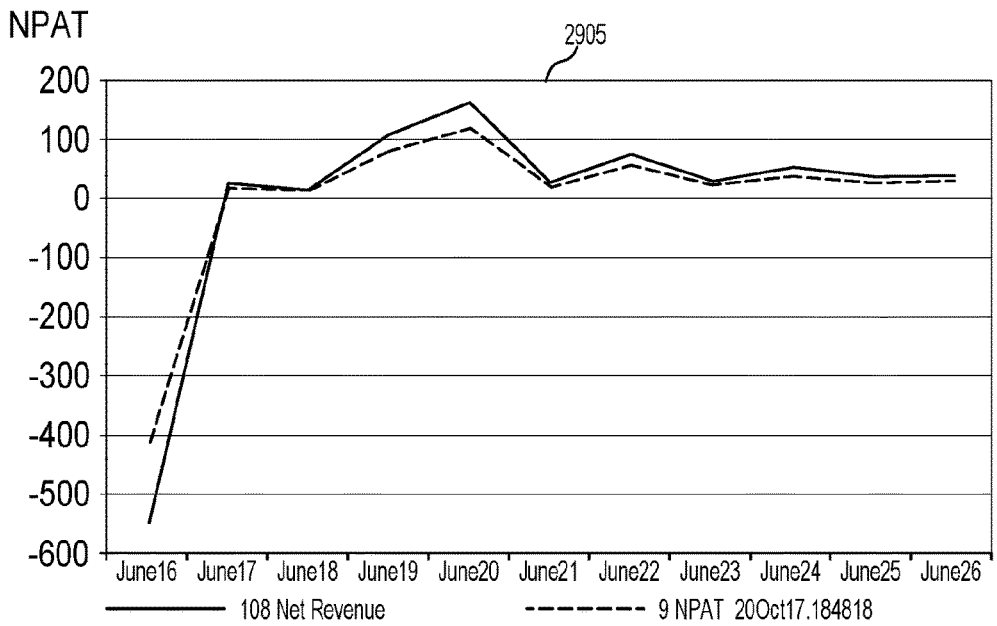
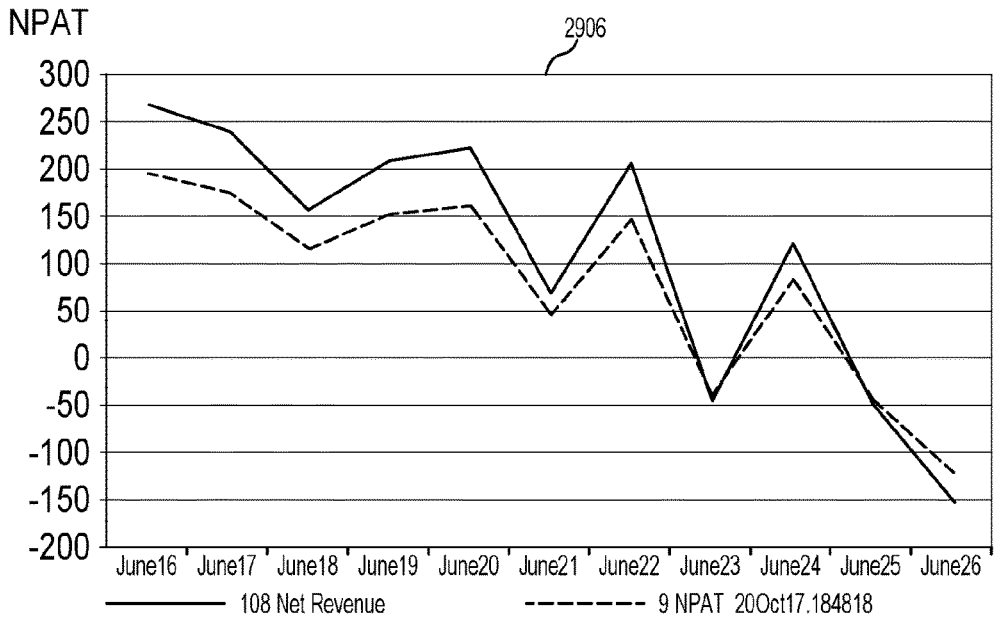
FIG. 29D

| | C | D | E | F | G | H | I | J | K | L | M |
|---|---|---|---|---|---|---|---|---|---|---|---|
| Time Line | June16 | June17 | June18 | June19 | June20 | June21 | June22 | June23 | June24 | June25 | June26 |
| FX rate | | | | | | | | | | | |
| AU | - | - | (0.15) | (0.15) | (0.15) | (0.15) | (0.15) | (0.15) | (0.15) | (0.15) | (0.15) |
| US | 0.14 | 0.14 | 0.14 | - | 0.10 | 0.10 | 0.10 | 0.10 | 0.10 | 0.10 | 0.10 |
| NZ | - | 0.25 | 0.25 | 0.25 | 0.25 | 0.25 | 0.25 | 0.25 | 0.25 | 0.25 | 0.25 |
| NZ | | | | | | | | | | | |
| Price A$ (real) | - | - | - | - | - | - | - | - | - | - | - |
| Price US$ (real) | - | - | - | - | - | - | - | - | - | - | - |
| Price NZ$ (real) | - | - | - | - | - | - | - | - | - | - | - |
| | | | | | | | | | | | |
| CPI A$ % | - | - | - | - | - | - | - | - | - | - | - |
| CPI US$ % | - | - | - | - | - | - | - | - | - | - | - |
| CPI NZ$ % | - | - | - | - | - | - | - | - | - | - | - |
| | | | | | | | | | | | |
| Index A$ | - | - | - | - | - | - | - | - | - | - | - |
| Index US$ | - | - | - | - | - | - | - | - | - | - | - |
| Index NZ$ | - | - | - | - | - | - | - | - | - | - | - |
| | | | | | | | | | | | |
| Price A$ (nom) | - | - | - | - | - | - | - | - | - | - | - |
| Price US$ (nom) | - | - | - | - | - | - | - | - | - | - | - |
| Price NZ$ (nom) | - | - | - | - | - | - | - | - | - | - | - |
| | | | | | | | | | | | |
| Total Revenue after Tax | | 97.51 | 64.61 | 77.15 | 10.32 | 9.91 | 32.95 | 9.58 | 9.67 | 9.77 | 9.87 | 9.97 |
| | | | | | | | | | | | |
| Cost of Sales | | | | | | | | | | | | |
| | | | | | | | | | | | |
| Manufacturing | | | | | | | | | | | | |
| Unit Costs A$ (real) | - | 0.03 | 0.04 | - | 0.10 | - | (0.36) | 1.00 | 0.04 | 0.04 | 0.36 |
| Manufacturing AU | - | (3.66) | (5.16) | - | (13.77) | - | 50.57 | (141.9) | (5.73) | (5.79) | (52.62) |
| | | | | | | | | | | | |
| Sales and Marketing | | | | | | | | | | | | |
| Sales and Marketing AU | (6.25) | (12.81) | 2.27 | 9.46 | 3.94 | 3.72 | 3.38 | 2.85 | 2.04 | 0.80 | (1.07) |
| | | | | | | | | | | | |
| HO Costs AU | - | - | - | - | - | - | - | - | - | - | - |
| | | | | | | | | | | | |
| Gross Margin | | | | | | | | | | | | |
| Revenue | 130.01 | 88.51 | 105.42 | 14.14 | 14.28 | 45.71 | 14.57 | 14.71 | 14.86 | 15.01 | 15.16 |
| Manufacturing AU | - | (3.66) | (5.16) | - | (13.77) | - | 50.57 | (141.9) | (5.73) | (5.79) | (52.62) |
| Sales & Marketing AU | (6.25) | (12.81) | 2.27 | 9.46 | 3.94 | 3.72 | 3.38 | 2.85 | 2.04 | 0.80 | (1.07) |
| GM | 123.76 | 72.04 | 102.52 | 23.60 | 4.45 | 49.44 | 68.51 | (124.3) | 11.17 | 10.02 | (38.54) |
| | | | | | | | | | | | |
| Fixed Costs | | | | | | | | | | | | |
| HO Costs AU | - | - | - | - | - | - | - | - | - | - | - |
| | | | | | | | | | | | |
| Net Revenue | 123.76 | 72.04 | 102.52 | 23.60 | 4.45 | 49.44 | 68.51 | (124.3) | 11.17 | 10.02 | (38.54) |
| | | | | | | | | | | | |
| Taxation | | | | | | | | | | | | |
| Tax on sales | (23.50) | (23.90) | (28.27) | (3.82) | (4.37) | (12.76) | (4.99) | (5.04) | (5.09) | (5.14) | (5.19) |
| Tax on Manuf Costs | - | 1.06 | 1.45 | - | 3.58 | - | (12.64) | 35.47 | 1.43 | 1.45 | 13.16 |
| Tax on Marketing Costs | 1.56 | 3.33 | (0.91) | (2.55) | (1.01) | (0.77) | (0.67) | (0.52) | (0.29) | 0.05 | 0.55 |
| Tax on HO Costs | - | - | - | - | - | - | - | - | - | - | - |
| Total Tax | (30.94) | (19.51) | (27.73) | (6.37) | (1.80) | (13.53) | (18.29) | 29.92 | (3.94) | (3.64) | 8.52 |
| | | | | | | | | | | | |
| Net Profit After Tax | | | | | | | | | | | | |
| NPAT | 92.82 | 52.53 | 74.79 | 17.23 | 2.65 | 35.91 | 50.22 | (94.40) | 7.22 | 6.38 | (30.02) |
| Growth Rate | | 0.04 | 0.19 | (0.09) | (0.12) | 1.52 | (0.77) | (1.66) | (2.12) | 0.40 | 0.67 |
| | | | | | | | | | | | |
| Cash Flow Summary | | | | | | | | | | | | |
| Revenue AU | - | - | - | - | - | - | - | - | - | - | - |
| Revenue US | - | - | - | - | - | - | - | - | - | - | - |
| Revenue NZ | - | - | - | - | - | - | - | - | - | - | - |
| Total Revenue AU | 130.01 | 88.51 | 105.42 | 14.14 | 14.28 | 45.71 | 14.57 | 14.71 | 14.86 | 15.01 | 15.16 |
| 4.FX Rate (Diff) | | | | | | | | | | | |

*FIG. 30*

SPREADSHEET AND METHOD FOR UPDATING SAME

TECHNICAL FIELD

The present invention generally relates to a spreadsheet program for creating, executing, and reviewing scenarios and auto-generating difference reports. In particular, this present invention relates to the processing and presentation of information by electronic spreadsheets.

BACKGROUND

The reference to any prior art in this specification is not, and should not be taken as an acknowledgement or any form of suggestion that the prior art forms part of the common general knowledge.

Spreadsheets are used extensively in organisations to evaluate the future impact of current decisions. Typically, organisation develop complex what-if scenarios and update their spreadsheet models with different versions of their input assumptions and then calculate the impact on future performance.

Spreadsheets are popular because, by design, they are extremely adaptable to new situations and are easy to update on the fly. Much of these advantages stem from their sophisticated GUI, extensive formula and tool set, and the absence of any enforced separation between values and formulas (allowing known values to be quickly replaced with predictive formulas for forecasting, or conversely for formulas to be overwritten with actual values).

The disadvantages of the foregoing method include difficulties in reproducing and documenting the changes made by the user. These issues are particularly problematic when assessing, reviewing and auditing the model outcomes. The spreadsheet itself does not include any inherent and explicit method to document changes and it becomes the user's responsibility to track and document all their changes accurately.

Consequently, the spreadsheet environment is not particularly good for users who must manage the multitude of what-if scenarios required by decision makers. Spreadsheet developers have tried to remedy these issues with additional tools. While these tools come in a variety of implementations, the best tools typically allow the user to maintain the version data for scenarios within the same spreadsheet eliminating the need for complex data switching algorithm. These tools, whilst helpful, are not sufficient to manage the volume of changes required today and do not support any step by step analysis.

The difficulty of these tools is that they update all the versions in one instance making it impossible to ascribe a particular output to any specific input assumption. The tools also do not provide any step by step reporting of the changes, or means to order the sequence of changes or adding precise labels or descriptions to the changes, or any single stepping mechanism for the user to review the intermediate changes in the model as they occur.

Very large projects may require: updating thousands or tens of thousands input values for each scenario, modifying key formulas in the model, and invoke visual basic programs to solve iteratively algorithm which cannot or are difficult to define explicitly.

In a typical evaluation cycle, users will collate the input data for a particular scenario, update the current model and document manually the impact of each input or input sequence and the corresponding output changes. With thousands of inputs the user(s) must select blocks of data to update. Many models are time based and the user would then typically update all the time elements for a particular item as one sequence (i.e.: capital costs for plant & machinery over the next ten years).

This manual process is time consuming, error prone, and may lead to issues of non-reproducibility. The processing time can be improved with multiple users updating the active models with data simultaneously, but this will be offset by a significant amount of time require in the planning, co-ordination and documentation of the changes made.

Once completed the outcomes will be reviewed by senior management for completeness and accuracy. The review team may request modifications of some of the input assumptions or request new scenarios combining existing versions in existing scenarios with new inputs.

The user may be faced with two difficulties. Firstly, the blocks of inputs which were updated may lack the level of granularity required for the review process when unexpected outcomes now require a detailed dive into the step changes to understand what drove the results. And secondly the user may need to update certain specific items without disturbing the remaining input assumptions.

Finally, the user will need to produce a new updated analysis pack for review. Since it's a manual process the user has two options: redo the evaluation cycle from the beginning which will maintain the integrity of the evaluation or, alternatively, calculate only the impact of the new changes and adjust the analysis pack accordingly. The later approach is faster as it builds from the prior completed work but is susceptible to human errors and may fail if the analysis results do not reconcile with the final model results.

These difficulties may be compounded as several analysis cycles may be required for each scenario and dozens of scenarios may be needed.

Spreadsheet financial models provide the valuation required to support critical business decisions and are consequently subject to scrutiny and audits which are difficult to conduct owing to the foregoing.

The preferred embodiment of the invention provides an improved electronic spreadsheet for auditing purposes.

SUMMARY OF THE INVENTION

According to one aspect of the present invention, there is provided an electronic spreadsheet updating method including:

navigating the spreadsheet to locate data to update;

executing updated scenarios for models using the located data; and generating reports relating to the executed updated scenarios.

Advantageously, the updated scenario models and associated generated reports may be saved, and later readily accessed once more when assessing, reviewing or auditing model outcomes. A record of all the changes made to the models may be provided in the form of a high-level script and all the necessary data may be saved allowing an auditor to fully reproduce the exact spreadsheet updates the user made. The auditor may scrutinize every step comparing before and after inputs and outputs. The auditor may also supplement his or her analysis by including additional customised reports to the high-level script.

The step of executing may involve executing scenario scripts in a sequential order allowing the impact of each step change to be automatically included in user specified reports.

The step of executing may involve pausing the sequential execution of scenario scripts to allow a user the opportunity to examine worksheets after each step change.

The method may further allow users to change the processing sequence of scenario script execution by re-ordering script items.

The method may further allow users to build scenario scripts and to select from a collection of pre-defined report commands which automatically compare user defined ranges before and after the changes made by the scenario scripts in tabular and/or graphical form.

The method may further allow users to include customized reports during scenario script execution. The user may create a customised range name in the spreadsheet which includes the data and text to report. The customised range name may be added to reporting commands. During scenario script execution, the reports may be generated and may automatically compare the user defined ranges before and after the changes made by the scenario script in the same format as the customised range name.

The method may further allow users to create and save new version data objects from a spreadsheet using existing range names or by creating new range names into a collection of version data objects suitable to build a scenario script.

The method may further allow users to build scenario scripts by using mouse drag and drop movements to manipulate and sequence the version data objects created from a spreadsheet, inserting/adding control commands, and/or copying existing script items.

The method may further allow version data objects to be managed, re-labelled, removed, and/or examined by allowing a user to navigate directly to source and target cells by key function press or mouse click using a context menu within the version object collection window.

The method may further store scenario scripts and the exact cell changes planned or implemented for review. Advantageously, this may facilitate locating and viewing the data using assigned function keys to automatically recall the cell addresses and display the data and the worksheet containing the data onto the computer display.

The method may further allow a saved scenario and version changes to be re-run for independent examination by other users.

The method may further allow users to create and save new versions of data of the existing spreadsheet model, which can include both or either constants and formulas (containing ranges as variables) within the cells of a selected range. Advantageously, including formulas allows the script to retain a complete record of all changes, including changes to formulas, for subsequent reviews. The inclusion of formulas is difficult as these must be reconfigured before they can be saved as a new version. Due to the intrinsic design of spreadsheets, with their relativistic rules for copying formulas, a straightforward copy approach is not workable when creating the version. The formulas are first reconfigured and then saved such that a straightforward and fast copy from the version back to the model produces the correct formula.

The method may further allow users to build scenario scripts which can include commands to call user defined VBA computer programs. This is advantageous for subsequent reviews as the script retains a complete record of all changes including complex subroutines executed by the VBA application.

The method may further involve a validation run which checks that the necessary components and objects for the scenario are available and loaded into computer memory without updating any spreadsheets. Advantageously, the validation run is a fast and effective way to identify missing components or any step failure before completing a large script execution run.

The step of navigating may further include allowing a user to detect a range name based on a spreadsheet cell selected by the user by extracting the range name from a dictionary of names and using the cell location as the matching key. The method may allow this dictionary of names to be created in advance as required by the user. Advantageously, named ranges can be found within the worksheet quickly and on the fly by the user without the distraction of searching for the name from alternate tools which may list names by category alphabetically.

The method may further allow users to build scenario scripts which can include commands to call other scenarios scripts previously built and saved by a user, in a manner similar to a subroutine call. This is advantageous for separating tasks which require repetitive execution. A common requirement may be for the main build scenario script to repeatedly reset spreadsheet models to their initial baseline values. A separate subroutine script which contains the versions with the initial values may be called whenever the initial baseline values are required prior to evaluating a new scenario.

The method may further allow saved subroutine scenario scripts to call other scenario scripts (nested calls). This is advantageous for separating tasks which require repetitive execution with complex data update pathways. Critically, to protect the user, nested calls which may lead to a circularity condition (which would create an infinite processing loop) are detected and disallowed.

The method may further allow users to build multiple scenario scripts within a work area which can be saved to a separate storage area.

The method may further allow previously completed scenarios located in a scenario storage area to be: visible to a user, examinable and inclusive of all the features of the scenarios in a build work area except for the limitation of adding and/or reordering commands. Advantageously, scenarios saved to the storage area are available to be called as scenario subroutines by other scenarios.

The method may further allow previously completed scenarios located in a scenario storage area to be moved and/or copied back and forwards between the build work area and the scenario storage area. Advantageously, the saved scenarios can be moved, copied and modified by the user to be repurposed into new scenarios.

The method may further allow a user to include report commands to generate reports for a complete record of the executed scenario and every step change and their impact on selected model outputs.

The method may further allow scenarios to be developed separately and simultaneously on copies of models by different users, and then combined into one merged scenario script. Advantageously, this reduces the time to complete new scenario updates as several users may develop different segments of their scenario scripts and versions simultaneously.

The method may further enable scenario scripts to reverse the copy direction allowing version values of existing versions to be updated with new values in the models. Advantageously, the reverse copy allows other groups which supply data to a modeling team to automatically update their output templates using a scenario script with the reverse copy command. The modelling team can then automatically update their model using the scenario scripts and version files supplied to them.

The method may further include creating a worksheet difference set using an existing worksheet as a template, the set includes a copy of the worksheet with values saved as constants and a difference worksheet with formulas in each cell calculating the change between the existing and copy worksheet cells. The appearance of the copy and difference worksheets are the same as the existing worksheet except for the numerical values in the cells.

The method may further reset the worksheet differences to evaluate zero by making the numerical values of the cells in the copy worksheet equal to the numerical values of the cells in the existing worksheets and recalculating the spreadsheet.

The method may further include enabling scenario scripts to create and update the copy and difference worksheets in spreadsheet models as specified by a user and inserting copies of these sheets into a reporting worksheet for analysis. Advantageously, this allows users to capture a snap shot of the differences between each selected step in a familiar user defined format. As an example of this embodiment the user may select a custom-built summary worksheet or alternatively use existing worksheets to generate a snap shot report. After the scenario script execution, the snap shot report will show a cascade of data changes as the new inputs flow through the summary worksheet. A user may wish to select several or all the worksheets in the model for a detailed step by step snap shot report (subject to available computer memory, spreadsheet application limitations, and calculation time constraints). This provides a very detailed checking tool to review and assess that every change cascaded correctly through the model.

The method may further include managing scenario development and execution using a three-column layout for any one or more of a versions object collection, a scenario build area and a scenario storage area. Advantageously, all the objects and controls to create or edit a scenario script are grouped together in one visible GUI which incorporates quick mouse drag and drop actions to move objects and context sensitive menus for commands.

The method may further define version objects and command objects in the versions collection and scenario scripts with a unique key identifier. All new or copied objects are preferably created with a new unique key. Objects are preferably retrieved by their unique key identifier and not their label. Advantageously, users may rename the version and scenario objects using labels which may better describe the nature of the step change in the reports generated by the scenario script.

The method may further allow the scope of a single scenario scripts to update multiple spreadsheet files. Advantageously, a user does not need a separate scenario script for each spreadsheet file rather the method can access and interact with any spreadsheet file opened in the same application instance.

The method may further determine equivalent models to be used in scenario scripts based on a minimum of common text strings in the model name. This is advantageous for users who habitually rename newly updated file, by adding a postfix or prefix identifiers to the name stem. The equivalence algorithm matches the required file name automatically with the name stems of open files and uses these matched files in the scenario scripts without requiring renaming of the scenario and version objects. A feedback indicator informs the user of the success of the match.

The embodiment may be applied to any Microsoft Excel spreadsheet as is. The embodiment may add any additional objects to the user's spreadsheet as required and under user control.

An embodiment of the present invention may comprise a Microsoft Excel VSTO add-in written in Microsoft VB.NET. The add-in may be compiled code installed by the user into their Microsoft Excel application (requiring a current version of Microsoft Excel to be installed). Once loaded a new menu ribbon may be installed in Excel, allowing the user access to the improved electronic spreadsheet in accordance with an embodiment of the invention. The present invention, is not limited to any particular application or any particular environment or any particular type of form or graphical user interface. Instead, those skilled in the art will find that the system and methods of the present invention may be advantageously applied to a variety of spreadsheet systems and application software, including database management systems, and the like.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 2 is a bitmap screenshot of the scenario manager form which is the main GUI for the software.

FIG. 3 is a bitmap screenshot of the File tab in the scenario manager form, the File tab being used to open and create scenario files.

FIG. 18 is a bitmap screenshot of the Names Navigation form which is used to locate and display range names in the worksheets.

FIG. 19 is a bitmap screenshot of the Names Navigation form context menu used to tag a label next to the range names in the worksheets and draw a box around the range name cells.

FIG. 20 is a bitmap screenshot of a sample spreadsheet model showing label tag and box around the range name cells.

FIG. 21 is a bitmap screenshot of a sample scenario spreadsheet model showing copied values in the horizontal configuration.

FIG. 22 is a bitmap screenshot of a sample scenario spreadsheet model showing copied values in the vertical configuration.

FIG. 25 is a bitmap screenshot of a sample report listing a complete scenario script.

FIG. 27A is the top segment of a bitmap screenshot of a sample report for combined versions showing before and after values for each version and selected ranges.

FIG. 27B is the bottom segment of a bitmap screenshot of a sample report for combined versions showing before and after values for each version and selected ranges.

FIG. 29A is a bitmap screenshot of a segment of a sample version change report showing the initial values.

FIG. 29B is a bitmap screenshot of a segment of a sample version change report showing the initial values in chart form.

FIG. 29D is a bitmap screenshot of a segment of a sample version change report showing the movement and final values in chart form.

FIG. 30 is a bitmap screenshot of a sample report showing the difference worksheet of a snap shot report, noting that cells with no differences are shown with dashes.

DETAILED DESCRIPTION OF PREFERRED EMBODIMENTS

System Software

Figure 1:
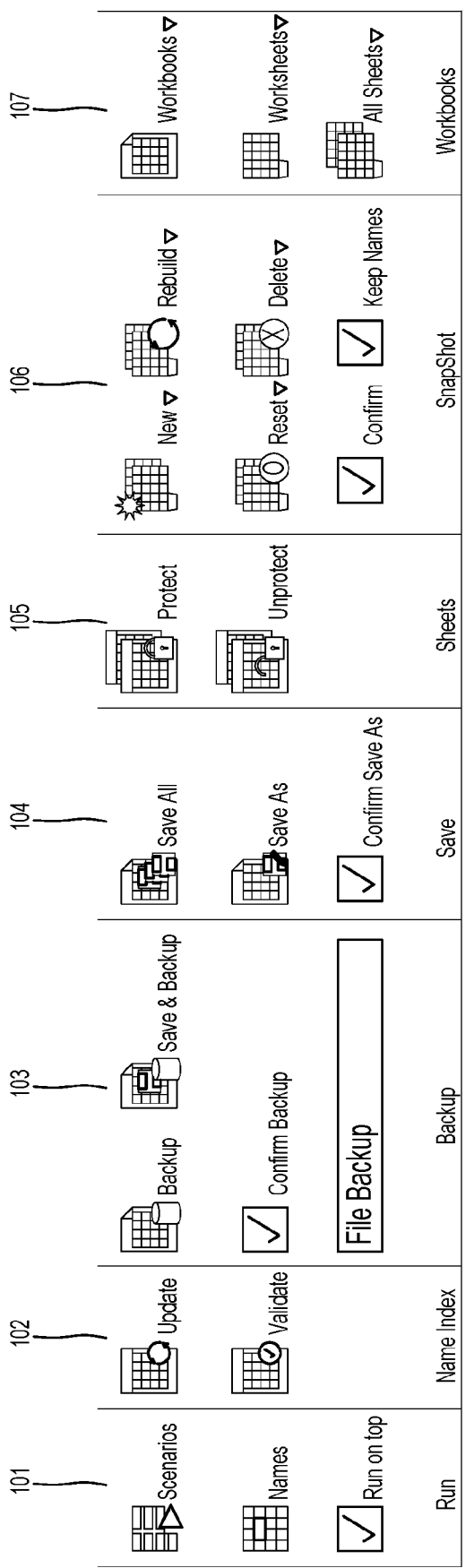
FIG. 1 is a bitmap screenshot of the excel ribbon menu of an embodiment of the invention showing the application level commands.

The following description will focus on the presently preferred spreadsheet embodiment of the present invention, which are embodied in the Microsoft Excel application, Microsoft VB.NET and Microsoft Visual Studio for Office Tools in the Microsoft Windows environment.

The present invention, however, is not limited to any particular application or any particular environment. Instead, those skilled in the art will find that the system and methods of the present invention may be advantageously applied to a variety of spreadsheet systems and application software, including database management systems, and the like. Moreover, the present invention may be embodied on a variety of different platforms, including Apple Mac PC's, and the like. Therefore, the description of the exemplary embodiments which follows is for purposes of illustration and not limitation.

In the Microsoft Excel spreadsheet nomenclature, spreadsheet files are referred to as workbooks, and the tabbed sections within the workbook file as worksheets. In addition to referencing the workbook files, embodiments of the invention also create and refer to its own scenario files and tracking files. Herein, scenario workbooks refer to the location where the different versions of the data are saved and model workbooks refer to the location where the spreadsheet model developed by the analyst is saved.

Windows Interface

Figure 18:
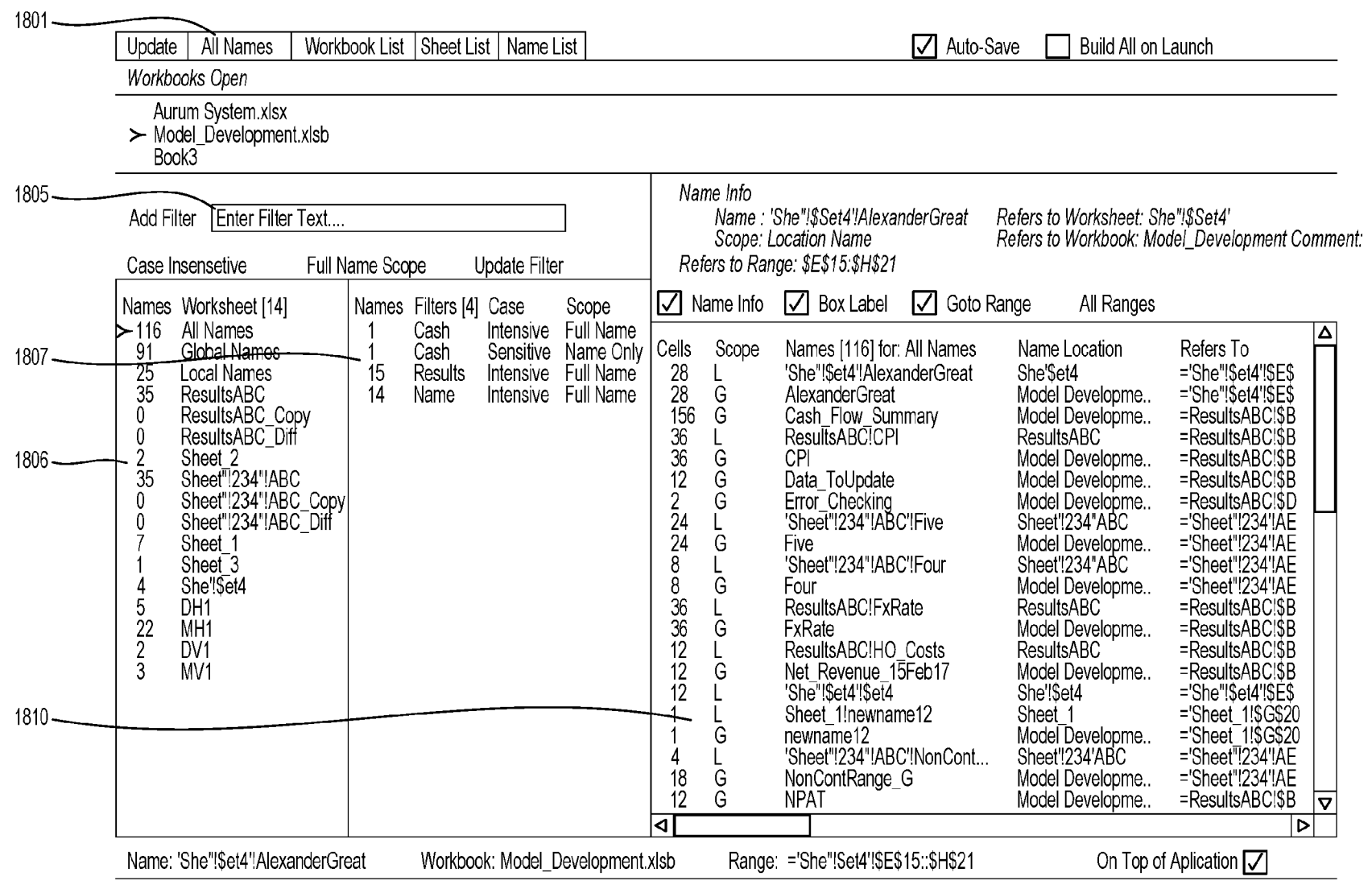

The spreadsheet software is accessed through 3 primary graphical user interfaces (GUI): a ribbon menu bar (FIG. 1), a multi-tab windows form for the scenario manager (FIG. 2), and the Names Navigation form (FIG. 18). Additional forms or display boxes are shown during user interaction to confirm user commands or provide feedback or error messages.

The ribbon menu bar consists of element specific to the present embodiment of the invention with several user command choices, each of which may invoke additional submenus. These commands drive the interaction between the invention and the spreadsheet application and provide the commands to load the scenario manager and the names navigation windows forms (item 101).

A ribbon menu may include buttons to launch the two windows forms: a scenario manager and a range name navigation tool (item 101). The menu may also include options and tools for updating the range names index lookup file (item 102), backup tools to copy the active files to a backup folder (item 103), save tools to save the open workbooks (item 104), worksheet protect and unprotect tools (item 105), tools to generate differential worksheets for analysis (item 106), and a workbook/worksheet quick navigation tool (item 107).

The main GUI of the preferred embodiment of the invention is the scenario windows form. The form comprises 7 tabs (FIG. 2) and two status notification rows at the top and bottom of the form (items 208 and 209). The first three tabs: Files (item 201), Version (item 202) and Scenarios (item 203) are used to activate, create and edit the scenarios, the next three tabs are high level tools: Modify (range name sizes, item 204), Merge (scenario files, item 205) and Rename (workbook name references within scenario files, item 206). The last tab includes options and settings (item 207).

Windows forms include a screen cursor or pointer for selecting and otherwise invoking screen objects (i.e.: control buttons). In response to user movement signals from the pointing device the cursor moves across the screen to a desired screen location. During or after cursor movement, the user can generate user-event signals (i.e., mouse button clicks and drag & drop) for selecting and manipulating objects.

In a preferred embodiment, the screen cursor is controlled with a mouse device, using the tab key to switch between objects or key short-cuts. More preferably, the screen cursor control device is a two-button mouse device (right and left mouse buttons) with a scroll wheel (typically in the middle) to move up or down lists of items in tree or list views.

VSTO Add-in

The software application is written in Microsoft Visual Basic .NET (VB.NET) with Microsoft's Visual Studio Tools for Office (VSTO) development tools add-in (project templates) using Microsoft Visual Studio as the integrated development environment (IDE) for developing code in the VB.NET language.

VB.NET is a multi-paradigm, object-oriented programming language, implemented on the .NET Framework developed by Microsoft that runs primarily on the Microsoft Windows operating system.

The Visual Studio Tools for Office (VSTO) development tools add-in is used to expose the Microsoft Office development tools functionality via the .NET Framework. This allows extensions to the Office applications to be written in VB.NET and access to the functionality and user interface constructs from Office applications.

Microsoft Visual Studio IDE is used to create the code for the invention and to compile the code into an application-level add-in for Microsoft Office Excel. The application add-in is then distributed to users and installed onto their computers. Once installed and after the user launches Microsoft Excel, the Excel ribbon menu bar will now include the scenario manager menu items (FIG. 1).

Description of the Interface

The user interacts with the software through three graphical user interfaces (GUI): a ribbon menu bar (FIG. 1), a multi-tab windows form for the scenario manager (FIG. 2), and the Names Navigation form (FIG. 18).

The ribbon menu bar is used to launch the two forms and access various tools specific to the scenario manager.

A key structure within most spreadsheet software applications is a named range of cells. A range refers to a selection of cells in the worksheet (in the workbook file) and a named range refers to the addresses of the selected cells which have been saved to a unique user defined name (item 2001). The named range is saved within the workbook where it is created.

While specific naming rules may differ between spreadsheet applications, in some spreadsheet applications names may be global (scoped to any cells within the whole workbook) and/or local (scoped to a specific worksheet). The same name may, therefore, be used to label a global range name and one local range names in each worksheet.

Range names are a convenient short hand to access specific collection of cells. In addition, the cell addresses specified by range names are expected to update dynamically as the workbook structure is modified. Specifically, if a new row is added above the cells referenced in a range name then the row component of the cell addresses in the name, which are below the insertion point, are incremented by one row. Similar operations apply for row deletions (decrease of one row) and column insertions or deletions. This dynamic update is performed by the spreadsheet software application.

Figure 13:
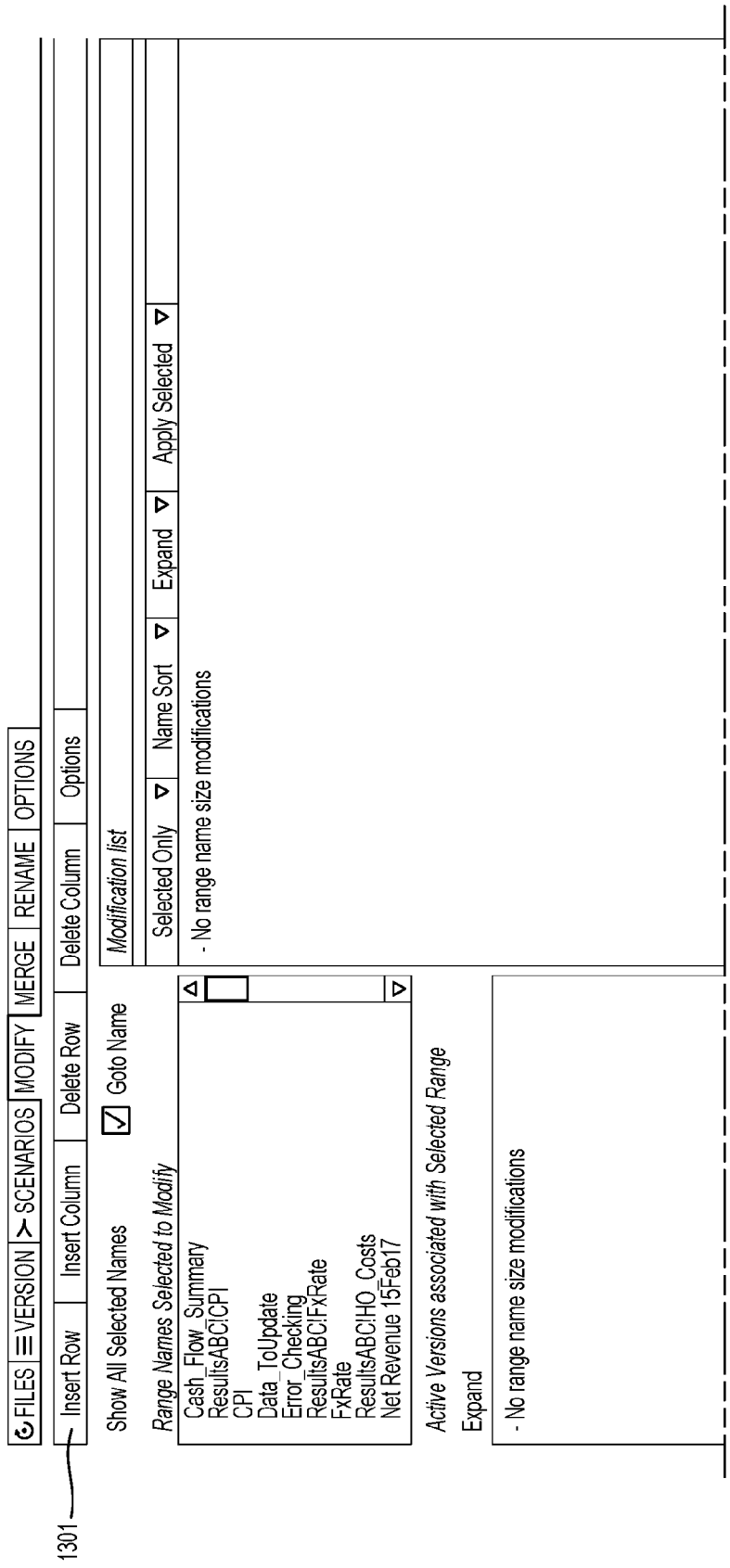
FIG. 13 is a bitmap screenshot of the Modify tab in the scenario manager form, the Modify tab being used to change the size of existing ranges in the spreadsheet and version objects.
Figure 14:
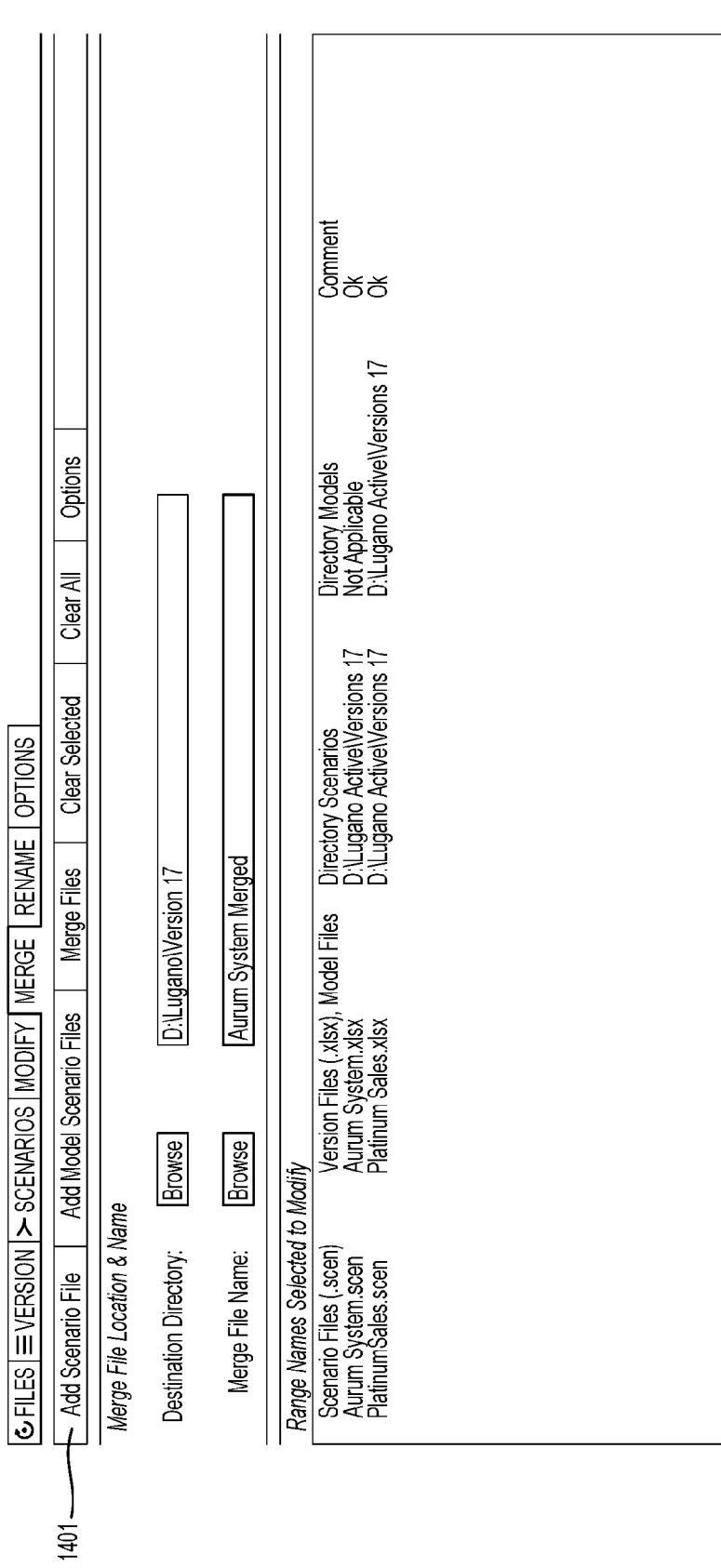
FIG. 14 is a bitmap screenshot of the Merge tab in the scenario manager form, the Merge tab being used to combine scenario spreadsheets and files developed separately into one scenario.

The scenario manager form provides the user controls to create and save the named ranges (item 402), review the versions and cell contents (item 504), build the scenario scripts from the saved range names (item 509), manage the modification of range names already selected as version within scenarios (FIG. 13), merge the scenario scripts including the saved scenario data (FIG. 14), rename the active workbook in the existing version and command objects (FIG. 15) and manage the file storage of the version data and objects (FIG. 3).

In developing scenarios, a user may wish to use an existing range name within an existing workbook. Typically, there are build-in tools within the spreadsheet application to assist users in locating their named ranges. The basic approach is to locate the name of the range from a list of all names using a range name manager tool, then by selecting or clicking on the target name the built-in tool will refresh the display to highlight the cells referenced by the selected range name.

The Names Navigation form is a dedicated application tool to assist users with finding their range names (FIG. 18). The Names Navigation form lists all the range names (item 1810) but with enhancements. Once the full list of names and addresses is created it is saved to a file to be re-used. This reduces wait time, especially if the number of named ranges is very large, as the list is only periodically updated as and when new names are added to the workbook. Other enhancements include easier navigation and selection of items by using a large display area (expand to full monitor size), the ability to place/remove coloured boxes/tags around the range names for easier recognition in the spreadsheet (items 1901 and 2001), and name filters to search for particular text string (items 1805 and 1807).

An alternative approach, available in the scenario manager, is to automatically list those range names (item 407) which contain a specific worksheet cell selected by the user using their mouse cursor. This approach, which is more intuitive for the user, requires an index file which is generated before or during the work session (item 102: "Update" button). Once created the index file is updated with any new range names created by the user, provided these are created using the scenario manager form (item 402). The index file requires updating after any spreadsheet restructure involving adding or creating rows or columns. Creating the index file does not add to, or modify in any way the user's source workbooks.

Consequently, the user has the option of finding the desired cells to update by either selecting the name of the range from a list (item 1810) or finding existing names by selecting specific cells (item 407). The index file is not used nor needed for the creating of version objects nor the running of scenario scripts. It is only a navigation aid to quickly find those cells belonging to a range name.

Menu Ribbon

Once the software has been installed to the user's computer (which must also have a current version of Microsoft Excel installed) a new menu ribbon becomes available, allowing the user access to the spreadsheet with improved functionality.

The menu ribbon of the invention includes 7 tabs, labelled: Run, Names Index, Backup, Save, Sheets, Snapshot and Workbooks (FIG. 1).

Run

Scenarios (item 101) launches the scenario manager form (FIG. 2) which is used to develop and manage scenarios, and Names launches the Names Navigation form (FIG. 18) which is used to find and select named ranges.

Names Index

Update (item 102) creates a new names index file. The name index file provides an alternative approach to finding range names. The Names Navigation form lists all the range names which allows the user to find and select ranges. With a names index file, the user selects a cell within the worksheets and the software list only those user created names which contain the selected cell within their range (item 407).

Validate is a fast way to check that all range names are included in the names index file. Validation is a faster way to detect inconsistencies when the number of range names is very large (over a thousand). Update is then used if the validation detects that a new name is missing or different from the properties saved in the names index file.

Backup

Backup (item 103) is a tool to help the users to archive their work. If invoked, then all open excel workbooks and all the active scenario files are copied to a new date stamped folder. The name of the folder may be set by the user with the date stamp added automatically.

Save

Save All (item 104) is a shortcut tool to save all the currently open workbooks. Save As saves the currently active workbook under a new name (as prompted by the software) and updates all the version and command objects in the currently active scenario file with the new workbook name.

Sheets

Version data is saved to worksheets with a protected default setting. This ensures that protected worksheets are not inadvertently changed by users while reviewing their data. The Protect (item 105) button locks the worksheet and prevents editing. The Unprotect button lifts the protection to allow advanced users to make changes to their data.

Snap Shot

The snap shot tool (item 106) allows the user to create difference sheets to visualise the impact of changes made to the active worksheet in the model. The active worksheet is the source worksheet for difference visualisation and retains the original model formulas. The active worksheet remains unaffected by the snap shot algorithm.

A snap shot is a worksheet with the exact same layout as the active worksheet but with each formula cell displaying the difference between the equivalent cells in the active worksheet and a copy of the cell value created before the changes and saved in a worksheet copy. Equivalent cells are all the cells in the same position (cell address) but on different worksheets. To increase clarity, zero value cells (indicating no change) are suppressed and displayed as a dash. Those cells which are blank or contain text in the active worksheet retain their original values in the difference sheet (FIG. 30).

The values of the cells before the model changes are generated by the snap shot ribbon command (item 106: "New" button) as an identical worksheet copy of the active worksheet and is inserted after the active worksheet. All the cells with numeric formulas are converted to constants reflecting their current value. Once the snap shot is completed the workbook contains two additional worksheets: a copy of the active worksheet before changes with all formulas replaced by their numeric values and a difference worksheet with all formulas replaced by a formula representing the difference between the copied value and the current active value.

The toolbar commands (item 106) are used to create new copy and difference worksheets, reset the copy values to reflect the current active sheet value (effectively resetting all difference to zero), delete the copy and difference sheets, re-build the copy and difference sheets by deleting and re-creating the sheets (this option is typically used after completing structural changes to the active worksheet).

A snap shot can be used either as a standalone feature or included in the reports generated by the scenario script. Upon execution of the script, the difference worksheets will be created (if not already in existence), updated by resetting the copy sheets, and a snap shot report will be auto-generated for those steps specified by the user Workbooks Workbooks (item 107) contains a collection of workbook and worksheet navigation tools used as shortcuts to select any workbook currently open or any worksheet in any open workbook.

Scenario Manager Form

The scenario manager form (FIG. 2) is the primary GUI for creating, editing and running scenarios. This form contains 7 tabs: Files (to select and load the active scenario), Versions (to create the alternate version data objects), Scenario (to edit and run scenarios), Modify (to change the size of existing version object ranges in the existing scenarios), Merge (to combine scenarios created separately), Rename (to change the target scenario workbook name in existing scenarios) and Options (additional parameters and settings for the other tabs).

File Names

The software creates three specific files to maintain and save the users' scenarios. These files are distinguishable by their extensions: scen (referred to as a SCEN file), nndx (referred to as a NNDX file) and nmod (referred to as a NMOD file) (items 3103, 3104, & 3107 respectively). The software also generates a standard Excel workbook to save the version values and various workbook reports.

The purpose of these specific files are as follows:

The SCEN file contains the dictionaries for the version and scenario properties created by the user. A SCEN file is created for every scenario workbook and is saved in the same directory with the same file name as the scenario workbook.

The NNDX file contains parameters for both the index of the range names for rapid lookup of range names from the address of selected cells and the saved names used by the Names Navigation tool. An NNDX file is created for each workbook with scenarios or which was analysed by the names navigation tool. NNDX files can be readily updated and recreated as needed.

The NMOD file contains parameters to modify the range of selected names. An NMOD file is created for each workbook with modified ranges. The NMOD is used to update older scenarios files created prior to the model changes which the user also needs to update.

Both the NNDX and NMOD files are saved in the same directory and with the same file name as the workbook whose parameters are saved.

Files Tab

The file tab (FIG. 3) is used to open and load available scenarios. Each scenario always consists of two files with the same name: an Excel workbook (with a xlsx extension, item 3106) and a scenario file (SCEN file, item 3107) which are generated and updated by the software. These files are saved in the same scenario directory (item 3105). The user finds the scenario file using the "Browse File" or "Browse Folder" buttons (item 302). Clicking either item will open the standard window's file dialogue form, which the user can browse for the folder or file to upload. All the scenario files in the selected folder are displayed in list view (item 303) and the users can change their selection by clicking the scenario file name in the list view control. The selected scenario is the active scenario and is shown as the active scenario in the bottom status bar (item 209).

Version Tab

Figure 4:
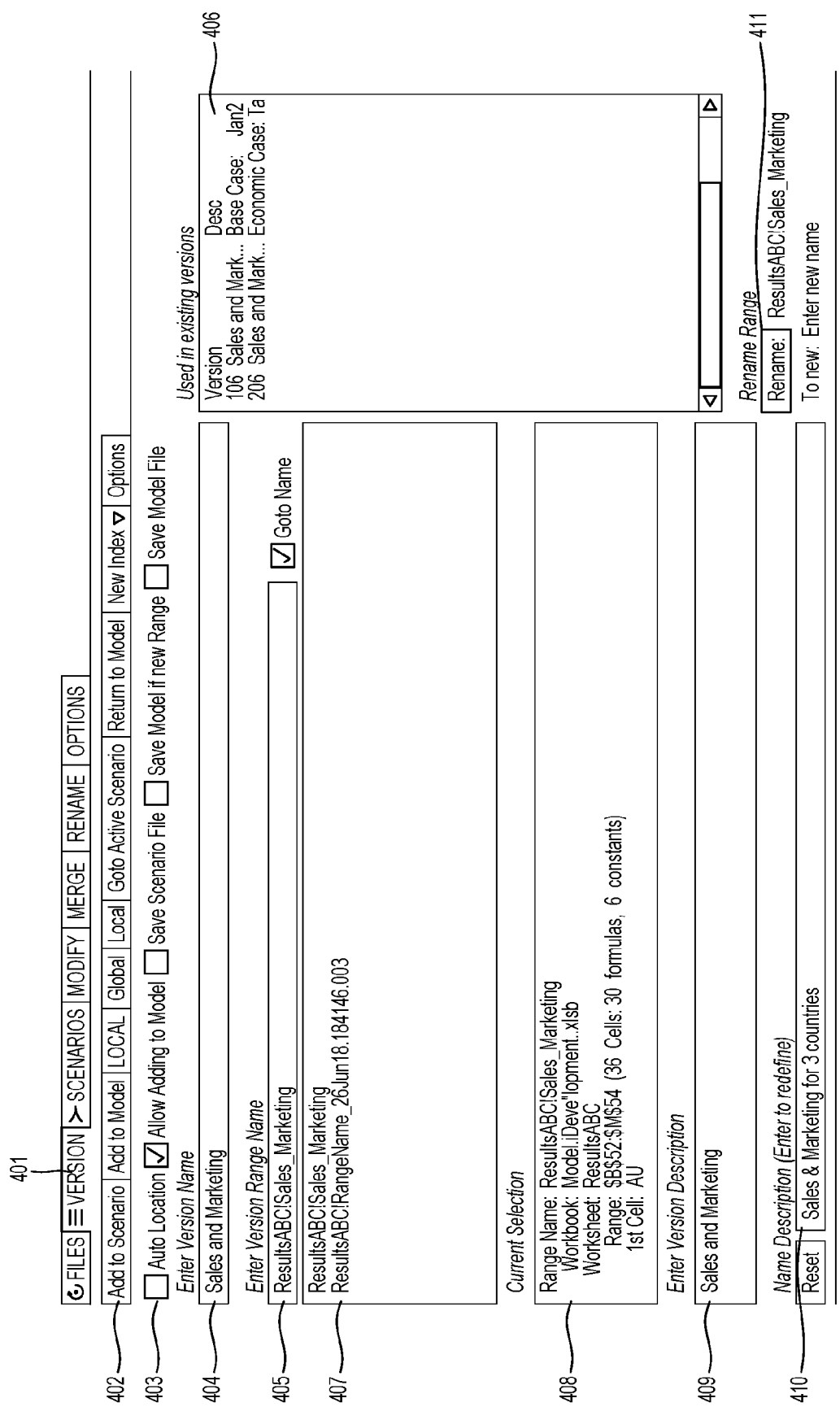
FIG. 4 is a bitmap screenshot of the Version tab in the scenario manager form, the Version tab being used to create and load version objects for the scenario build process.

The version tab (FIG. 4) allows the users to save new data sets (version objects) to the scenario files. Once saved the user can then manipulate these objects to create a scenario script in the Scenario tab.

The user navigates to the cells they wish to update or simply save (using the original data). Once the first cell is selected the range names containing this cell are listed in the version range name list view (item 407).

The user can select an existing range name (item 407) and update the selection with new data or create a new range. In the latter case, the user updates the selected cells and use their mouse to select the block of contiguous cells to save and enter a new range name in the text box (item 405).

After updating the cell data and selecting the appropriate range, the users may enter a new name for the range (item 405) or use the existing name (item 407), enter the version name (item 404) for the scenario scripting, enter a version description (item 409), and a range comment (item 410).

Once all the data, descriptors and names are updated, the user creates the new version by clicking either the 'Add to Scenario" or "Add to Model" buttons (item 402). The former button adds the cell data to the active scenario workbook, while the later button adds the cell data to auto-generated worksheets in the active model. The version object properties are always saved to the scenario file created by the software (the SCEN file, item 3107). Simultaneously the version object collection in the scenario tab is updated with the newly created version (item 504).

Note the detection of the range name by selecting cells is dependent on an updated names index file for the active workbook (the NNDX file, item 3103). If there is no names index file, then the user may select the exact range of cells: either by selecting contiguous cells with the mouse or selecting names from the names list view in the Names Navigation form (item 1810). The software also searches the range name collection for any cell addresses which match the selected cell address, however the search is aborted after 100 milli-seconds (or a user defined maximum time as set in the Version Option, item 1601), to prevent excessive delays for large range name collections comprising 1000's of names.

The tab also includes controls to rename range names (item 411). Using these controls the software updates the names in both the model workbook and all the active scenario file.

Scenarios Tab

Figure 5:
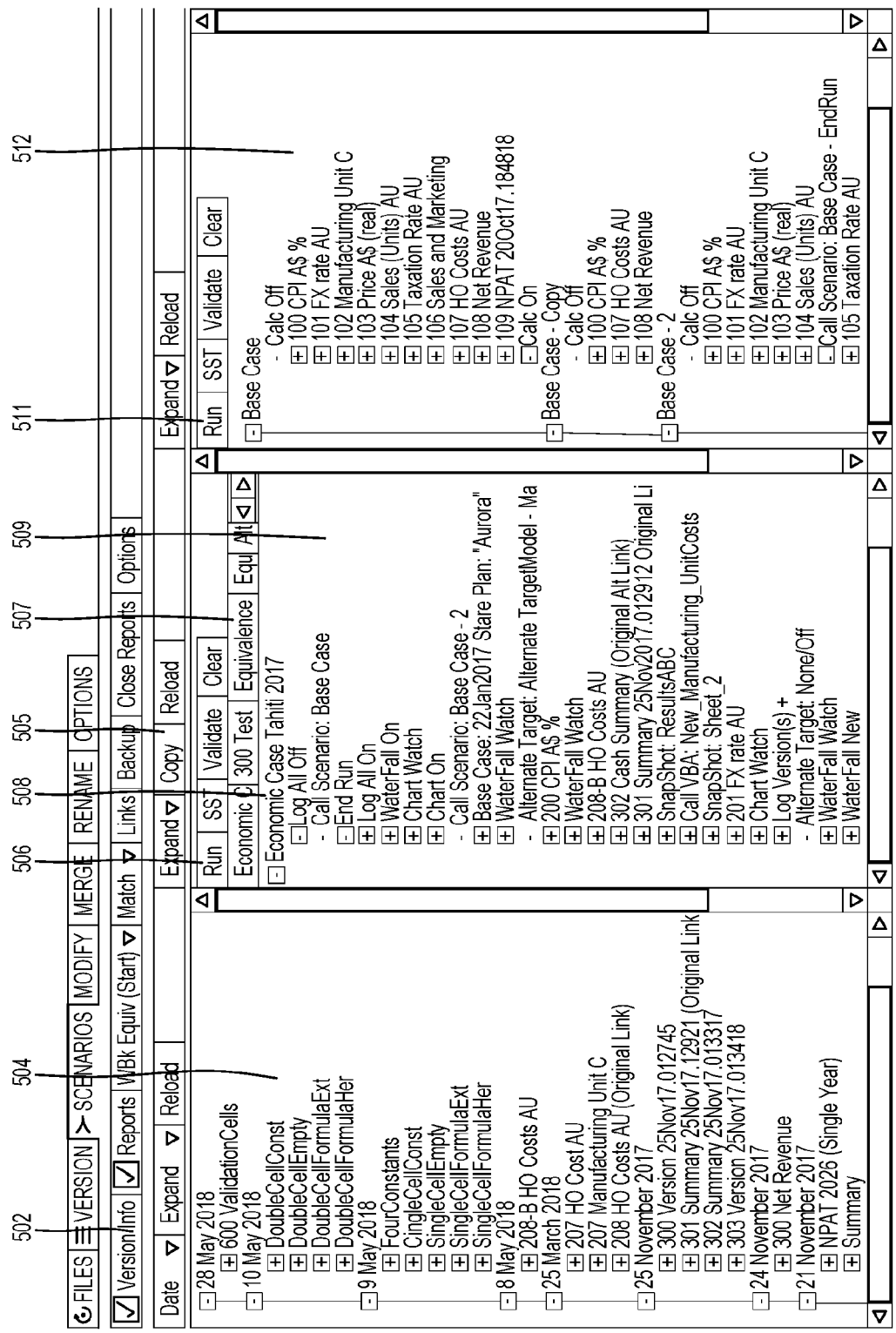
FIG. 5 is a bitmap screenshot of the Scenario tab in the scenario manager form, the Scenario tab being used to create and manage scenarios scripts.

The scenario tab is used to create and run scenario scripts (FIG. 5). The scenario tab contains three columns, from left to right: the collection of version objects created by the user (in the Version Tab) (item 504), a tabbed build work area where several scripts may be built, developed and executed (item 509), and lastly a storage area for completed scripts (item 512). Scenarios in the build work area may also call scenarios in the storage area as subroutines. Scenario in the storage area may call other scenarios in the storage area but not scenarios in the build work area.

A scenario is developed by selecting and dragging a version object from the version object area to the scenario build work area. The user may re-order versions or commands in the build work area by a simple drag and drop. Items may be deleted by selecting the item and pressing the Delete key on the keyboard.

In addition to versions, the scrip may also include commands to control execution and create reports.

Figure 6:
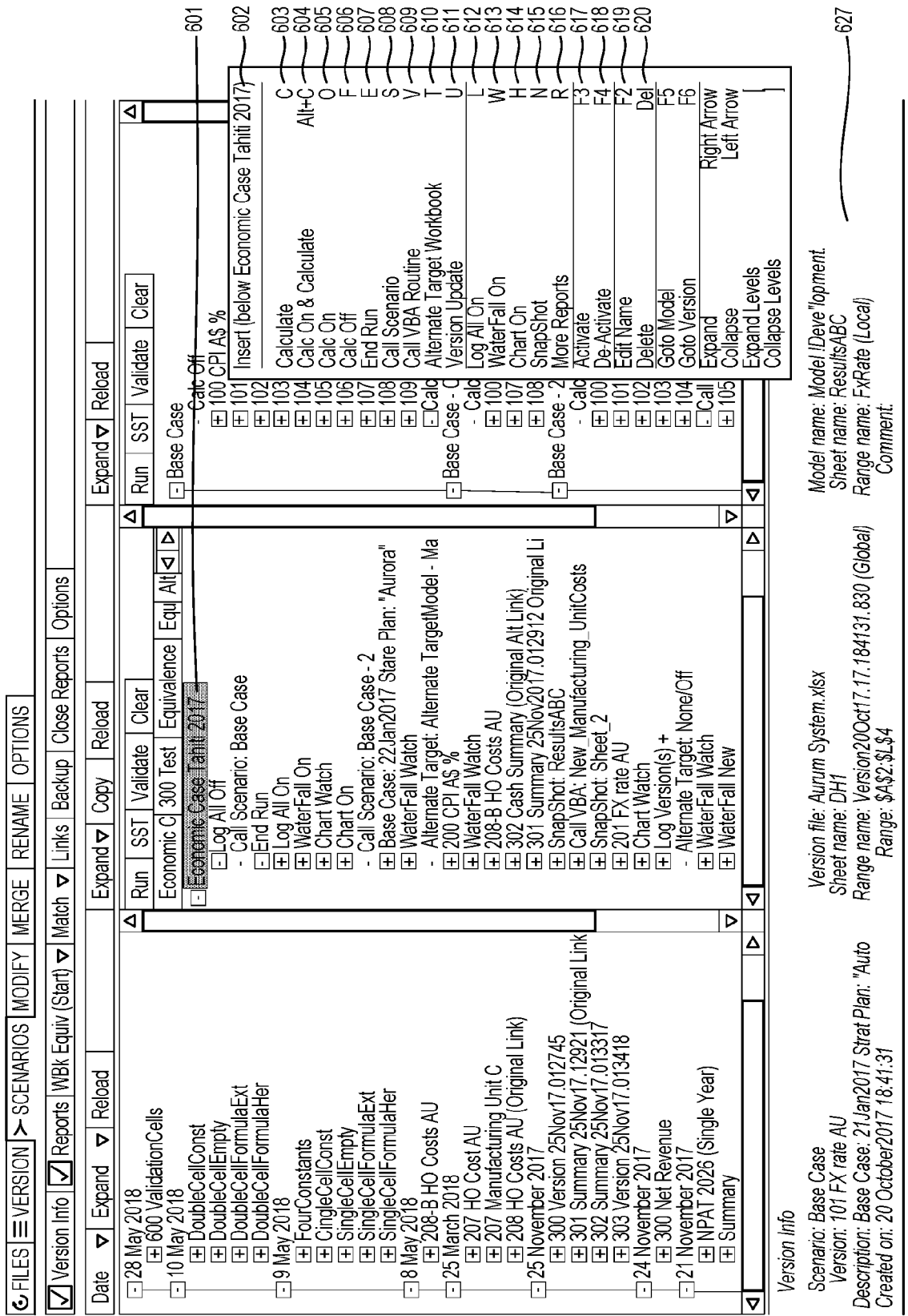
FIG. 6 is a bitmap screenshot of the Scenario tab context menu used to add commands and reports to scenario scripts.
Figure 7:
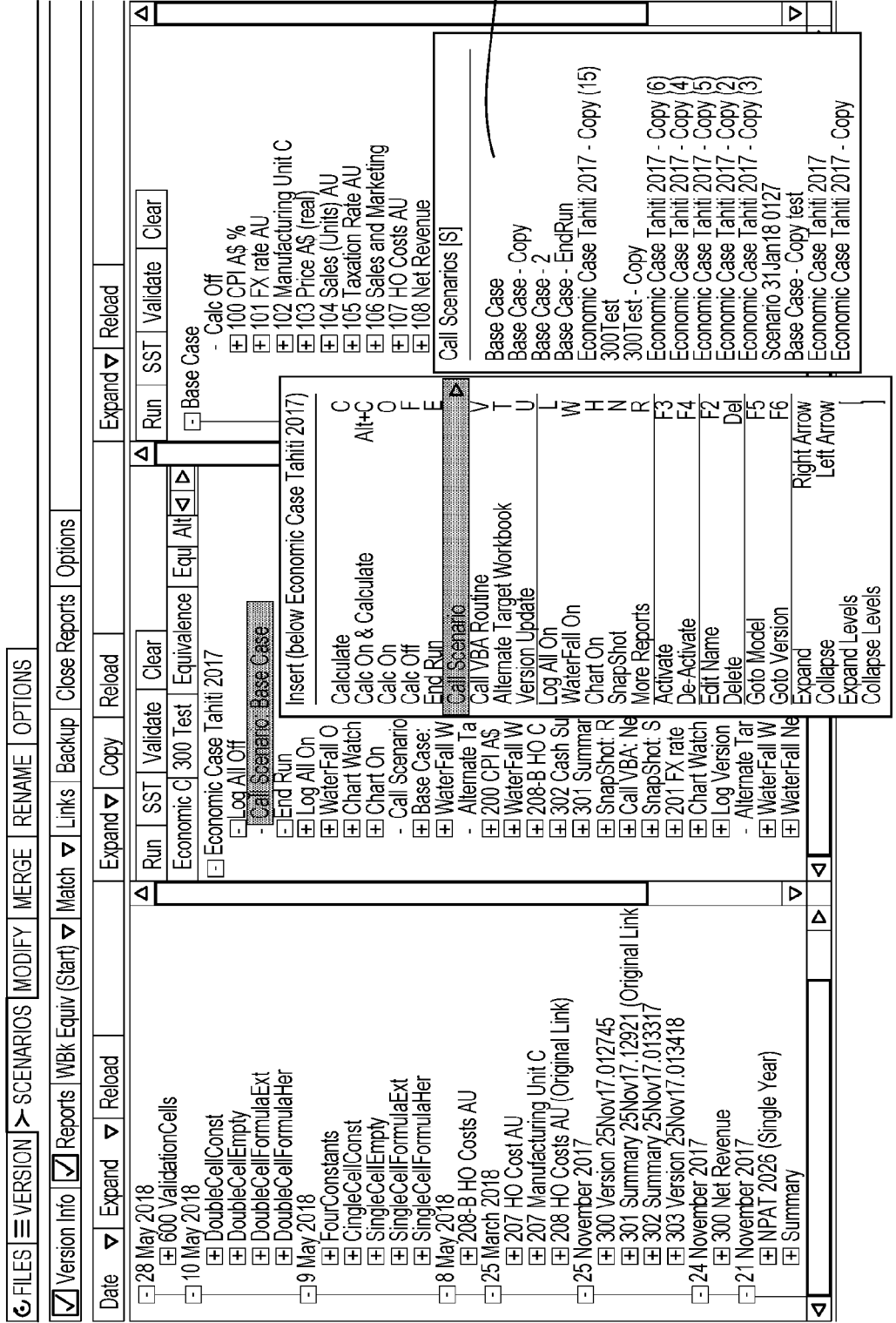
FIG. 7 is a bitmap screenshot of the Scenario tab context menu for selecting scenarios to call from the scenario script.
Figure 8:
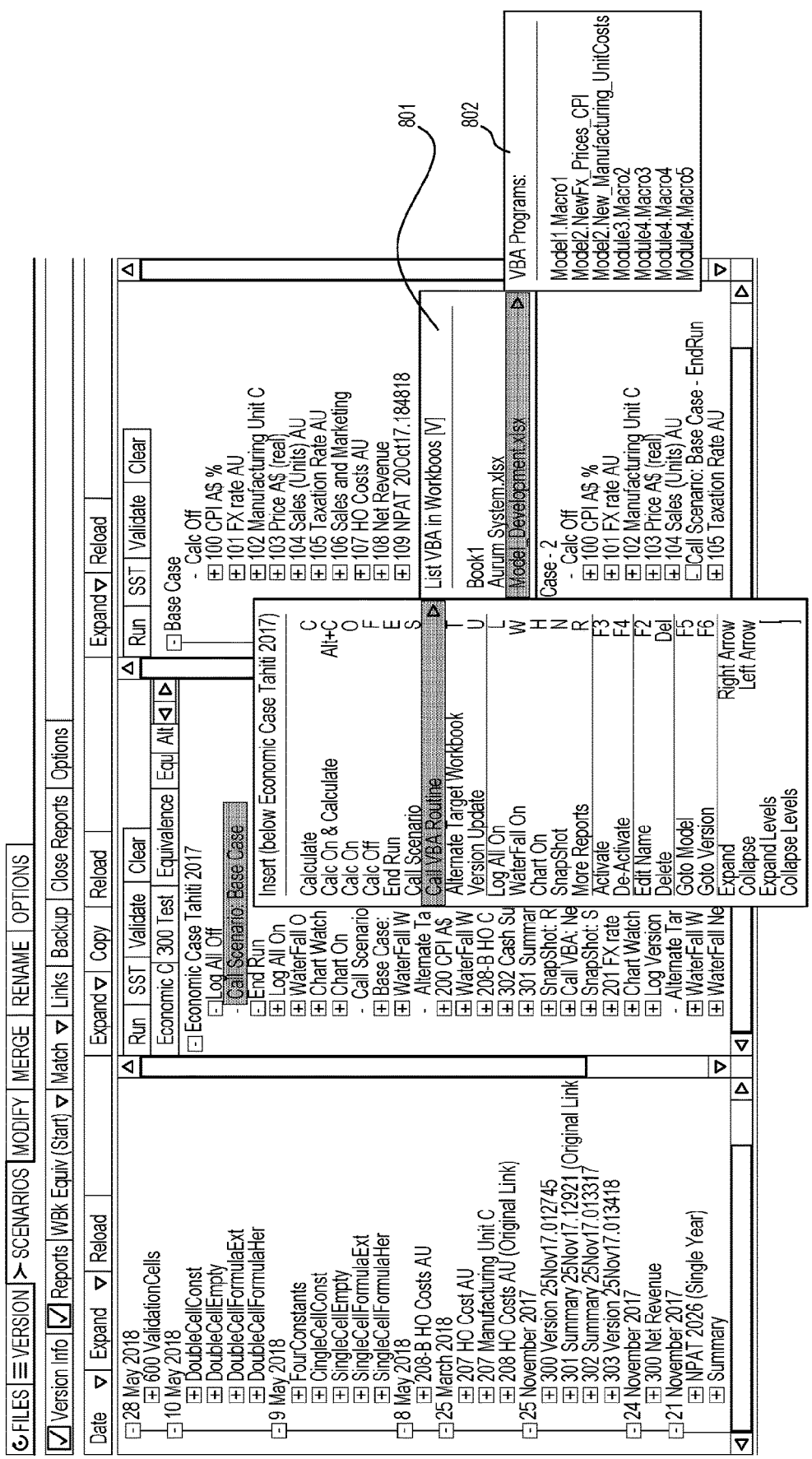
FIG. 8 is a bitmap screenshot of the Scenario tab context menu for selecting VBA routines to call from the scenario script.
Figure 9:
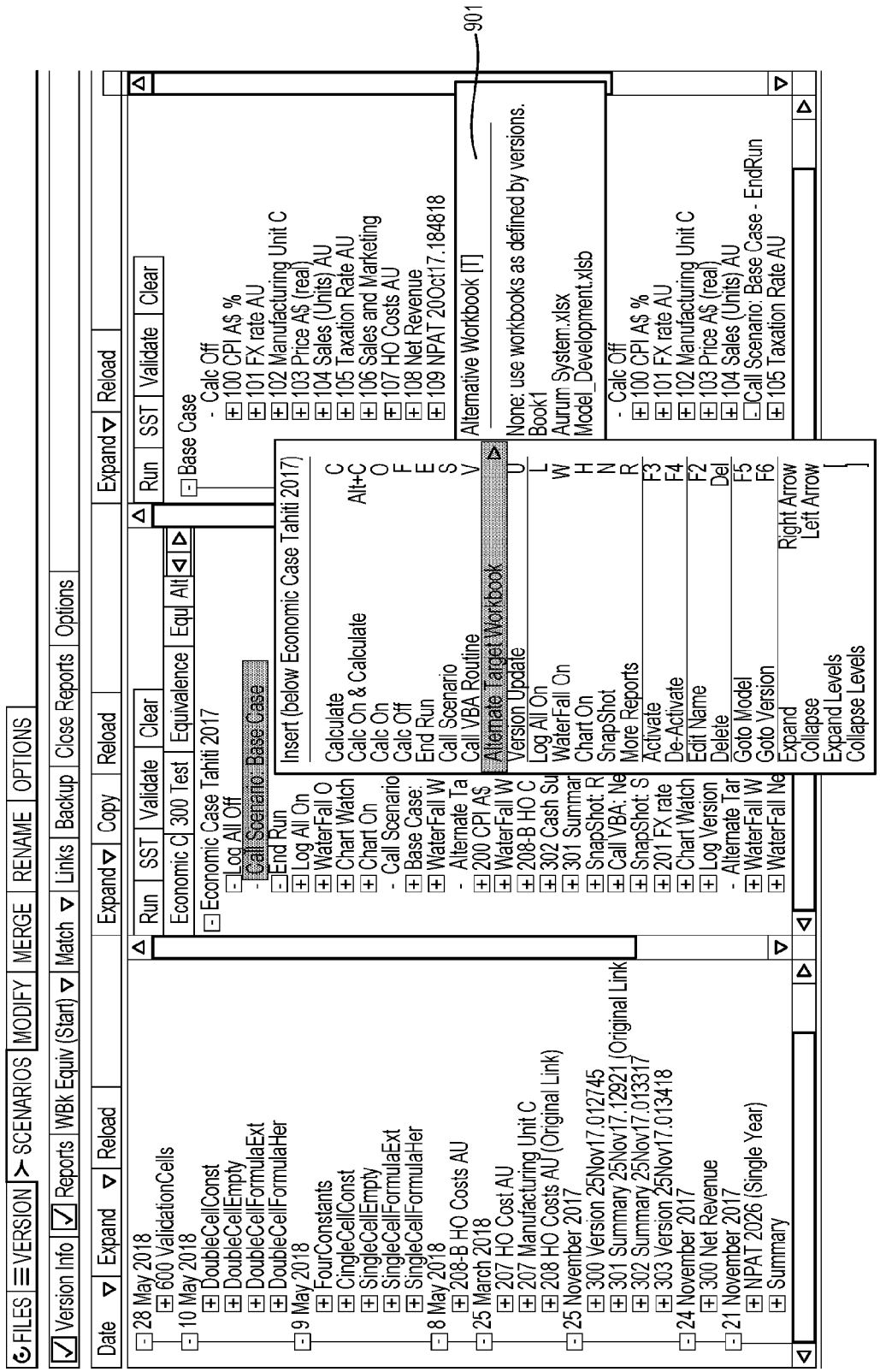
FIG. 9 is a bitmap screenshot of the Scenario tab context menu for selecting alternative spreadsheets for version changes.
Figure 10:
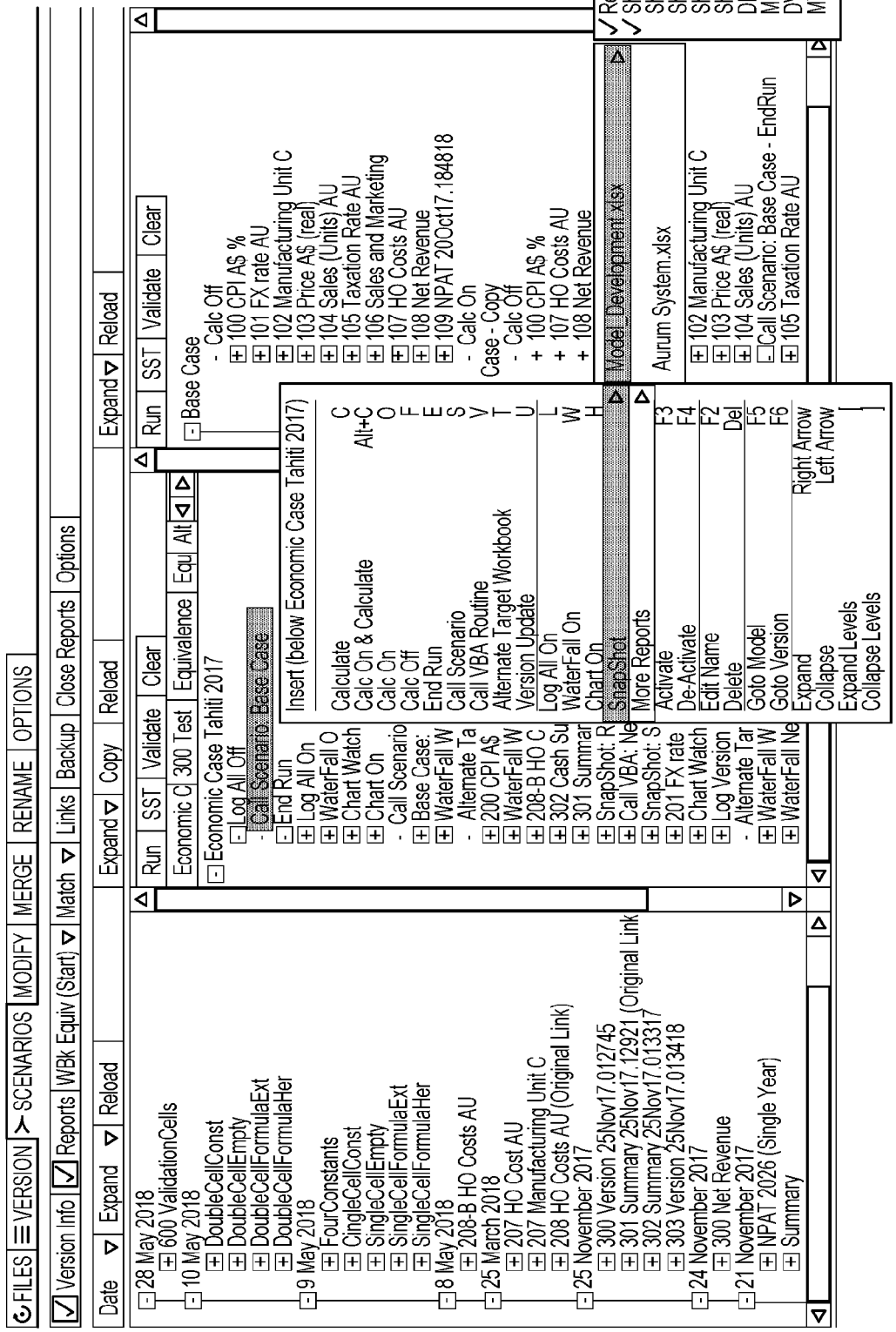
FIG. 10 is a bitmap screenshot of the Scenario tab context menu for selecting worksheets for snap shot reporting.

The commands are inserted below the selected item in the build work area and are accessed by clicking the right-hand side mouse button. The software will launch the command context menu from which the user can select the required commands (FIG. 6)

Commands to control execution include: Calculate (to force a full calculation of all workbooks, item 603), Calc On (set the workbook calculate mode on, items 604 & 605), Calc Off (set the workbook calculate mode off, item 606), End Run (stop scenario script execution, item 607), Activate (reset version or command to active state), De-Activate (de-activate and skip executing the version or command), Alternate Target workbook (update a different user specified model with the version data, item 610), Versions Update (reverse the copy direction: copy the values from the model to the version workbook, item 611), Call Scenario (call a scenario script selected from the Storage area as a subroutine, item 608), and Call VBA Routine (launch and execute a Visual Basic Application routine selected from any of the currently open workbooks, item 609).

Figure 28:
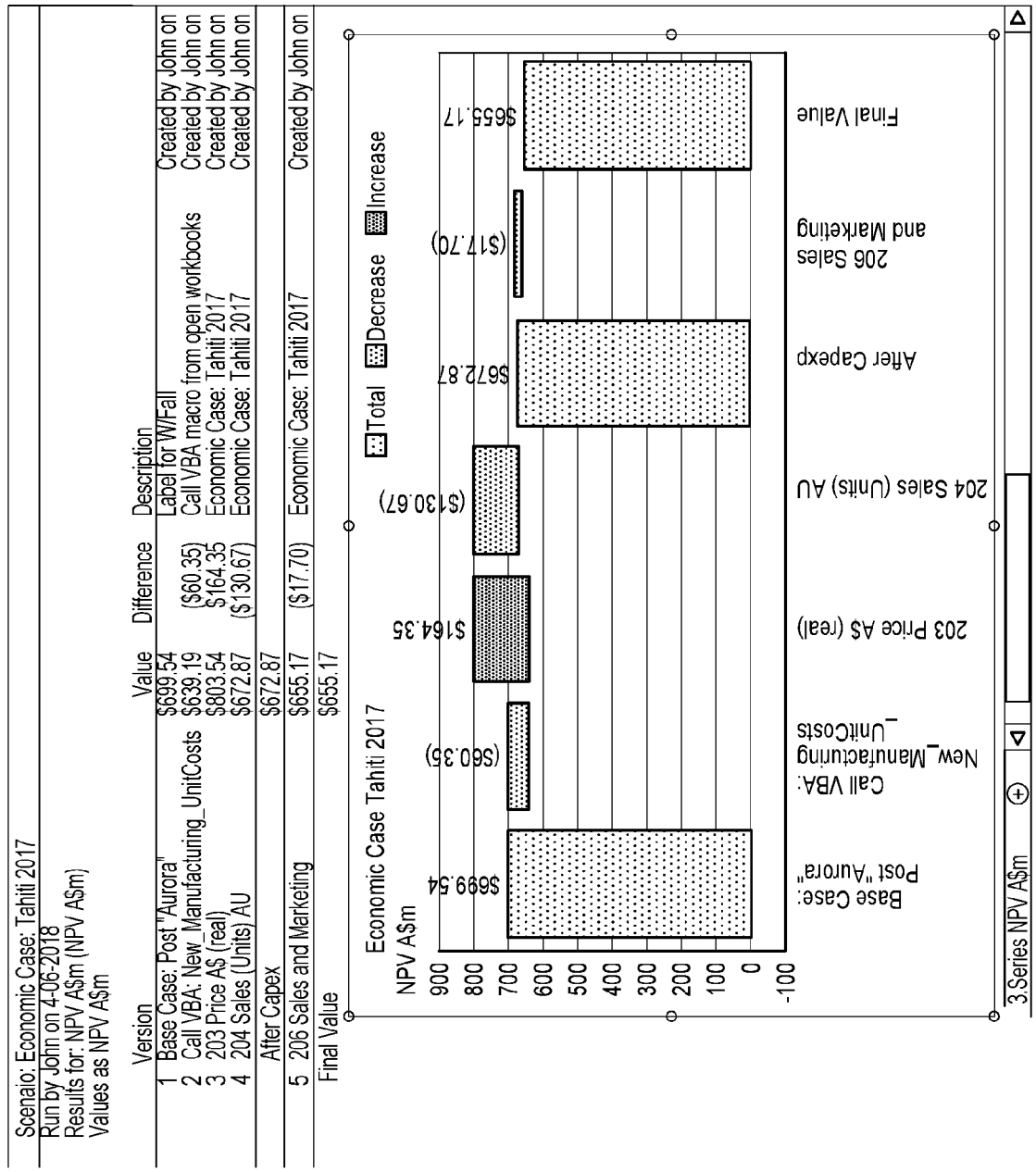
FIG. 28 is a bitmap screenshot of a sample report for a waterfall chart showing the changes for a user selected value.
Figure 29C:
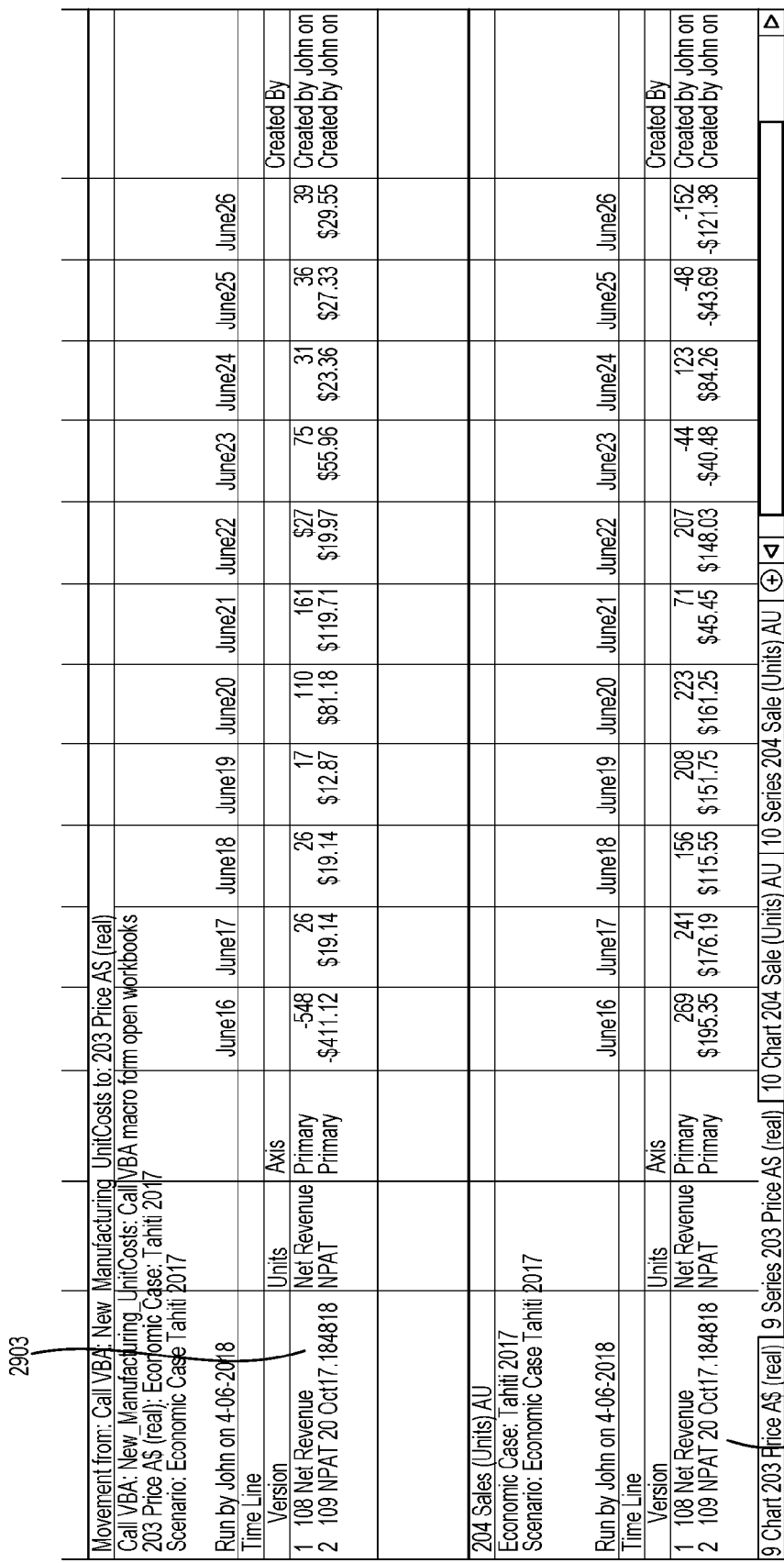
FIG. 29C is a bitmap screenshot of a segment of a sample version change report showing the movement and final values.

Commands to create reports include: Log All On (item 612), for each version executed, show the version value before (item 2601), after (item 2603) and the movement (item 2602), Waterfall On (item 613), for each version executed, show the change in a user specified watched value as a waterfall chart (FIG. 28), Chart On (item 614), for each version executed, show the impact on a user selected range (single row or column) before, after and the movement as a chart (FIGS. 29B & 29D), Snap Shot (item 615), for each version executed, show all the cell values of a user selected worksheet before, after and the movement (FIG. 30 for the difference only).

Figure 11:
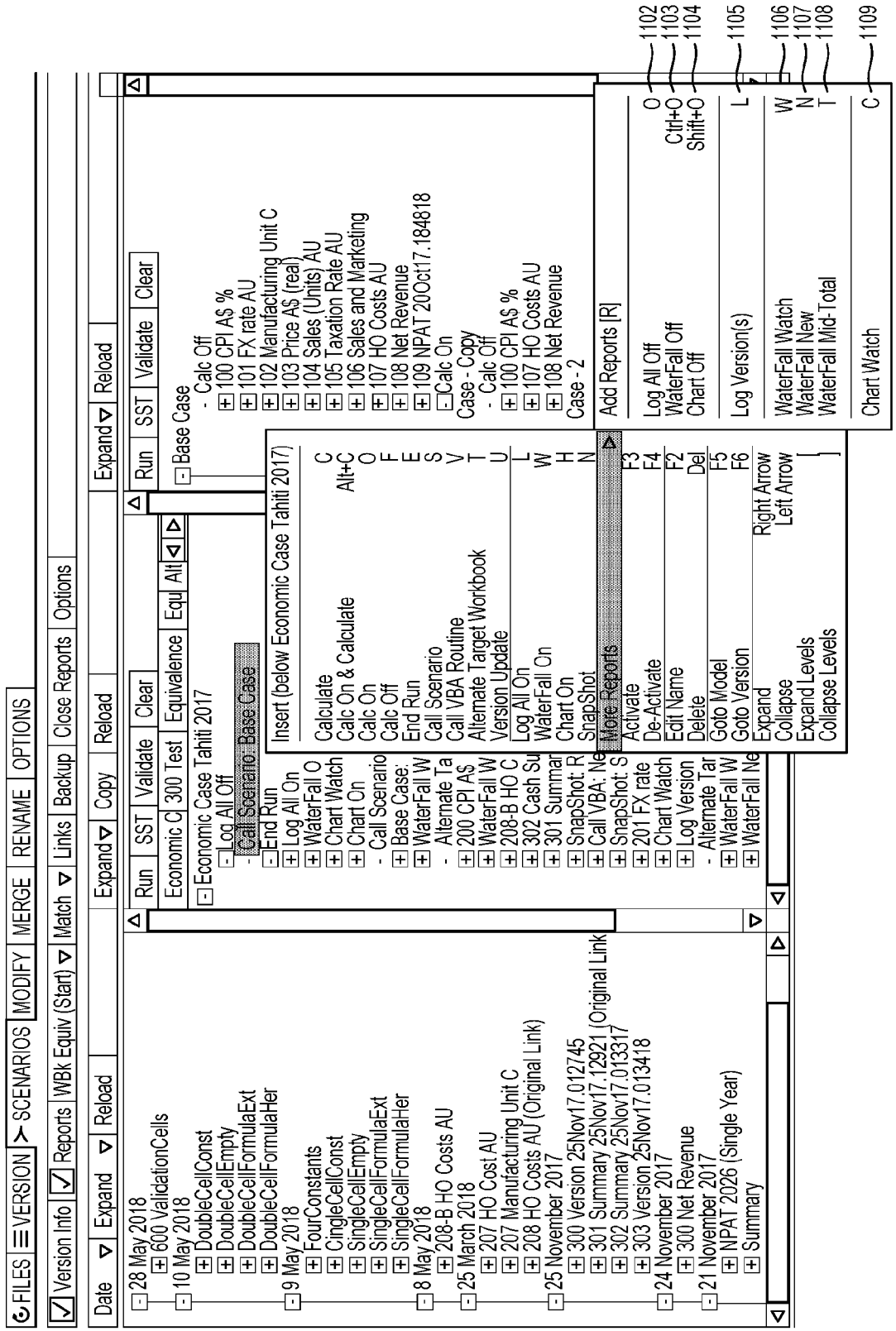
FIG. 11 is a bitmap screenshot of the Scenario tab context menu for selecting additional reporting commands to scenario scripts.
Figure 12:
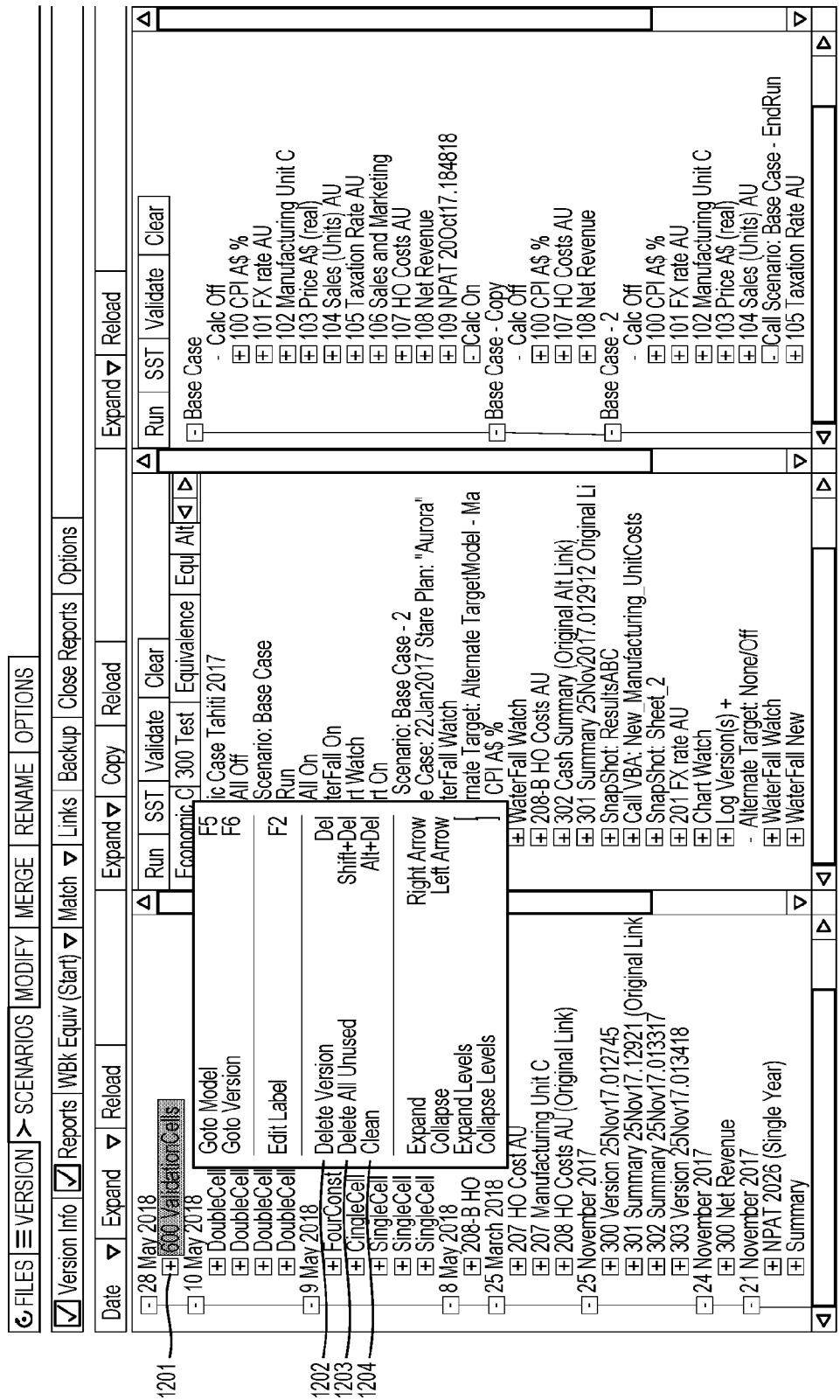
FIG. 12 is a bitmap screenshot of the Scenario tab context menu for managing the version object collection.

Additional report commands (FIG. 11) include: Log All Off (item 1102), Waterfall Off (item 1103), & Chart Off (item 1104) to stop recording changes for each version, and Log Versions(s) (item 1105), Waterfall Watch (item 1106), and Chart Watch (item 1109) which are similar to: Log All On, Waterfall On, and Chart On. These last three additional commands allow the user to specify which versions to group together as a single value impact, i.e.: there may be separate capital expenditure versions for both plant and machinery which may be grouped together as one capital item). Waterfall New (item 1107) modifies the Waterfall On command such that subsequent versions are shown in a new chart. Waterfall Mid-Total (item 1108) adds a new labelled intermediate total bar to the Waterfall Watch chart.

The Log Version(s) report lists the before, after and movement values for groups of versions (FIG. 27A, item 2701) and the before, after and movement values, on selected user define and customized output ranges (FIG. 27B, items 2702 and 2703)

Selecting a version with the mouse cursor refreshes the version info text box (item 627) with properties and details of the selected version or command.

Users may trace the source workbooks and data of selected versions by pressing the "F5" key on the keyboard (to activate and show the model workbook data on the display screen) or the "F6" key on the keyboard (to activate and show the scenario workbook data onto the display screen). Tracing source data requires the corresponding workbook files to be open in the excel application. Tracing is a convenient and accurate way to view the version data, the original model values and the location of the data in the model.

Once the scenario script is completed, the user can execute the script by clicking the "Run" button above the build work area scenarios or the storage area scenarios respectively (items 506 or 511). As the run progresses version data is copied from the scenario files range to the model workbook range as per the properties of the version object, control commands are executed and report commands create reporting workbooks populated with the appropriate tables and charts. Each report workbook contains a leading worksheet listing all the steps of the scenario scripts (item 2501).

As the run progresses green ticks are placed in front of the version or command step if it executed without any errors and a red cross if errors prevented the step from completing successfully. Run execution is terminated if an error occurs and an error report is then generated in a newly visible error tab (item 2401). Errors will occur if workbook files are missing or range names no longer exist or have been modified and differ from the original size.

Validation runs allow the user to perform a trial run whereby the software checks that all the necessary components and objects for the scenario are available and loaded into computer memory. Validation runs continue to the end of the script and are not terminated when errors occur. All errors detected are logged in the error report tab (item 2401). Validation runs are fast since data is not actually copied, workbooks are not calculated and reports are not generated.

Single step execution is similar to Run execution except that one script step is processed at a time (de-activated steps are automatically skipped). To complete the scenario execution the user continues to click the single step control until all steps are executed ("SST" button in scenario toolbars: items 506 & 511) or the user decides to cancel the execution. The program is effectively halted between each single step click and the user can inspect and review the data and results in the open workbooks. Single step is an effective tool to understand and verify the effect of each intermediate scenario script step during the run. When the program halts, key parameters of the run (name of open workbook and active objects) are saved, which allows the run environment to be restored when the next single step is executed following the users' review.

To preserve integrity scenarios are built to be applied to a specifically named workbook model. The user can change the model name by using the "Save" tool on the menu ribbon (item 104: "Save As" button). This tool will also update the workbook name in all the versions and commands of the active scenario. Alternatively, the user can select the workbook equivalence control to automatically assign new model names to the scenario script (this control will attempt to find workbook equivalent names with matching starting characters) ("WBk Equiv (Start)" button in Scenario Controls: item 502). The software matches the open workbook names to the workbooks referenced in the scenario file based on the longest matching character string from the start of the name. If the matching is unsuccessful for any name then an error message is displayed. If no errors are displayed, then the matching is successful and the matching may be listed by clicking the "Match" drop down control ("Match" button in Scenario Controls: item 502) which gives the user the opportunity to review the appropriateness of the matched workbooks.

Modify Tab

The names modify tab (FIG. 13) is used to change the size of existing range names which are already referred to in existing scenario files. The modify tool is used when a user wishes to decrease or increase the number of rows or columns in an existing range name and ensure that the changes are also applied to the version object properties and the saved version data in the scenario workbooks. Once the changes are applied the new rows or columns are inserted into the previously saved version data and populated with blanks. Deleted rows or columns are removed from the previously saved data.

The user selects the cells to be adjusted in the model workbook (either to insert or delete cells) and then clicks the Insert Row, Insert Column, Delete Rows or Delete Columns controls (in Modify controls: item 1301) to complete the changes. The user must select at least the full height (column editing) or full width (row editing) of all the selected ranges to enable these controls.

The software will update the model workbook, active scenario ranges and properties for the modified range names. The required changes are also saved to the names modification file (NMOD file, item 3104) with the same path and name of the model workbook (items 3101 & 3102). Provided the name modification file remains accessible it is used by the software to update the same range structure in other scenario files. The changes are completed during the Run execution, provided the version has not already been adjusted and the version creation data predates the names modification date. Additional range changes to the model workbook may be added to the existing NMOD file.

Merge Tab

The merge tab allows a user to combine previous scenario scripts and version data into a merged scenario file and data workbook. Version data saved in a model workbook will be included in the merged version data workbook and not be added to any other models.

Users creating versions and scenarios simultaneously, on copies of the model, can use the merge tool to combine their new scenarios and input data, provided the structure of the range names of all the workbook copies remain unchanged and no new range names are added. The merging process presumes that all the range names in the copied models remain consistent.

The user selects the files to merge using the "Add Scenario File" and "Add Model & Scenario File" buttons (in Merge controls: item 1401). The latter is selected if the user requires version data saved in model workbooks also to be merged. The user then browses for the destination directory and enters the new merged scenario file names. Once all the details are captured the merged files (SCEN and version data workbook) are created by clicking the "Merge Files" button (in Merge controls: item 1401). If duplicate version objects are detected (versions with the same unique identifier) then only one copy is transposed to the merged files.

Rename Tab

Figure 15:
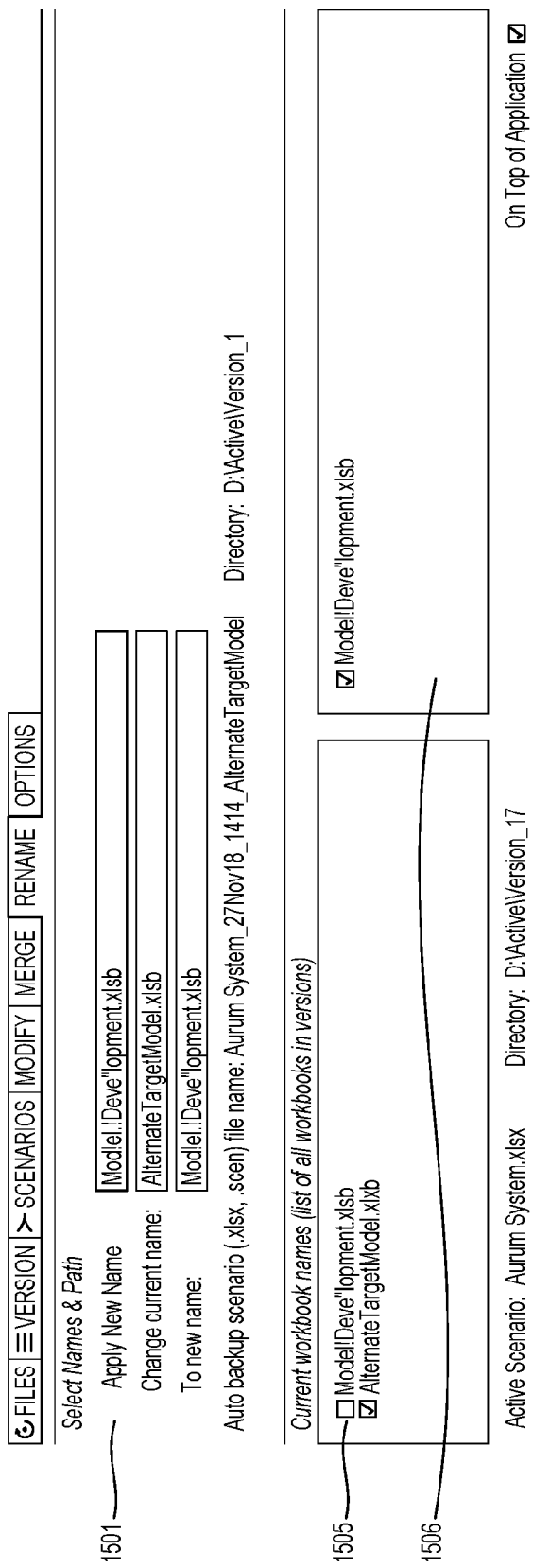
FIG. 15 is a bitmap screenshot of the Rename tab in the scenario manager form, the Rename tab being used to change the name of the model spreadsheet in the version objects.
Figure 16:
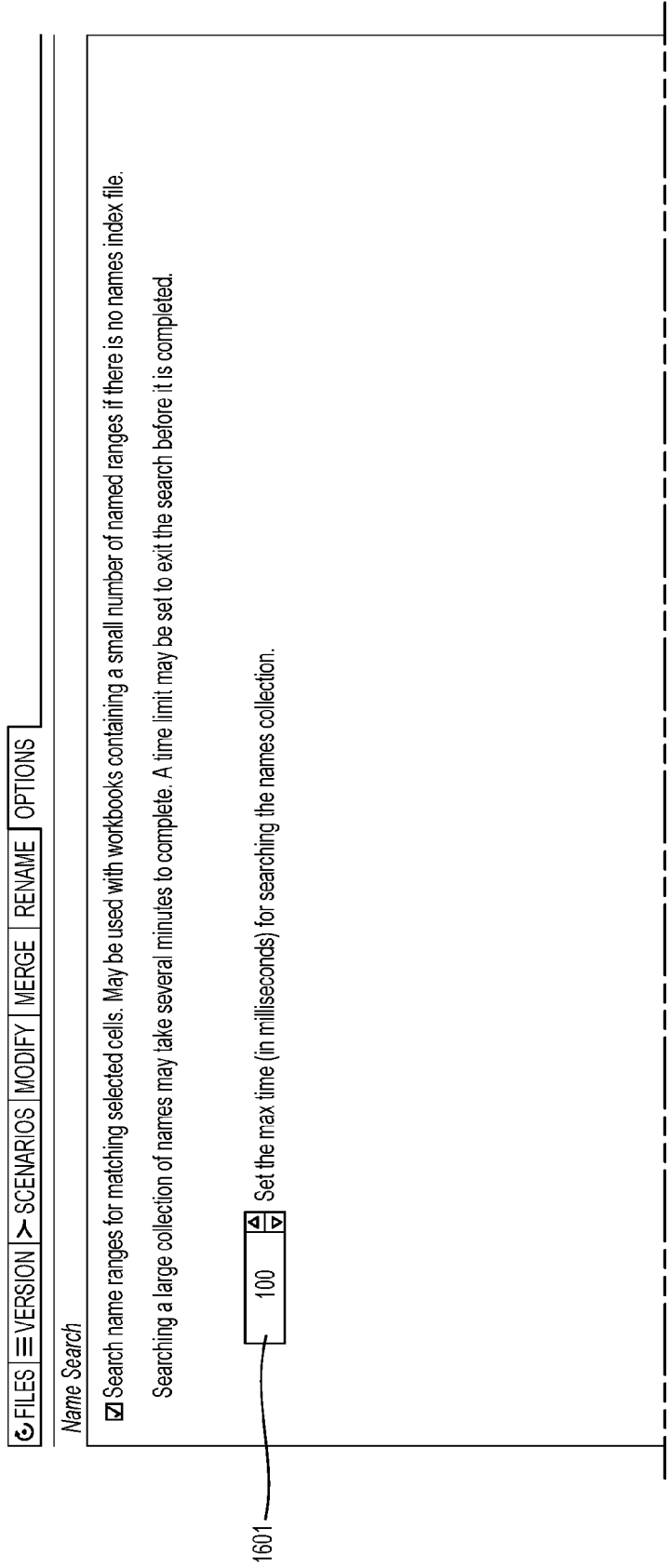
FIG. 16 is a bitmap screenshot of the version management options.
Figure 17:
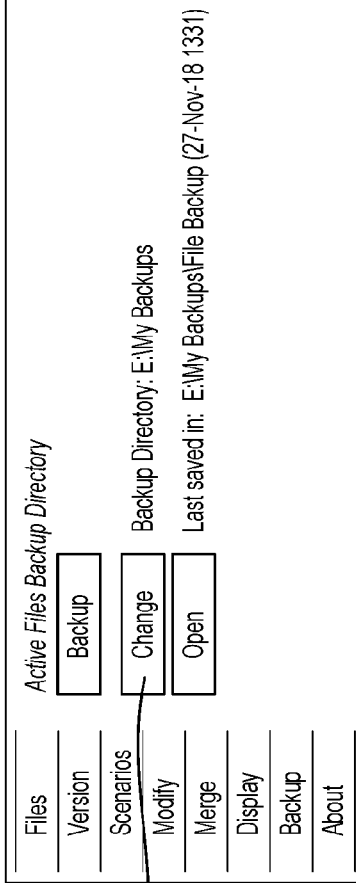
FIG. 17 is a bitmap screenshot of the backup management options.

The rename tab converts the active workbook name references in the scenario file (SCEN file) to a new user defined name (FIG. 15). The rename tab provides the same functionality as the "Save As" function in the menu ribbon (item 104) with some additional flexibility. The "Save As" function is essentially limited to converting one scenario file (the currently active scenario). The rename tab control allows the model workbook name of any scenario files to be entered by the user without the existence of the original workbook with the original name.

The rename tab will list the workbook names referenced in the scenario file (item 1505). From this list, the user selects one name to change. The target name can be selected from the list of currently open workbooks (item 1506) or entered by the user into the text box (item 1501). Once all the selections are completed the "Apply New Name" button is clicked to replace the name. A backup of the scenario files, before implementing the change, is automatically created and saved. This process may be repeated for any additional model workbook names referred to by the scenarios.

Range Names Navigation Form

The range Names Navigation form (FIG. 18) is a tool to assist users in finding the cells of an existing range name to update. Names selected by the user in the names listing (item 1810) will be highlighted in the open workbook and also listed in the Version tab of the scenario manager form (item 407), if the tab is open. From this list the user can select the range name to use for the next version data object.

The range Names Navigation form lists the names in categories based on the worksheet of the range name address (item 1806). By selecting the worksheet categories, the names (from the selected workbook) with range addresses located in that worksheet are listed. Three additional categories are used to list all the names in the workbook, global names and local names. To improve efficiencies the extracted lists are saved in the workbook index name file (NNDX file) avoiding the potentially slow process (if thousands of names exists) of rebuilding the lists. If names or addresses in the workbook are modified the user may wish to update the saved data (item 1801: "All Names" button).

Finally, the names may also be listed based on a partial text string filters (Filter text: item 1805, filtered summary result: item 1807). The filters include two additional matching attributes: capital sensitive or insensitive, and full scope or name only (full scope includes the worksheet name of local range names). Clicking on an item in the filtered summary result list (item 1807) will display all the matching names in the names list (item 1810).

Figure 19:
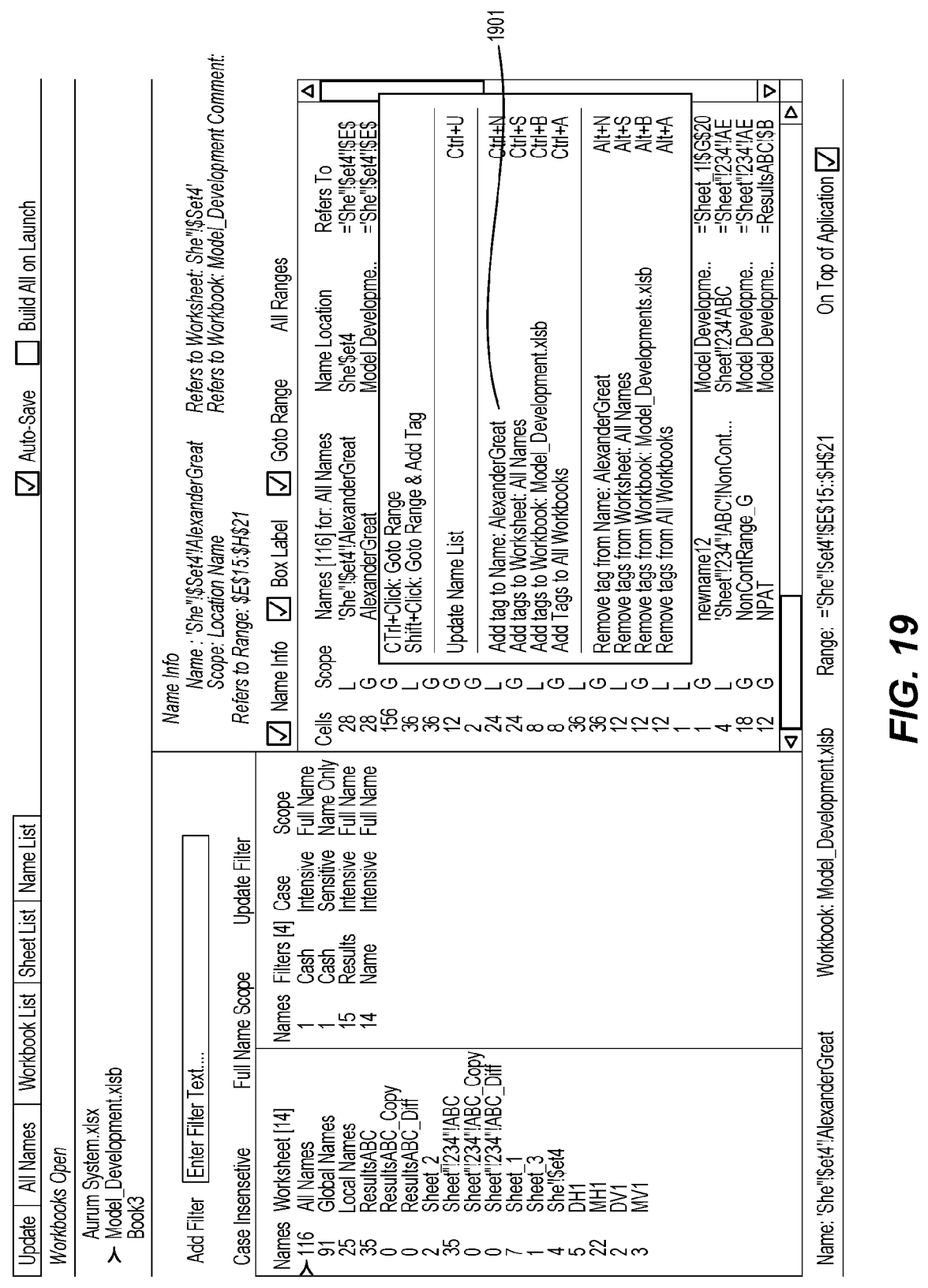

A context menu (Right hand mouse click, FIG. 19) in the name list window is available to add or remove tags from the selected range names. The tags are labelled blue rectangular objects positioned on the boundaries of the range (item 2001). The tags are an additional tool to assist the user with locating specific range names.

Scenario Management Method

Organizations are using spreadsheets models to quantify the impact of new investment decisions on their future operations and performance. These models often form part of a broader risk management process and are carefully scrutinised and reviewed. Since the future is unpredictable the model is recalculated with different but plausible input assumptions. These different scenarios or "what-if" analysis provide decision makers with a range of possibilities. Based on these outcomes and an assessment of the likelihood of the underlying assumptions, the organisation can define and execute the actions it believes are most likely to be successful.

In its simplest form, scenario analysis can be achieved by updating, with new input assumptions and formulas, multiple copies of the workbook model. In practice such a process becomes unwieldly due to the challenge of keeping such a proliferation of models current and consistent with each other while structural or new base assumption must be implemented across all of the copied models. A variant of this approach is to copy the exact cell content of relevant sections or the complete model to different worksheets within the same workbook. Worksheet consistency may be somewhat easier to maintain across worksheets, depending on the built-in tools available in the spreadsheet software, then across several workbooks.

Specific modelling techniques have been developed in order to produce these "what-if" results within one master model. The simplest approach, is to construct an options table within the model and use a system of flags and Boolean logic (if statements) to switch between the different assumptions. The user can then manually switch each new assumption sequentially and collect the outcomes for each change. The disadvantage of this approach is the effort (in development time and testing) required to continuously add new model structure to accommodate the new input assumptions, modify the reporting worksheets, and maintain up to date documentation for each change. In addition, the continuous structural changes are a pathway for introducing new errors into the model. This invention provides a method to standardise and automate many of these processes.

Other approaches such as the scenario manager add-in found in Microsoft Excel allows the user to define a small set of changing cells which can contain multiple constant values with each set of value saved under a scenario name. The user also defines a set of result cells to include in the output table. The user then activates a particular scenario and the data set for that scenario then replaces the selected set of cells. The spreadsheet is recalculated with the new values and a result table is generated showing the effect of the activated scenario on each defined output cell. Other variants improve the capabilities over the Excel scenario manager by removing the limit of 32 cell (per worksheet) which can be changed and also for allowing formulas in these cells (not only constants). All these approaches, unfortunately, update all the versions in one step without any possibility to investigate or sign-off on intermediate results. The versions or original source data are not explicitly viewable as they are saved in memory and must first be retrieved by the user. The user selects from the control settings which scenario to activate and consequently which set of version data to display (one scenario at a time).

Improved Scenario Manager

The current embodiment provides a more sophisticated and powerful approach. Similar to the just described tools, it captures user defined ranges of formula or constant data (limited by memory and spreadsheet size), however these are saved to specifically constructed scenario workbooks where the source data of the versions remain visible for inspection by a user or reviewer (with easy to find navigation tools provided in the scenario manager form).

The previous approaches update all the version of a scenario in one instance, in contrast this invention updates the workbook one version step at a time and includes the capability to generate difference reports, between version updates, showing the impact of a single version change. Scenarios can be chained, so one master scenario may call a base scenario, to reset the models to their base values between scenarios, followed by new individual scenario. Scenarios may call user defined VBA routines (categorised as a version steps) which may include complex optimization or iterative convergence algorithms for calculations which cannot be defined in the model explicitly. Scenarios can be archived, amended, re-ordered, reviewed and paused after each step for in-situ inspection of all the open workbooks.

Reports are customizable, auto-generated and large collection of cells or ranges from any workbook can be included in the worksheet reports. These reports comprise differential spreadsheets (which include the values of the result cells before the change, the values after the change, and the differences) of the specified ranges and cells in both a tabular and graphical forms (line & bar charts and waterfall charts, FIGS. 28, 29B and 29D). These reports are a demonstration of each completed version change step and the collection of these reports, which comprise the complete scenario, can be reviewed for completeness, validated, approved and filed.

The scenario management process combines the following steps: setting up the storage files, updating the model with new data, capturing the new versions, building an ordered set of instruction (script) of versions, commands, and reports, running the scripts and finally reviewing the impact of the changes in the reports.

Running a script essentially entails copying the saved version data to the workbook model step by step and creating reports detailing the impact of these changes on selected ranges or cell values in the model. Commands allow the user to set the calculation modes, make calls to other scenario, call VBA application, reverse the update direction (model to version), and test scripts on alternative target workbook. Report commands are inserted in the script and specify what kind of report is generated and which versions and ranges are included in the report.

The increased power of computers and the extensive capabilities of spreadsheets have led organizations to develop large models sometimes requiring thousands of cells to be updated across different categories of items. In addition, these models may also include thousands of named ranges (created for many purposes and not only for scenarios). This embodiment allows users to create new versions with large blocks of data, manage hundreds of versions, and to quickly find any existing named range using either the Names Navigation tool (item 1810), or by selecting a cell in the worksheet and checking the Version tab (item 407) in conjunction with an updated names index file (item 102) for those names containing (intersecting) the selected cell address. The scenario merge function allows multiple users to contribute their own versions or scenario segments which can later be combined to form a complete scenario.

Scenario Management Session

Figure 2:
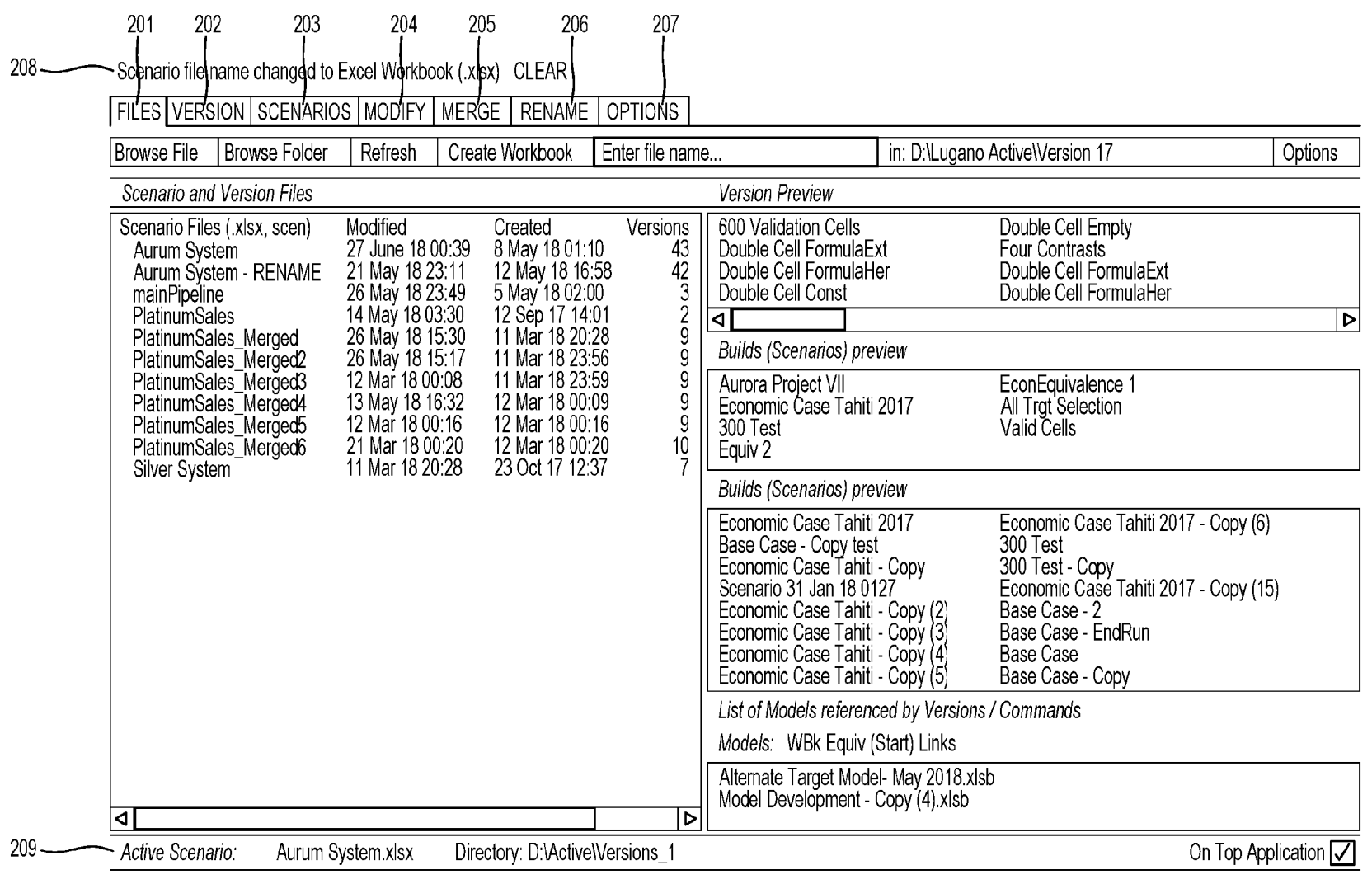

In order to complete a scenario, the user selects and opens all the workbook models he or she wishes to use for his or her scenarios. Once the workbooks are open the user selects the first workbook to update. From the menu ribbon for this software the user clicks the "Scenarios" button (item 101) to launch the scenario manager form (FIG. 2).

Create Scenario Files

The user must define the name and the location of the files which will be used to save his or her scenario. The user defines these files by selecting the "Files" tab (item 301) and then clicking the "Browse Folder" button (in File controls: item 302) which will launch the Windows folder dialogue prompt. From this dialog the user may select or create a new folder. If the selected folder contains previously created scenarios these will be listed in the list view window (item 303). Scenarios are a combination of two files with the same name: a spreadsheet (workbook) and a scenario file (SCEN file) both created by the application. Only scenarios with both files in the same folder are valid and listed.

The user may select (click) any of the listed scenarios or create a new scenario by entering the scenario name in the text box "Enter file name . . . " (item 308) and then clicking the "Create Workbook" button (in File controls: item 302). A scenario file with the same name (SCEN file) will also be created. The tab also lists summary information for the selected scenario: versions, scenarios and workbooks which are already referenced by the scenario (items 304, 305, 306 & 307).

Once the file is selected the user is ready to create versions and baseline values. The selected file is the active scenario until another file is selected.

Create Versions & Baselines

To create version data the user selects the "Version" tab (item 401) and checks that the names index file is up to date by clicking either "Validate" on the menu ribbon (item 102) or "Update" to recreate the names index file. The names index file (NNDX file) ensures range names which contain the selected cell are automatically listed in the "Version" tab (item 407). A date and time stamped default range name (for a newly created range name) is also proposed by the software (item 407). These new suggested names are highlighted in the tab by using red as the text colour.

The user navigates his or her model to the section he or she wishes to update and clicks on the cell or selects a range of cells to be to changed. If the selected cell is part of a range name then the name will appear in the "Version Range Name" window (item 407). A new name for the selected cell(s) will be suggested by the application (in red text). The user can select any of these names and a description of the selected range will appear in the "Current Selection" window (item 408). The user is now ready to enter new data or formulas in the cells he or she wishes to update.

The user may either update the data or use the existing values to create a set of baseline versions. Once the data update is completed, the user selects the range to save with the version. The user may use an existing range selected from the list of names (item 407) or define a new range name by selecting a set of contiguous cells with their mouse and entering either a new range name (item 405) or using the suggested name (red text).

The user then updates the version descriptors: version name, version description and name description (items 404, 409 & 410 respectively). Version name and description may also be edited (in the scenario tab) after the version has been created. The version name is used as the version label in reports and charts.

The user can now create the version by clicking the "Add to Scenario" or "Add to Model" buttons (in Version controls: item 402). The former saves the data to the scenario workbook and the later to the model workbook in a newly inserted version data worksheet. Adding the data to a model is preferred, if the data contains formulas, as it eliminates the need for the user to always remember to keep both workbooks (model and scenario versions) open as required to preserve formula integrity while completing structural changes (inserting/deleting rows/column) to the model. This requirement is a feature of Excel spreadsheets. Alternatively, some users may prefer to minimize their model size by saving large blocks of version data outside of their model to the scenario workbooks specifically created for this purpose.

Once the version is created the scenario file (SCEN file) is updated and saved. Depending on which checkboxes are ticked (Version settings: item 403), the scenario and model workbooks may be saved, after each new version is added.

The Version tab also lists the active versions currently using the same range name (item 406) and includes an editor to change the name of existing range names in the open model workbook and the active scenario file (item 411).

After all the required version objects have been created the user is ready to build his or her scenario script.

Create Scenarios & Scripts

To assemble the scenario scripts, the user selects the "Scenario" tab (FIG. 5) and drags & drops the recently created version objects (in the left-hand side column, item 504) to the scenario build work area (in the central column, item 509). The items placed in the build works area can be re-ordered with the mouse cursor drag & drop, deleted with the Delete key, and copied by holding down the Ctrl modifier key while dragging & dropping the item.

Context menus (right mouse click, item 601) in the scenario build work area are used to add and insert commands or reports below the selected item.

The user may insert calculation points in the scrip to specify when the run must re-calculate all open workbooks. This is useful when models are very large and calculation times are significant. If the user only requires the final result, then a "Calc Off" at the beginning will stop all workbook calculations during the script run and a "Calculate" command at the end of the scenario script will ensure a final calculation is completed. "Calculate" commands can also be inserted after specific steps as required by the user. A "Calc On" command inserted after a script step will revert the run to full calculate mode and the workbooks will then recalculate after every version object update. Note that reports need calculations to function correctly and will calculate irrespective of any user settings, unless de-activated.

Two commands are used to execute additional instructions: "Call Scenario" and "Call VBA Routine". "Call Scenario" allows the user to select and insert a pre-existing scenario script (item 701) from the scenario storage area (far right columns, item 512) via a context menu invoked from the scenario build window. Nested scenario calls are allowed: a scenario script in the scenario storage area may call other scripts from the scenario storage area. Calling scenarios is useful for scripts which must be repeated (i.e.: a base case script which is executed to reset all model values to a starting point before proceeding to the next scenario) or to save and execute scripts according to a particular theme (i.e.: a script relating to capital costs in a region only).

The "Call VBA" command is intended for users who require an iterative goal seek calculation step when an explicit solution is not possible or very difficult to implement. Any VBA code may be called by the script and while the VBA executes the scenario script is paused. The VBA code is developed by the user and is accessed via the Context Menu command "Call VBA", the user then selects the open workbook where the code resides (item 801) and finally the VBA program (item 802).

Two commands: "Alternate Target Workbook (item 610) and "Version Update" (item 611) are used to control the direction of the version data copy.

The "Alternate Target Workbook" command is intended for testing scenario scripts on copies of the model workbooks. Rather than modify the master workbook the user can insert an alternate workbook command into the script for the target to be used for the copied version objects. The user selects the command from the context menu and then selects the new workbook target from the list of open workbooks (item 901). From this step, all references to any model workbook are redirected to the alternate target workbook. The redirection remains active until the next "Alternate Target None/Off" command (the "None" option is the first item in the list of suggested open workbooks). The "Alternate Target Workbook" command allows a user to "play" with various script versions and commands without changing the master model.

The "Version Update" command serves as a tool to reverse the direction of the data copy. Instead of the default copying of versions from the scenario workbook to the model workbooks the data is copied from the model to the scenario workbook. The command effectively updates the existing version with new data from the model workbook. Formulas are not copied, only the constant values of the formulas are copied. This command is intended as a method to allow data providers to easily update existing scenario workbooks with data from their spreadsheets for distribution to the analysts who can then use scenario scripts to update their models.

The "De-Activate" (item 618) and "Activate" (item 617) commands may also be used to manage whether the scenario script executes these commands. Selecting a command or version and then clicking the "De-Activate" command will de-emphasise (grey out) the command or version in the scenario build work area and during execution the program will skip over these commands or versions. The "Activate" command is used to re-establish execution of the commands or versions.

There are several report commands available to the user and these cover two kinds of reporting methods. Generic reports which report on every version step until instructed to stop, and specific reports which are generated after specific steps and include the sum of the impact of selected contiguous steps. Generic reports are quick and easy to set up but may include excessive detail for distribution or high-level reviews. The specific reports allow greater control and allow similar classes of versions (i.e.: all major capex) to be grouped together as one reporting step. Specific reports are invoked explicitly by the user by inserting these report commands after a version step and the user may include in the report the effect of any of the previous version changes. The user may also define selected ranges within a workbook to be included in the reports as outputs to show the impact of version changes on other dependent cells.

Reports and charts use the version name for labelling and these can be changed with the "Edit Name" command (item 619) which sets the version name to text editing mode. Duplicate version names are allowed since the version objects are recognised internally by their unique internal identifiers.

Additional commands to assist the user in developing their script include: "End Run" (item 607) to stop execution at a specific location within the script. This allows the user to inspect the status of all open workbooks and the progress in creating the workbook reports up to the "End Run" command. Execution cannot resume after an "End Run" command. The single step command ("SST" button in the Run build toolbar, item 506) is available for pausing, inspecting intermediate results, and resuming execution.

Commands to create reports include: Log All On (item 612), for each version executed, show the version value before (item 2601), after (item 2603) and the movement (item 2602), Waterfall On (item 613), for each version executed, show the change in a user specified watched value as a waterfall chart (FIG. 28), Chart On (item 614), for each version executed, show the impact on the first row or column of a user selected range before the change (FIG. 29A, item 2901 as data & FIG. 29B, item 2902 as a chart), after the change and the movement (FIG. 29C, items 2903 & 2904 as data, and FIG. 29D, items 2905 & 2906 as a chart), Snap shot (item 615), for each version executed, show all the cell values of a user selected worksheet (item 1001) before, after and the movement (FIG. 30 for the difference only).

Additional report commands (FIG. 11) include: Log All Off (item 1102), Waterfall Off (item 1103), & Chart Off (item 1104) to stop recording changes for each version, and Log Versions(s) (item 1105), Waterfall Watch (item 1106), and Chart Watch (item 1109) which are similar to: Log All On, Waterfall On, and Chart On. These last three additional commands allow the user to specify which versions to group together as a combined impact. Waterfall New (item 1107) modifies the Waterfall On command such that subsequent versions changes are shown in a new chart. Waterfall Mid-Total (item 1108) adds a new labelled intermediate total bar to the Waterfall Watch chart.

Scenarios and versions changes are saved automatically as the user modifies the scenario script and navigates through the scenario form. Exiting the form will also save any unsaved changes.

Specifying Reporting Ranges

Report commands also require additional parameters to specify which supplementary range data value should be displayed in the reports. All reports require input ranges (the input cells which are been changed) but optional supplementary data may include a timeline (date sequence to match the data series), and output ranges (dependent cells the user wishes to monitor when inputs are changed).

Reports use the version object range as the input range for all reported versions except for the "Log version(s)" grouped report and the "Call VBA Routine" command (which behaves like a pseudo-version).

In the case of the "Log version(s)" grouped report (item 1105) the first item to be included must be specified by the user. The report will include each input version change step from the specified version to the version just before the "Log Version(s)" grouped report command. The start input version is defined by the user by selecting a version above the "Log Version(s)" report (in the build work area window: item 509) with the mouse while simultaneously holding down the Alt modifier key (item 3204) and drag & dropping the item onto the "Log version(s)" report item.

The "Call VBA Routine" command (item 609) does not explicitly indicate the range of cells which change when the VBA code is executed. For these changing cells to be included in the reports the user must specify the version object range to include in the reports. The input version is defined by the user by selecting a version (in either the version object collection window (item 504) or the build work area window (item 509)) with the mouse while simultaneously holding down the Alt modifier key (item 3205) and drag & dropping the item onto the "Call VBA Routine" command.

A timeline (date sequence to match the data series) cell range may be added to the Log All On, Log Version, Log Versions(s), Chart Watch and Chart On reports. A timeline version object is created specifically for the reports in the same way as any other version object. The one proviso is that the columns/rows must align with the input cell ranges, i.e.: the first input and output data cells will be tabulated and aligned with the first timeline data cell. The timeline version is defined by the user by selecting a version (in the version object collection window (item 504)) with the mouse while simultaneously holding down the Ctrl modifier key (item 3202) and drag & dropping the item onto the relevant report command.

Output cell ranges (cells the user wishes to monitor) may be added to the Log Version, Log Versions(s), Waterfall Watch and Chart Watch reports. An output version object might be any range of cells specifically created for the reports or any existing version object. The output version is defined by the user by selecting a version (in the version object collection window (item 504)) with the mouse while simultaneously holding down the Shift modifier key (item 3203) and drag & dropping the item onto the relevant report command. Several versions may be added. Each Waterfall Watch report will only chart the first numeric cell in the output range.

Running, Single Stepping, and Validating Scenarios

Once the scripts are completed the scenarios are ready for execution. Scenarios listed in either the build work area or the Scenario storage area (items 509 and 512 respectively) may be executed. There are three methods to execute the scenarios: Run (execute every step, calculate the model, and generate reports as per the script), Single step (execute one step at a time then halt execution until the user triggers the next step), and Validation (which ensures the required workbooks are open and the range names exists, but completes no data copy, no calculations, and no reporting)

After each step is completed a tick or a cross is added to the left of the step description. A tick indicates the step was completed, a cross indicates the step failed. A downward arrow indicates the step was ignored and skipped as it was de-activated. These indicators are removed before each run or can be cleared manually by the user (items 506 and 511, button: "Clear").

The creation of reports can be suspended by un-checking the "Reports" checkbox (in the Scenario Controls: item 502).

Scenarios Run

Running a scenario (items 506 and 511, button: "Run") is the standard way to execute the script instructions: all the versions are copied, workbooks are calculated after each step (unless calculations are explicitly suspended by the user) and the report commands generate the specified reports. Execution stops if an error is detected and the error is then listed in the scenario execution error listing tab (item 2401).

Scenarios Single Step

Single stepping a scenario (item 506 and 511, button: "SST") is similar to running a scenario except only one step is executed. The user must click on the "SST" button again to execute the next step. Between steps the scenario is halted and the user can inspect the content of any cell in any open workbook. This method is useful if the user needs to investigate or debug specific version steps.

For each step: versions are copied or commands executed, workbooks are calculated as required (unless calculations are suspended by the user) and the specified reports are created. Execution stops if an error is detected and the error is listed in the scenario execution error listing tab (item 2401).

Scenarios Validation

Validating a scenario (items 506 and 511, button: "Validate") is similar to running a scenario except no data is copied, there are no calculations and reports are not created. Validation is a quick method to check that all the workbooks and range names exists and are accessible. Execution continues to the end of the scenario even if errors are detected. All the resulting validation errors (if any) are is listed in the scenario execution error listing tab (item 2401) for remediation by the user.

Navigate to Data: Go to Model and Version Workbook Data Cell Ranges.

Navigation tools are available to the user to facilitated finding the source cells for both the target ranges in the model and the version ranges to be copied to the model. The display will show the target or source workbook (provided they are open) and the range of the version selected by the user (by mouse clicking on the version) in the versions object collection (item 504), the build work area (item 509), or the scenario storage area (item 512) and then pressing the "F5" or "F6" keys or using the context menu (right mouse click within any of the three windows) and then clicking on either "Goto Model" or "Goto Version". The command is only available for version objects and is ignored if the workbook is closed.

The navigation tools may be used during scenario development and during single stepping. This tool is useful to quickly review and switch between the cell contents of the version and model cells before and after scenario updates.

Errors Tabs

During version creation or scenario execution the software detects whether the action was completed successfully. Both methods generate errors if the required objects are not accessible (files not open, range names missing or objects locked).

Version creation of formulas also includes an equality check to ensure the transformed formula saved in the scenario workbook calculates the same value as the original formula in the source cell.

The software includes generic error trapping and will generate error messages detailing the nature of the problem.

Error listings are shown in two new tabs (which are visible when errors are listed). One tab (New Version Error Listing: item 2301) is used for errors which occur while a new version is created (item 402, Version controls: "Add to Scenario" and "Add to Model"), and the other tab (Scenario Execution Error Listing: item 2401) is used for errors which occur during a scenario run, validation or single stepping (in the control toolbars: items 506 & 511).

The error tabs can be hidden by clicking on the "Clear Tab" button (item 2308 & item 2408). Subsequent errors overwrite prior error listings.

New Version Error Listing

Figure 23:
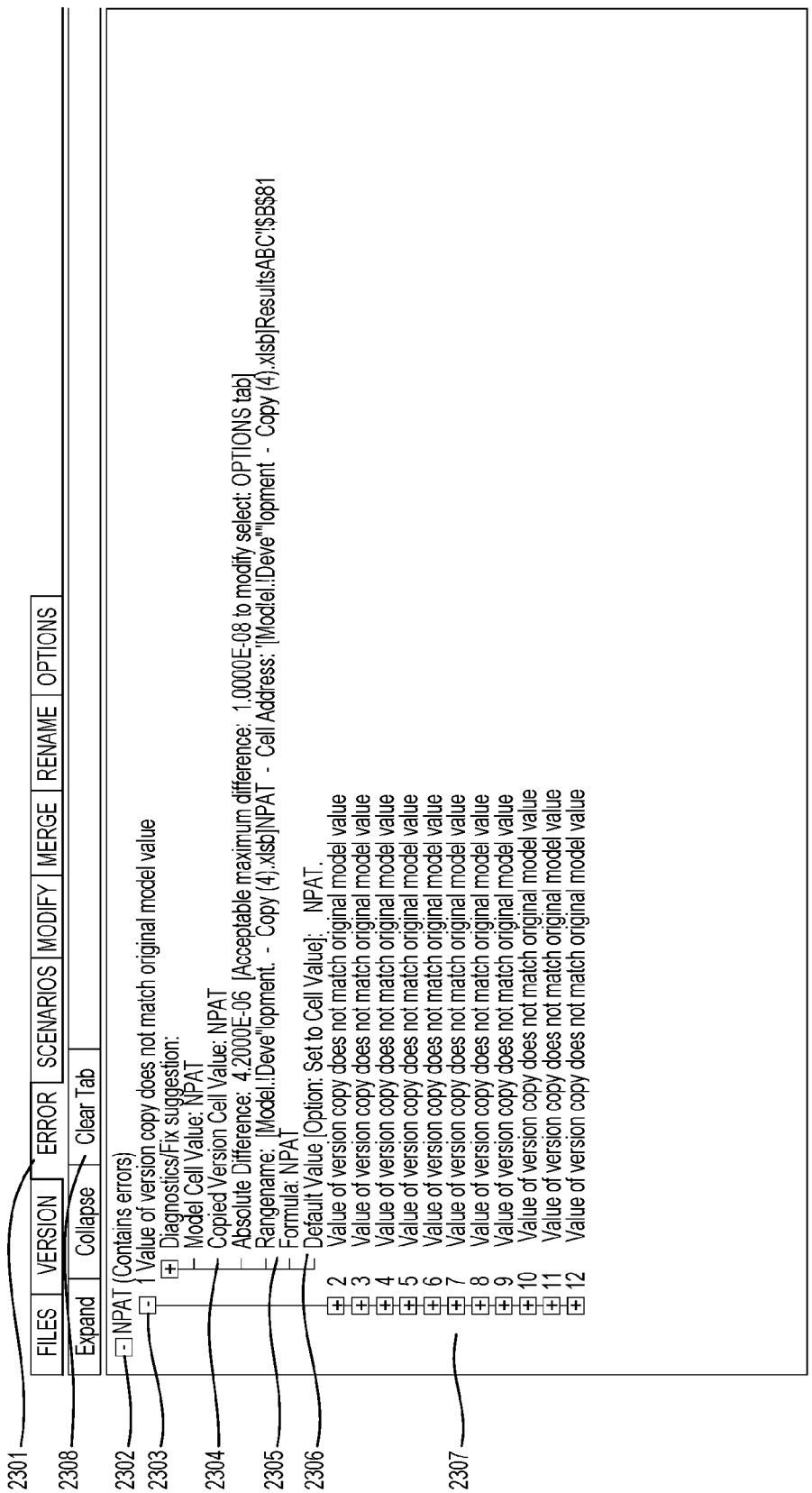
FIG. 23 is a bitmap screenshot of a sample error listing, generated while a version was created, containing information about the source and nature of the error.

The New Version Error Listing in FIG. 23 shows a tree view listing when the transformed formula saved in the scenario workbook calculates to a different value as the original formula in the source cell (the error was forced for testing).

The listing is headed by the version name (item 2302), and under the version name, the type of error (item 2303), a diagnosis of the error (item 2304), the source of the error (item 2305) and, if relevant, the default action taken by the software (i.e.: replace the formula with the current value, item 2306). The error message is repeated for each cell which produced in an error (item 2307).

Scenario Execution Error Listing

Figure 24:
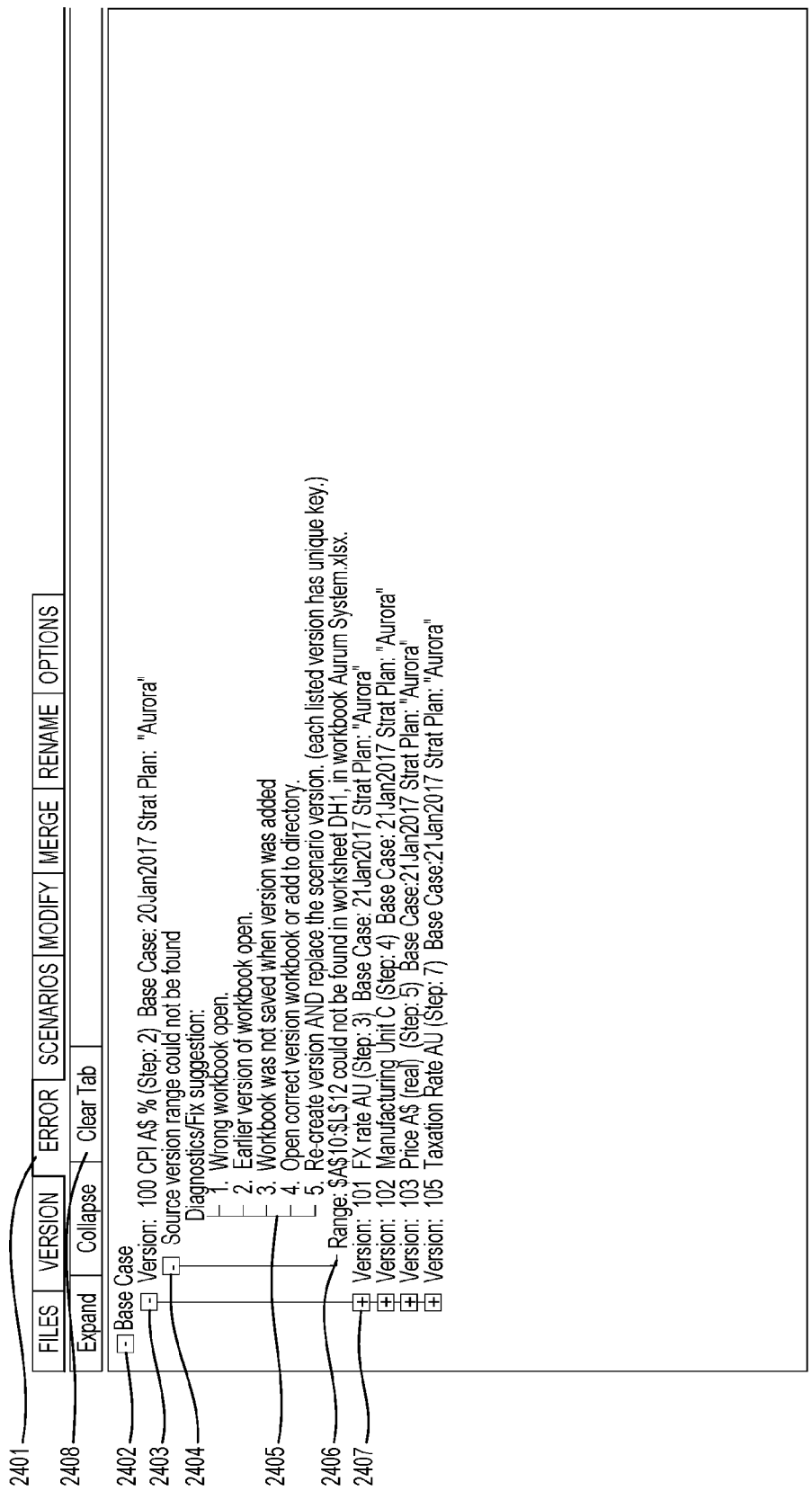
FIG. 24 is a bitmap screenshot of a sample error listing, generated while a scenario was executed, containing information about the source and nature of the error.
Figure 26:
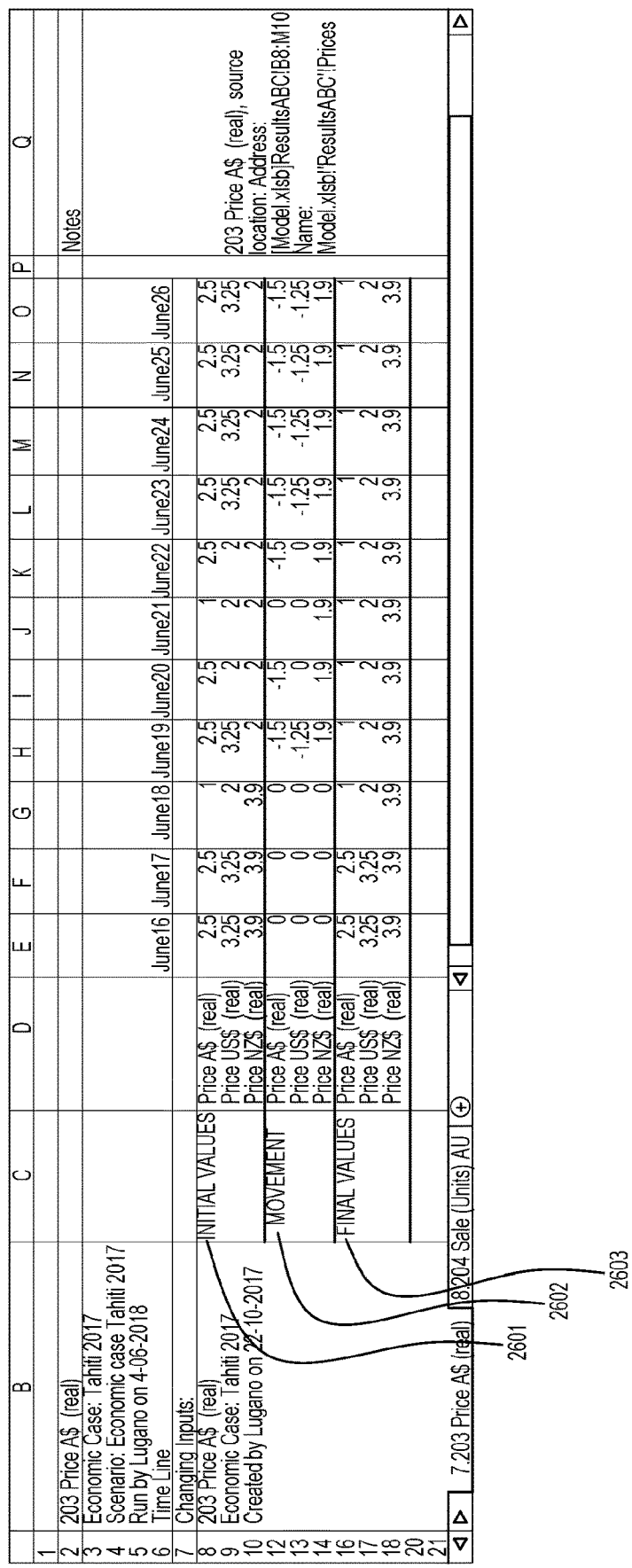
FIG. 26 is a bitmap screenshot of a sample report for a single version showing before and after values.

The Scenario Execution Error Listing in FIG. 24 shows the tree view listing when the source version range could not be found in the scenario workbook.

The listing is headed by the scenario name (item 2402), and under the scenario name the version name (item 2403), the type of error (item 2404), a diagnosis of the error and suggested remedial action (item 2405), and the range where the missing range name should have been located (item 2406). The error message is repeated for each range name which resulted in an error (item 2407).

Scenario Storage

Scenarios which are completed may be transferred to the scenario storage area (right hand side column in the Scenario tab: item 512). Selected scenarios from the build work area (item 509) can be dragged to the storage area or copied using the "Copy" button (in the build toolbar: item 505). Scenarios saved in the storage area can be dragged back to the build area. Either as a new scenario (as a replacement or into a new tab) or inserted into an existing scenario (drag & drop with the Ctrl modifier key simultaneously pressed down).

The stored scenarios are shown in a tree view list under the scenario name. Only scenarios in the storage area can be called by other scenarios. Modifications are limited to renaming scenarios, deleting steps and activating or de-activating steps.

The build work area contains tabs in which individual scenarios can be developed and fully modified (item 507). Scenarios in the build area cannot be called by another scenario.

Files & Backup

Scenarios are auto-saved while they are created and edited by the user. Active versions may be saved as backup using the "Backup" toolbar commands in the menu ribbon (item 103) or the "Backup" button on the scenario tab (in the Scenario Controls: item 502). The backup locations may be set by the user in the backup tab within the options tab (item 1701).

Editing and Deleting—Version Object Collection

Version objects (item 1201) can be deleted by selecting the version, pressing the Delete key or using the context menu (item 1202) and selecting "Ok" at the confirmation prompt. Multiple selections are allowed with the Ctrl modifier key pressed simultaneously while selecting items. Only versions which are not used by any scenario may be deleted. The context menu command includes a "Delete All Unused" button (item 1203) which will highlight all unused versions and prompt the user to confirm deletion. The "Clean" command (item 1204) finds all versions with no matching range names in the open scenario workbook and prompts the user to confirm deletion. If the range name is missing from the workbook then the version is unusable.

During deletion the version object is removed, the version entry is removed from the scenario file (SCEN file), and the range name and data (if it exists) is removed from the scenario excel workbook which contains the version data.

Scenarios Build Work and Storage Area

Scenario commands and versions objects (items 509 and 512) can be deleted by selecting the object, pressing the Delete key or using the context menu (item 620) and selecting "Ok" at the confirmation prompt. Multiple selections are allowed with the Ctrl modifier key pressed simultaneously while selecting items.

Scenario tabs and scenarios in the storage area may be deleted by selecting the object, pressing the Delete key or using the context menu and selecting "Ok" at the confirmation prompt The scenario commands or versions objects are then removed from the scenario file (SCEN file) but any applicable range names and cells data remain unmodified in the scenario workbook.

Internal Operations

The invention consists of five integrated modules. Two primary modules for recording, and script building and execution, and three tools for data merging, names modification, and workbook renaming.

The essential object used in the software is the VB.Net dictionary object (including sorted lists: "Sorted List") with nested keys. The dictionary object is versatile, fast, serializable and quick to save into a file. The two primary modules create and build these dictionaries and use the dictionary content to update model data and the GUI. The three tools modify existing dictionaries by merging their content, changing the range name specifications within the dictionary values and renaming items in the dictionaries.

Data Recording

After updating the relevant cells of the model, the user selects and highlights a relevant range for data recording (FIG. 20). The user enters a new version name and descriptions and then clicks "Add to Scenario" (in Version controls: item 402). The selected cell content (without styles) is then copied to an empty range in the active scenario workbook for later recall. In order to manage storage space: horizontal ranges are saved to the "horizontal" worksheet always starting from the first column and then the first empty row (item 2101). Vertical ranges are saved to a different "vertical" worksheet always starting from the first row and the first empty column (item 2201). The range of the saved cells are assigned a unique global range name.

Formulas are preserved and reconfigured by the software as to include the full addresses of each range referenced in the formula explicitly (the workbook & worksheet names are specified in the reconfigured addresses). Once reconfigured, these formulas can be copied back correctly to the model as formulas during scenario script execution.

The properties (range name, cell addresses, workbook, worksheet, date created, and author) of the selected range and copied range are saved in a dictionary object and becomes a version of the model data. The version dictionary key is a uniquely generated identifier specific for the version just created. Version dictionaries are saved to the active scenario file (SCEN file, item 3107). These properties are used later to locate the data for scenario script execution.

Ancillary dictionaries and lists containing the version identifier and sorted keys for range name, version name and creation date are also maintained. These ancillary dictionaries are used for quick data retrieval when building scenarios and for generating sorted tree view lists (item 504).

Scenario Script Building

Once the versions have been recorded, the user selects the Scenario tab (FIG. 5) to build the scenario. Using drag and drop, the user selects the version to update from the Versions Object Collection tree view list (item 504) and drags the version with the mouse onto the build work area tree view (item 509). Within the build work area tree view the versions can be moved (drag and drop) to reflect the users required calculation order. Scenarios are executed from the top item to the bottom item in the build work area tree view.

When a version is dragged across to the build work area the software identifies the selected version in the list, extracts its unique identifier and copies the version object from the Versions dictionary to the build scenario dictionary. The build work area may contain several scenarios under development under their own tab (item 507). A build scenario dictionary with nested keys is maintained by the software as the version objects are dragged and moved. This dictionary contains all the version objects selected and moved by the user with the scenario unique identifier as the primary key (each tab is a scenario) and the version unique identifier as the secondary nested key and finally the version object as the dictionary value.

In addition to developing a scenario script with version objects the user can include specific commands to control the script execution, such as calling scenarios or creating reports. These commands are inserted below the currently selected item in the tree view via the context menu (right mouse click within the build scenario window: items 602 to 616). Once inserted these commands can be dragged and moved/copied as required by the user. Similarly, to the version objects the command objects and all their properties are added to the build scenario dictionary.

The software also maintains ancillary dictionaries to track the order of tabs and the build scenarios contained within and of the order of versions and commands within the build scenarios.

Completed build-scenarios may be copied (drag & drop or click "Copy" in the build toolbar: item 505) to the scenario storage area (item 512). Similarly, to the build work area scenario objects, these scenarios and all their properties and objects (versions & commands) are added to a separate scenario dictionary with nested keys and separate scenario ancillary dictionaries used to track the order of objects.

These scenarios may be executed and may be called by commands in the build scenarios as subroutines. Called scenarios may include nested calls. As called commands are added, so the software maintains dictionaries of all the called and calling scenarios. Prior to any run and during script editing the software checks and will disable the scenario execution controls, or disallow the editing, if a potential circularity has been detected. Circularity is detected when a called scenario is called twice without first returning to the original calling scenario. Circularity is a condition which would create an infinite processing loop.

As the user builds up the script by dragging and copying versions to the build area additional command can be inserted (items 603 to 616; and items 1102 to 1109). The context menu with the commands is opened with a right-hand button click in build scenario window and the selected command is inserted below the currently selected version or command.

The software then creates a command object with all the relevant properties and adds them to the same build work area scenario dictionary as the versions. This dictionary contains all the command objects inserted by the user with a unique identifier as the secondary nested key and the command object as the dictionary value. The software also maintains the ancillary dictionaries to track the order of command within build scenarios.

The available commands include the report commands (items 612 to 616, and 1102 to 1109). These commands may require additional information in respect of which input and output values to show in the report. The input and output ranges required by the reports are selected from the Versions Object Collection list or from versions above the report command. The selected version is dragged & dropped with the modifier keys (Ctrl, Alt, & Shift) depressed (item 3201). The modifiers are used by the code to differentiate between a version to be used as a timeline, input watch or output watch. These versions are then added to the command object within the build scenario dictionary in the applicable nested sub-dictionary. The report command object is designed to contain the versions used to define the timeline, input and/or output ranges.

Single versions and command in the build area can also be moved or copied using drag & drop (to copy the Ctrl modifier key must be held down simultaneously). After any re-ordering the software updates the ancillary dictionaries which track the order of items within the build scenarios. Copying creates additional version or command objects in the build scenario dictionaries.

Scenario Script Execution

There are three types of script execution: Run, Single Step and Validation. Run is the standard execution method with workbook calculation and the application of all commands and version changes as per the scenario script. Single step is similar to Run but with only one step executed at a time by the user, and validation is a full run, with no calculation or reporting, of the scenario script and is useful to check that all the required objects are open or exists prior to a Run.

Prior to executing the run the software creates an executable scenario script (in the form of a sorted list dictionary object) comprising the main scenario and all the embedded calls to other scenarios. The executable scenario script is scanned for any circular calls across scenarios. Circularity is detected if a scenario is called a second time without the first scenario call returning the code processing pointer to the initial calling scenario. If circularity is detected, they are included in auto-generated error report tab (FIG. 24) and execution stops.

During Run execution, each item within the executable script list is executed from the top item to the bottom item in the tree view build scenario list. The software processes the versions and commands in the correct sequence from the ancillary dictionary using the tab identifier as the key to locate the ordered list of items for the selected build work area scenario tab. The ordered list contains the unique identifiers for each version/command object which in conjunction with the tab identifier is used to find the actual version/command object from the build-scenario dictionary for the active tab. The software checks whether the object is a version or command. In the case of a version the range name of the source data and target location are extracted from the version object. The source data is then copied over to the target location. Values are copied as values and formulas are copied as formulas. Commands are executed as per their function as described above.

Single step is similar to Run execution except only one step at a time is executed. Once the single step has been executed the scenario execution stops which allows the user to inspect the changes in the open workbooks. Before stopping, the software records the current environment: open workbooks, selected worksheets and selected cells for each open workbook. Execution of the next step is invoked by the user by clicking on the "SST" button (in the Run builds toolbar: item 506). Before executing the next step, however, all the saved environmental factors are re-applied: workbooks closed by the user are re-opened, selected worksheets and cells are re-selected.

Validation produces no results nor any calculation and is typically invoked before a Run to check that all objects, files and workbooks required are open and/or accessible. Any issues detected by the validation are included in an auto-generated error report tab (FIG. 24).

Reports Look Forward

Reports often compare the state of a collection of cells before the version update and after the update. Consequently, the version step must capture the data prior to the update and prior to the report command. The report command publishes the values of the designated ranges at the time the report command is invoke (i.e.: after the earlier version update) and so the original data must be captures when the version object is first invoked and just before the new version values are copied.

This is achieved by adding additional instructions (in the form of information) to the version object. The software uses the executable scenario script (prior to the Run execution) to step through the scenario to detect any reporting commands, then reverses the step direction looking for the version objects invoked by the reporting command and tags these versions by flagging the version as reportable and loading the applicable reporting command identification, input, output and timeline version objects into the reportable version object. When these reportable version objects are executed, in a Run, the additional tagged information is used to capture the original reporting data (i.e.: the cell values before the version update) which is then incorporated into the reports and used to calculate the data value movements.

Dictionary and List Objects

Figure 31:
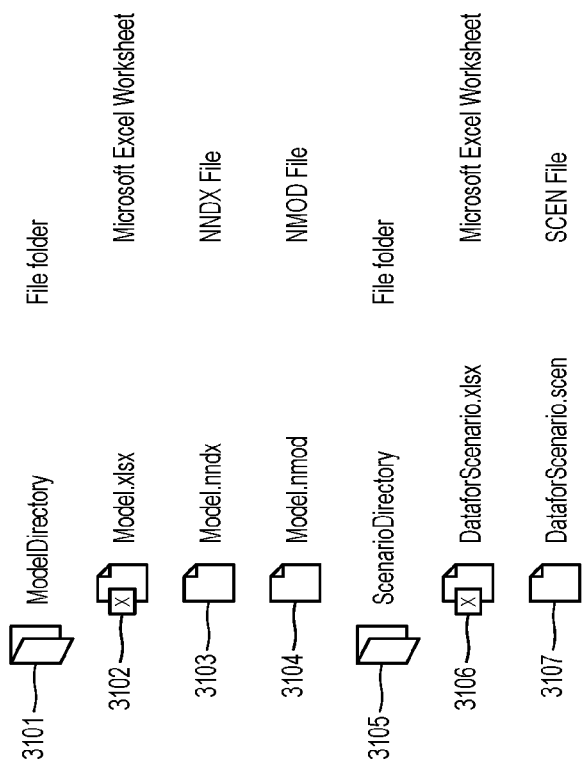
FIG. 31 is a bitmap screenshot of folder structure illustrating the relative location and extension of software files.
Figure 32:
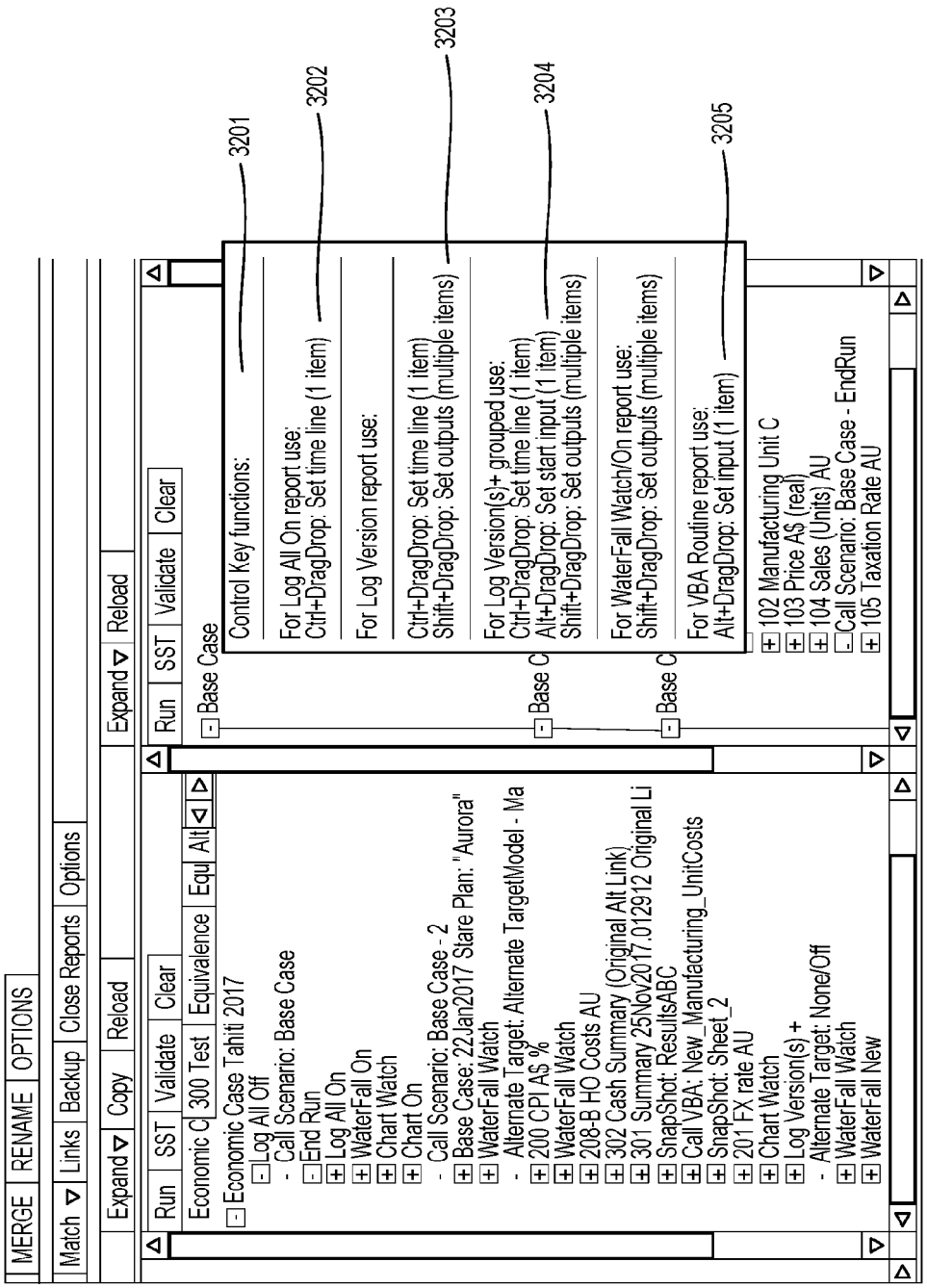
FIG. 32 is a bitmap screenshot of the Modifier keys (Ctrl, Shift, Alt) menu popup used in conjunction with mouse drag & drop to add reporting parameters to the scenario report commands.

Primary Dictionary, Sorted List and List objects are those objects used to maintain the data required by the software and are saved to the application's files (FIG. 31). The software also utilises ancillary Dictionary, Sorted List and List objects for temporary storage to track and boost processing effectiveness.

These primary objects are used for storing and manipulating: version objects, scenario objects (for both the build and storage area), names index objects, names modification objects and navigate names object (used by the range name navigation form).

Version Objects

The primary version objects created and maintained by the software are the dictionary of version objects keyed to the unique version identifier, the dictionary of workbook names used by the versions, the dictionary of unique version identifiers sorted by version name, the dictionary of unique version identifiers sorted by range name, and the dictionary of unique version identifiers sorted by date and time.

Scenario Build Area Objects

The primary scenario build area objects created and maintained by the software are the dictionary of version and commands objects for each scenario (tabs), the ordered list of the version and command unique identifiers in the execution sequence, the list of scenario tabs, the dictionary of workbook names used by the scenarios, and the dictionary of all command unique identifiers. Two additional dictionaries are used to keep track of calls to and from scenarios in the build and storage areas. One dictionary lists the storage area scenario unique identifier values called by other build scenarios using the calling build scenario unique identifier as the index key, and the other dictionary tracks the reverse, the calling build scenarios unique identifier values using the called storage area scenario unique identifier as the index key.

Scenario Storage Area Objects

The primary scenario storage area of saved objects created and maintained by the software are the dictionary of version and commands objects for each scenario in the storage area, the ordered list of the version and command unique identifiers in the execution sequence, the list of scenarios, the dictionary of workbook names used by the scenarios, and the dictionary of all command unique identifiers. Two additional dictionaries are used to keep track of calls to and from scenarios in the storage area. One dictionary lists the scenario unique identifier values called by other scenarios using the calling scenario unique identifier as the index key, and the other dictionary tracks the reverse, the calling scenarios unique identifier values using the called scenario unique identifier as the index key.

Names Index Objects

The primary names index objects created and maintained by the software is the dictionary of names using the cell location as the lookup key.

Names Modification Objects

The primary names modification objects created and maintained by the software is the dictionary of modifications (number and location of rows/columns to insert/delete) using the range name as the lookup key.

Navigate Names Object

The primary navigate names objects created and maintained by the software for the navigate names form is the dictionary of names properties for each open workbook using the worksheet, text filter, and special collection keys (All, Global, & Local) as the lookup key and range name properties as the values.

Example

In an example of the use of the invention the user launches the scenario manager windows from the menu ribbon (item 101) and selects the Files tab (item 201) to create a new or select an existing scenario file. The version data and scenarios to be created are saved in these scenario files.

Next, the user selects the Version tab (item 202) and opens or selects the workbook to be updated with new input assumptions (versions). Within the workbook the user may select an existing named range of contiguous cells or creates a new range name.

The range Names Navigation form (FIG. 18) assists the user to find the range names within the workbook which the user wishes to update. The navigation tool list all the range names within the workbook and worksheets, allows filtering on name labels and can add box objects around the cells of selected range names to facilitate finding specific ranges. This tool is a supplement or alternative to the software automatically detecting the names of selected cells via the names index lookup file (this file is created by the user using the "Update" command in the menu ribbon: item 102). This provides the user with two approaches to finding existing range names: scanning the worksheets within the workbook for range names by clicking the cells or selecting a range name from an ordered or filtered list. Upon selecting a cell all the range names containing the selected cell will be displayed within the Version tab (item 407). The user can select one of the existing range names or create a new range name based on the current range selection or a new range selection.

If the existing values in the selected range has not yet been saved the user may need to save the initial conditions into a base case version. Before making any updates to the cell value the user enters a version name (item 404), a new or existing range name (item 405) and commentary (item 409) and clicks the "Add to Scenario" button (item 402) to create the new range name and save the version data into the scenario workbook and the range properties to the scenario file. Both formulas, as formulas, and constants will be copied. After saving these initial values the user repeats this process with new inputs and then continues updating other assumptions and creating additional named ranges as required. Existing range names can be used to create new versions with new data inputs. Only range names with contiguous cells are allowed.

Once all the data has been updated, the user changes to the Scenario Tab (item 203) which contains three list views columns: the versions object collection, the scenario build work area and the scenario storage area (items 504, 509 and 512 respectively). From left to right the first column (versions) list all the versions including those just created, the middle column (build) contains the scenario being built by the user, and the final columns contains copies of completed scenarios. Scenarios listed in the scenario storage area column may be called by any other scenario similar to a subroutine call. Calls to scenarios are used for repetitive tasks or to manage master scenarios.

The user then drags and drops versions from the versions object column to the build column to create a new scenario script. Additional commands can be inserted by the user, by invoking the context menu: right click any item (item 601) in the build scenario work area window. Available script elements include commands: "Calculate", "Calc On", "Calc Off", "End Run", "Call Scenario", "Alternate Target Workbook", reporting commands: "Log", "Waterfall", "Chart", and "SnapShot", and script controls: "Activate" and "De-Activate" for versions or commands. These script elements can be deleted, copied and re-ordered by selecting the version or command and clicking the Delete key (to delete), dragging and dropping the object (to move), and by drag & drop with the Ctrl modifier key pressed down (to copy). The scenario and version text names can be edited by the user.

Once the scrip is completed the user runs the full script (item 506, "Run" button) or single steps (item 506, "SST" button) through each version or command. Single step allows the user to inspect worksheet cell details as each step is executed. As the run progresses the data of each version object in the script is copied from the scenario workbook to the original workbook. The copied data replaces the current data within the specified name range. Formulas are copied over as per the original formulas. Report workbooks are created and populated as per the report commands. De-Activated commands are skipped all other commands are executed, "End Run" stops execution and all remaining steps are ignored.

After the run the user can inspect the workbook report worksheets (for some examples refer to: FIGS. 25, 26, 27A, 27B, 28, 29A, 29B, 29C, 29D, and 30) and the original workbooks. All the reports and the scenario files are saved to a default or user specified folder during the run. The user may use the Backup tools on the menu ribbon to save all the open workbooks and scenario files to a user defined backup folder for later review or auditing.

The user can repeat this process to create additional scenarios with versions based on data from different workbooks. Additional scenarios in development or for testing can be maintained in different tabs within the build work area. Completed scenario scripts can be copied over to the scenario storage area window as a backup copy or to create a callable library of scenarios.

A person skilled in the art will appreciate that many embodiments and variations can be made without departing from the ambit of the present invention.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. An electronic spreadsheet updating method including:
navigating the spreadsheet to locate data to update;
executing updated scenarios for models using the located data, the executing involving:
(1) executing scenario script items in a sequential order step by step, and
(2) allowing the impact on one or more cell values after each step change to be automatically included as separate impacts in outputs; and generating reports relating to the executed updated scenarios.

2. An electronic spreadsheet updating method as claimed in claim 1, wherein the updated scenario models and associated generated reports are saved, and later readily accessed once more when assessing, reviewing or auditing model outcomes.

3. An electronic spreadsheet updating method as claimed in claim 1, wherein:
- a record of all changes made to the models is provided in the form of a high-level script and all the necessary data is saved allowing an auditor to fully reproduce the exact spreadsheet updates; and
- the auditor can scrutinize every step comparing before and after inputs and outputs.

4. An electronic spreadsheet updating method as claimed in claim 1, further involving saving a currently active workbook under a new name, and updating version and command objects in the currently active scenario file; and/or
- pausing the sequential execution of scenario scripts to allow a user the opportunity to examine worksheets after each step change.

5. An electronic spreadsheet updating method as claimed in claim 1, further allowing users to:
- change the processing sequence of scenario script execution by re-ordering script items;
- build scenario scripts and to select from a collection of pre-defined report commands which automatically compare user defined ranges before and after the changes made by the scenario scripts in tabular and/or graphical form;
- include customized reports during scenario script execution, by creating a customised range name in the spreadsheet which includes the data and text to report, the customised range name being added to reporting commands, the reports being generated and automatically comparing, during scenario script execution, the user defined ranges before and after the changes made by the scenario script in the same format as the customised range name;
- create and save new version data objects from a spreadsheet using existing range names or by creating new range names into a collection of version data objects suitable to build a scenario script; and/or
- build scenario scripts by using mouse drag and drop movements to manipulate and sequence the version data objects created from a spreadsheet, inserting/adding control commands, and/or copying existing script items.

6. An electronic spreadsheet updating method as claimed in claim 1, further allowing version data objects to be managed, re-labelled, removed, and/or examined by allowing a user to navigate directly to source and target cells by key function press or mouse click using a context menu within the version object collection window.

7. An electronic spreadsheet updating method as claimed in claim 1, further storing scenario scripts and the exact cell changes planned or implemented for review which facilitates locating and viewing the data using assigned function keys to automatically recall the cell addresses and display the data and the worksheet containing the data onto the computer display.

8. An electronic spreadsheet updating method as claimed in claim 1, further allowing:
- a saved scenario and version changes to be re-run for independent examination by other users;
- users to create and save new versions of data of the existing spreadsheet model, which can include both or either constants and formulas within the cells of a selected range, the formulas allowing the script to retain a complete record of all changes, including changes to formulas, for subsequent reviews; and/or
- users to build scenario scripts which can include commands to call user defined VBA computer programs which is advantageous for subsequent reviews as the script retains a complete record of all changes including complex subroutines executed by the VBA computer programs.

9. An electronic spreadsheet updating method as claimed in claim 1, further involving a validation run which checks that the necessary components and objects for the scenario are available and loaded into computer memory without updating any spreadsheets.

10. An electronic spreadsheet updating method as claimed in claim 1, wherein the step of navigating further includes allowing a user to detect a range name based on a spreadsheet cell selected by the user by extracting the range name from a dictionary of names and using the cell location as the matching key, the dictionary of names to be created in advance as required by the user so that, advantageously, named ranges can be found within the worksheet quickly and on the fly by the user without the distraction of searching for the name from alternate tools which may list names by category alphabetically.

11. An electronic spreadsheet updating method as claimed in claim 1, further allowing:
- users to build scenario scripts which can include commands to call other scenarios scripts previously built and saved by a user, in a manner similar to a subroutine call thereby advantageously separating tasks which require repetitive execution;
- saved subroutine scenario scripts to call other scenario scripts which is advantageous for separating tasks which require repetitive execution with complex data update pathways;
- users to build multiple scenario scripts within a work area which can be saved to a separate storage area;
- previously completed scenarios located in a scenario storage area to be visible to a user, examinable and inclusive of all the features of the scenarios in a build work area except for the limitation of adding and/or reordering commands; and/or
- previously completed scenarios located in a scenario storage area to be moved and/or copied back and forwards between the build work area and the scenario storage area.

12. An electronic spreadsheet updating method as claimed in claim 1, further enabling scenarios to be developed separately and simultaneously on copies of models by different users, and then combined into one merged scenario script to advantageously reduce the time to complete new scenario updates as several users may develop different segments of their scenario scripts and versions simultaneously.

13. An electronic spreadsheet updating method as claimed in claim 1, further enabling scenario scripts to reverse the copy direction allowing version values of existing versions to be updated with new values in the models so that, advantageously, the reverse copy allows other groups which supply data to a modeling team to automatically update their output templates using a scenario script with the reverse copy command and a modelling team can then automatically update their model using the scenario scripts and version files supplied to them.

14. An electronic spreadsheet updating method as claimed in claim 1, further including creating a worksheet difference set using an existing worksheet as a template, the set including a copy of the worksheet with values saved as constants and a difference worksheet with formulas in each cell calculating the change between the existing and copy worksheet cells, the appearance of the copy and difference worksheets being the same as the existing worksheet except for the numerical values in the cells.

15. An electronic spreadsheet updating method as claimed in claim 14, further resetting the worksheet differences to evaluate zero by making the numerical values of the cells in the copy worksheet equal to the numerical values of the cells in the existing worksheets and recalculating the spreadsheet.

16. An electronic spreadsheet updating method as claimed in claim 14, further including enabling scenario scripts to create and update the copy and difference worksheets in spreadsheet models as specified by a user and inserting copies of these sheets into a reporting worksheet for analysis which advantageously allows users to capture a snap shot of the differences between each selected step in a familiar user defined format.

17. An electronic spreadsheet updating method as claimed in claim 1, further including managing scenario development and execution using a three-column layout for any one or more of a versions object collection, a scenario build area and a scenario storage area; all the objects and controls to create or edit a scenario script being advantageously grouped together in one visible GUI which incorporates quick mouse drag and drop actions to move objects and context sensitive menus for commands.

18. An electronic spreadsheet updating method as claimed in claim 1, further defining version objects and command objects in the versions collection and scenario scripts with a unique key identifier, all new or copied objects being preferably created with a new unique key, objects being preferably retrieved by their unique key identifier and not their label, users advantageously able to rename the version and scenario objects using labels which may better describe the nature of the step change in the reports generated by the scenario script.

19. An electronic spreadsheet updating method as claimed in claim 1, further allowing the scope of a single scenario scripts to update multiple spreadsheet files so that, advantageously, a user does not need a separate scenario script for each spreadsheet file rather the method can access and interact with any spreadsheet file opened in the same application instance.

20. An electronic spreadsheet updating method as claimed in claim 1, further determining equivalent models to be used in scenario scripts based on a minimum of common text strings in the model name which is advantageous for users who habitually rename newly updated file, by adding a postfix or prefix identifiers to the name stem, an equivalence algorithm matching the required file name automatically with the name stems of open files and uses these matched files in the scenario scripts without requiring renaming of the scenario and version objects.

* * * * *